(12) United States Patent
Kitayama et al.

(10) Patent No.: US 9,007,287 B2
(45) Date of Patent: Apr. 14, 2015

(54) LIQUID-CRYSTAL DISPLAY DEVICE

(75) Inventors: Masae Kitayama, Osaka (JP);
Fumikazu Shimoshikiryoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 118 days.

(21) Appl. No.: 13/698,304

(22) PCT Filed: May 16, 2011

(86) PCT No.: PCT/JP2011/061246
§ 371 (c)(1),
(2), (4) Date: Nov. 16, 2012

(87) PCT Pub. No.: WO2011/145584
PCT Pub. Date: Nov. 24, 2011

(65) Prior Publication Data
US 2013/0057791 A1    Mar. 7, 2013

(30) Foreign Application Priority Data
May 17, 2010 (JP) .................. 2010-113530

(51) Int. Cl.
*G09G 3/36* (2006.01)
*G09G 5/10* (2006.01)
(Continued)

(52) U.S. Cl.
CPC .............. *G09G 3/3614* (2013.01); *G09G 3/003* (2013.01); *G09G 2320/0233* (2013.01);
(Continued)

(58) Field of Classification Search
CPC .................. G09G 3/36; G09G 3/3614; G09G 2320/0271; G09G 2320/0276; H04N 13/00; H04N 13/0007; H04N 2013/00
USPC .............................. 345/204, 690, 9, 87, 89, 94
See application file for complete search history.

(56) References Cited

U.S. PATENT DOCUMENTS 5,058,994 A * 10/1991 Mihara et al. ............... 345/97
2003/0048401 A1   3/2003 Hanaoka et al.
(Continued)

FOREIGN PATENT DOCUMENTS

JP    1-272286    10/1989
JP    2002-357830    12/2002
(Continued)

OTHER PUBLICATIONS

International Preliminary Report of Patentability and Written Opinion issued in PCT/JP2011/061246, dated Dec. 10, 2012.
(Continued)

*Primary Examiner* — Ilana Spar
(74) *Attorney, Agent, or Firm* — Nixon & Vanderhye P.C.

(57) ABSTRACT

A liquid crystal display device of the present invention has a vertical scanning period in which the polarity of a display signal is positive and a vertical scanning period in which the polarity of a display signal is negative. When a pair of successive two vertical scanning periods is constituted by a first vertical scanning period and a second vertical scanning period, and when a target gradation level to be displayed in the first vertical scanning period is GL1, and a target gradation level to be displayed in the second vertical scanning period immediately after the first vertical scanning period is GL2, GL1 and GL2 being integers of 0 or more representing gradation levels, the liquid crystal display device includes a circuit (124) capable of supplying a display voltage corresponding to a gradation level to a pixel in the second vertical scanning period, the gradation level being expressed by $GL2_{OD}$ which satisfies a condition where $|GL2_{OD}-GL1|$ is larger than $|GL2-GL1|$, in the case where GL2 is different from GL1. The value of $GL2_{OD}$ when the polarity in the first vertical scanning period is positive and the polarity in the second vertical scanning period is negative is different from the value of $GL2_{OD}$ when the polarity in the first vertical scanning period is negative and the polarity in the second vertical scanning period is positive.

6 Claims, 34 Drawing Sheets

(51) Int. Cl.
 G09G 3/00 (2006.01)
 H04N 13/04 (2006.01)
 G09G 3/34 (2006.01)

(52) U.S. Cl.
 CPC ...... H04N 13/0434 (2013.01); H04N 13/0438 (2013.01); *G09G 3/342* (2013.01); *G09G 2300/0447* (2013.01); *G09G 2300/0465* (2013.01); *G09G 2310/0218* (2013.01); *G09G 2310/0221* (2013.01); *G09G 2310/0237* (2013.01); *G09G 2310/024* (2013.01); *G09G 2320/0209* (2013.01); *G09G 2320/0219* (2013.01); *G09G 2320/0223* (2013.01); *G09G 2320/0247* (2013.01); *G09G 2320/0252* (2013.01); *G09G 2340/0435* (2013.01); *G09G 2340/16* (2013.01); H04N 13/0497 (2013.01); *G09G 2340/10* (2013.01)

(56) References Cited

U.S. PATENT DOCUMENTS

| | | |
|---|---|---|
| 2003/0086044 A1 | 5/2003 | Inoue et al. |
| 2006/0055858 A1 | 3/2006 | Nakanishi et al. |
| 2006/0187361 A1 | 8/2006 | Fujine et al. |
| 2009/0115772 A1 | 5/2009 | Shiomi et al. |
| 2009/0237495 A1 | 9/2009 | Kawahara |
| 2009/0267884 A1 | 10/2009 | Takahashi et al. |
| 2010/0033555 A1 | 2/2010 | Nagase et al. |
| 2010/0053225 A1 | 3/2010 | Furukawa et al. |
| 2010/0097366 A1* | 4/2010 | Kitayama et al. ............ 345/213 |
| 2011/0090319 A1* | 4/2011 | Kim et al. ...................... 348/51 |
| 2011/0109666 A1 | 5/2011 | Owa et al. |

FOREIGN PATENT DOCUMENTS

| | | |
|---|---|---|
| JP | 2003-177418 | 6/2003 |
| JP | 2005-208600 | 8/2005 |
| JP | 2006-78968 | 3/2006 |
| JP | 2008-233454 | 10/2008 |
| JP | 2008-268421 | 11/2008 |
| JP | 2008268421 A * | 11/2008 |
| JP | 2009-232249 | 10/2009 |
| JP | 2010-61105 | 3/2010 |
| JP | 2011-90079 | 5/2011 |
| JP | 2011-102876 | 5/2011 |
| WO | WO 2004/086349 A1 | 10/2004 |
| WO | WO 2006/054517 A1 | 5/2006 |
| WO | WO 2006/121220 | 11/2006 |
| WO | WO 2008/096481 A1 | 8/2008 |
| WO | WO 2008/139693 | 11/2008 |

OTHER PUBLICATIONS

International Search Report for PCT/JP2011/061246, mailed Aug. 9, 2011.

Hanaoka et al., "A New MVA-LCD by Polymer Sustained Alignment Technology", *SID 04 Digest*, 2004, pp. 1200-1203.

* cited by examiner

FIG.1
(a)
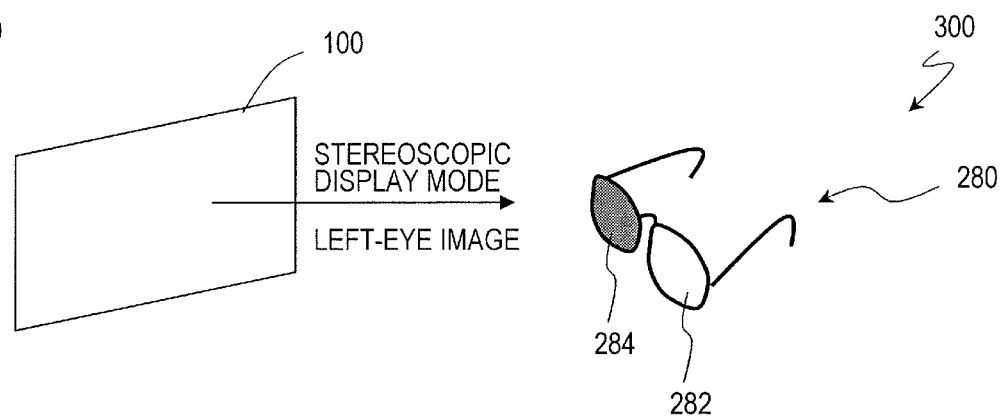
(b)
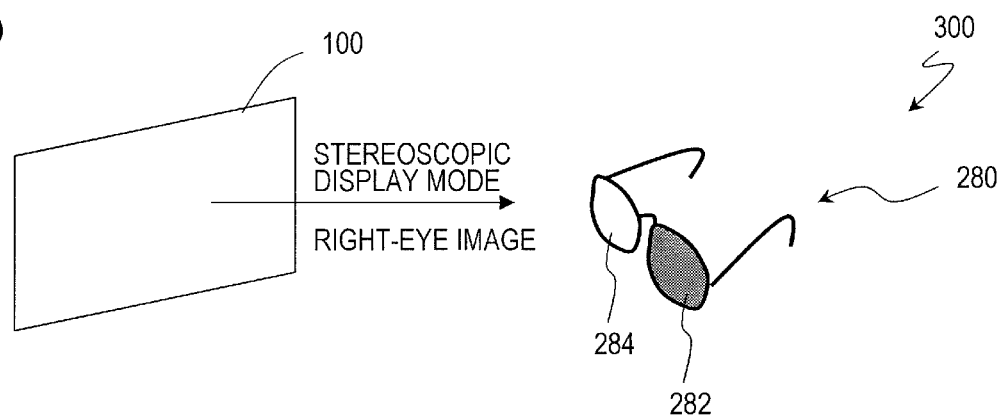
(c)
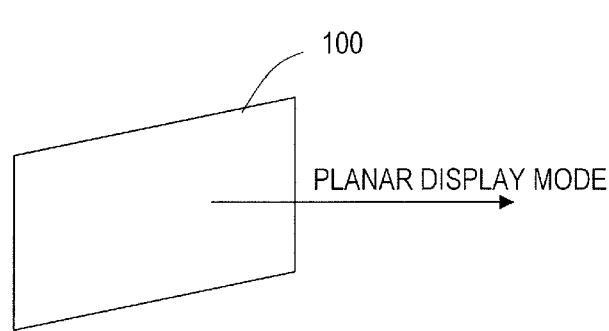

FIG.3
(a)
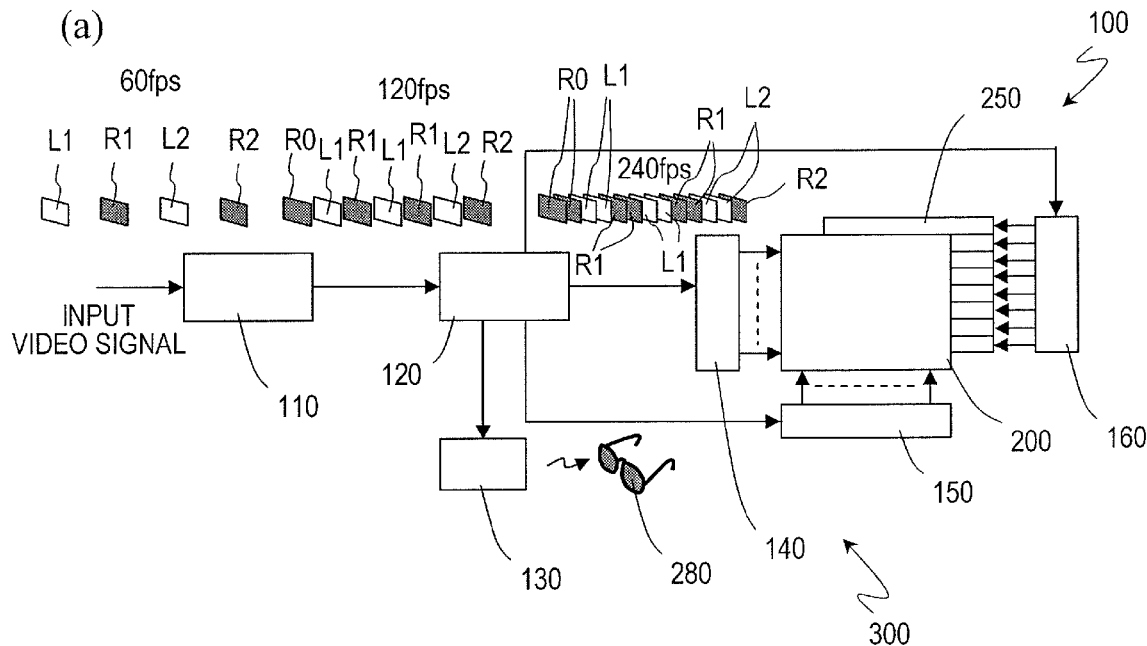
(b)
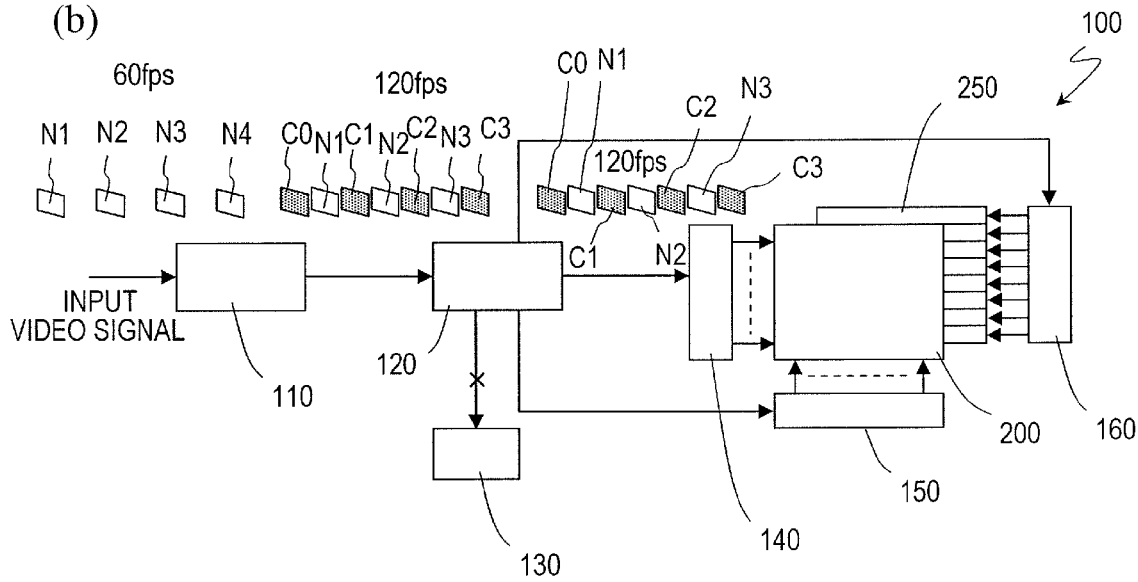

*FIG.4*
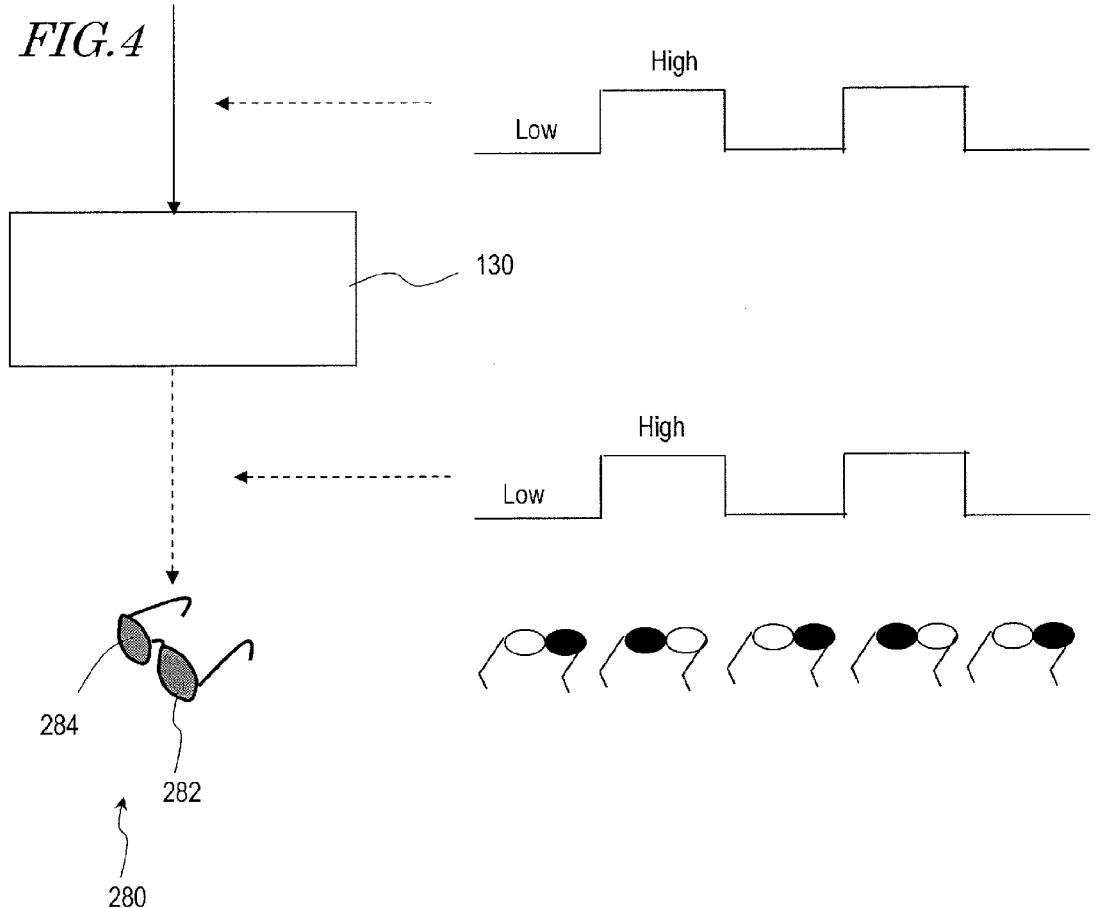
*FIG.5*
(a) INPUT VIDEO SIGNAL
60fps
(b) VIDEO SIGNAL
120fps
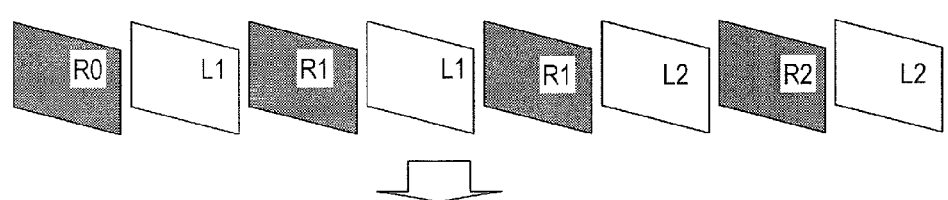
(c) DISPLAY SIGNAL
240fps
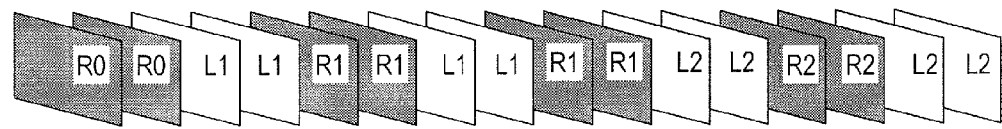

FIG.6
(a) INPUT VIDEO SIGNAL
60fps
(b) VIDEO SIGNAL    INTERPOLATION
120fps              IMAGE DATA
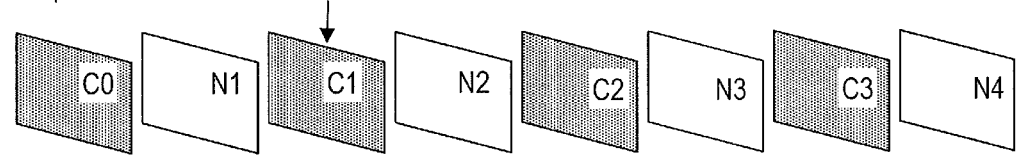
(c) DISPLAY SIGNAL
120fps
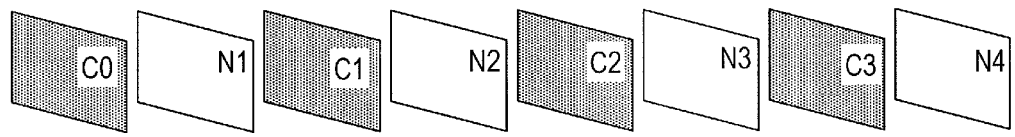

FIG.7
(a)
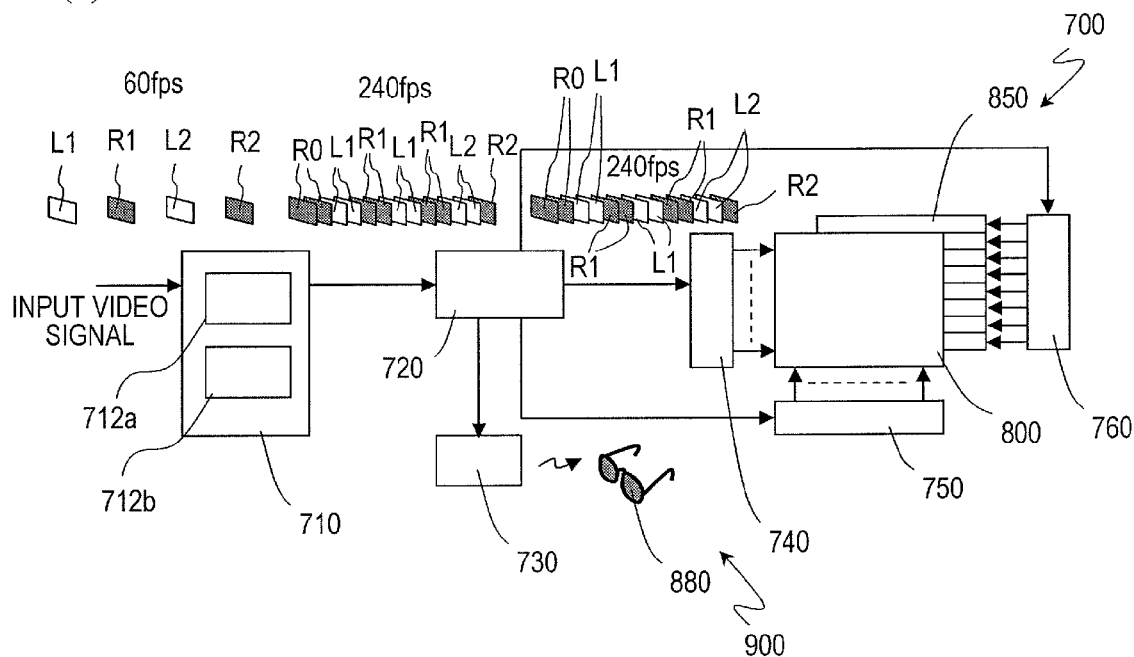
(b)
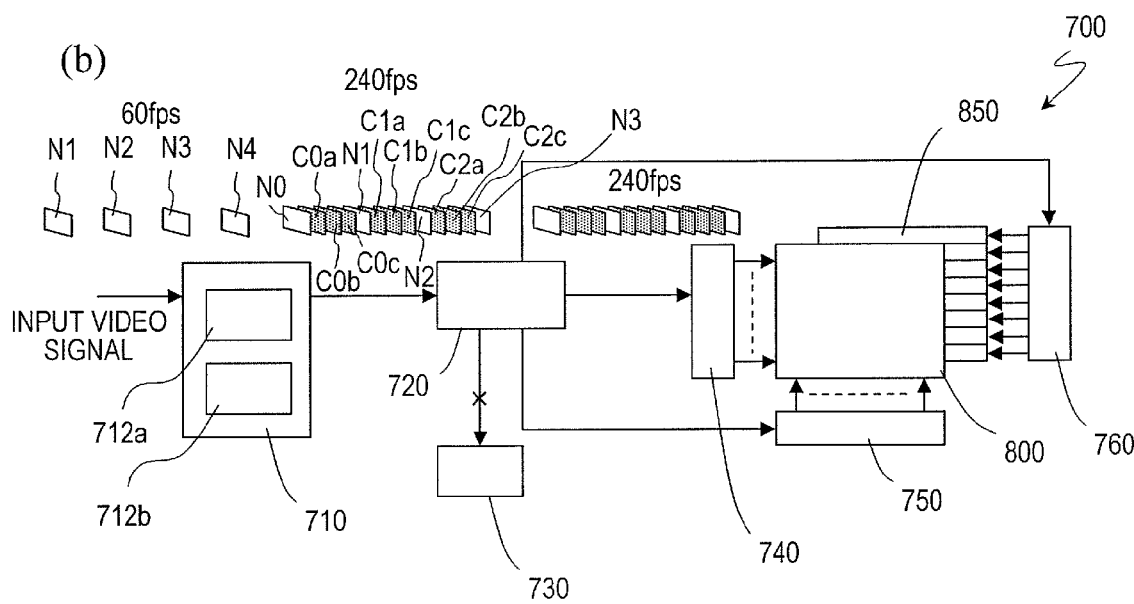

FIG.8
(a) INPUT VIDEO SIGNAL
    60fps
(b) VIDEO SIGNAL
    120fps
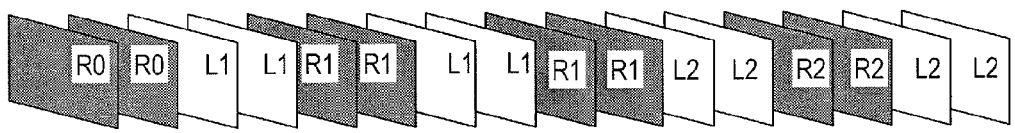
(c) DISPLAY SIGNAL
    240fps
FIG.9
(a) INPUT VIDEO SIGNAL
    60fps
(b) VIDEO SIGNAL
    240fps
INTERPOLATION IMAGE DATA
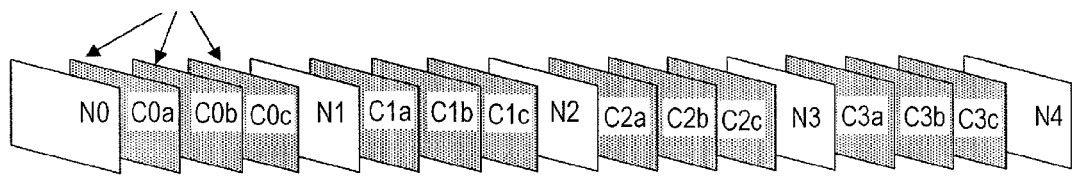
(c) DISPLAY SIGNAL
    240fps
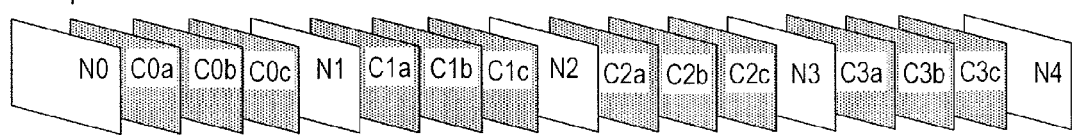

FIG. 12
(a)
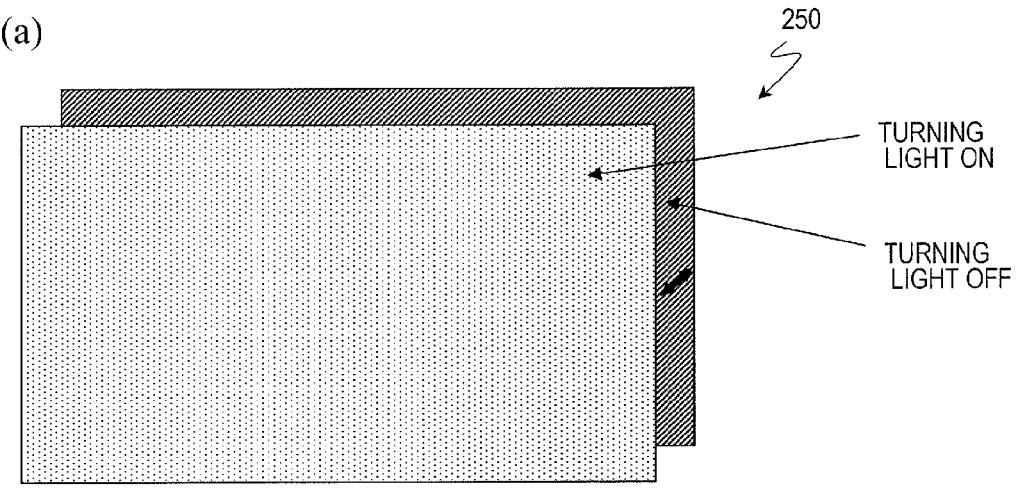
(b)
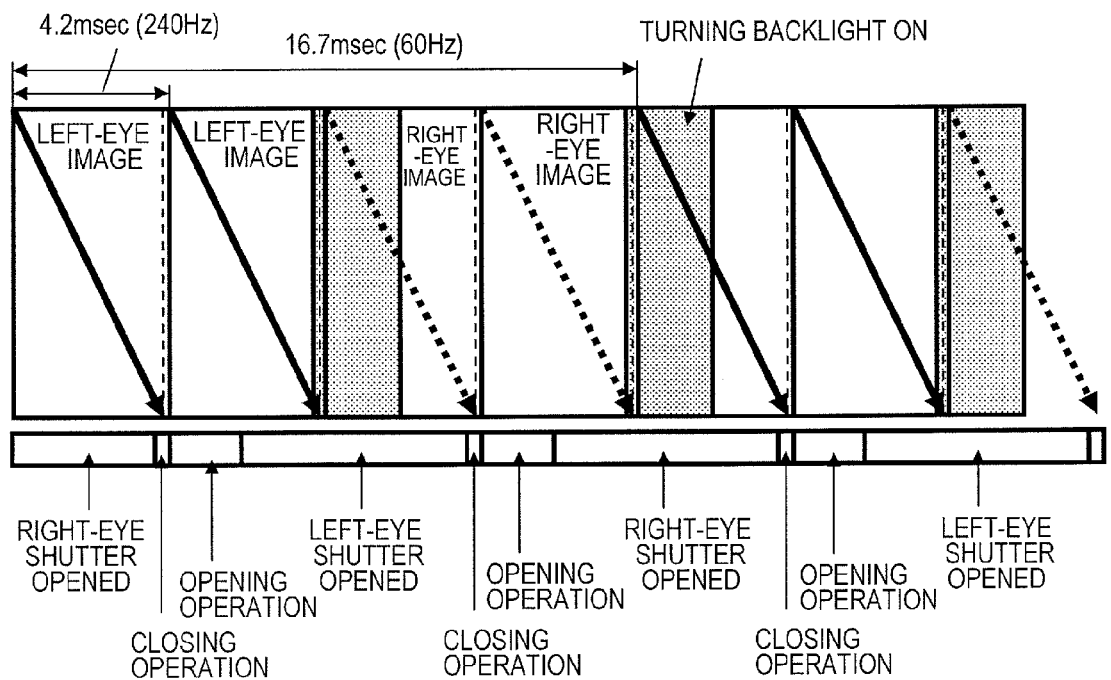

FIG.13
(a)
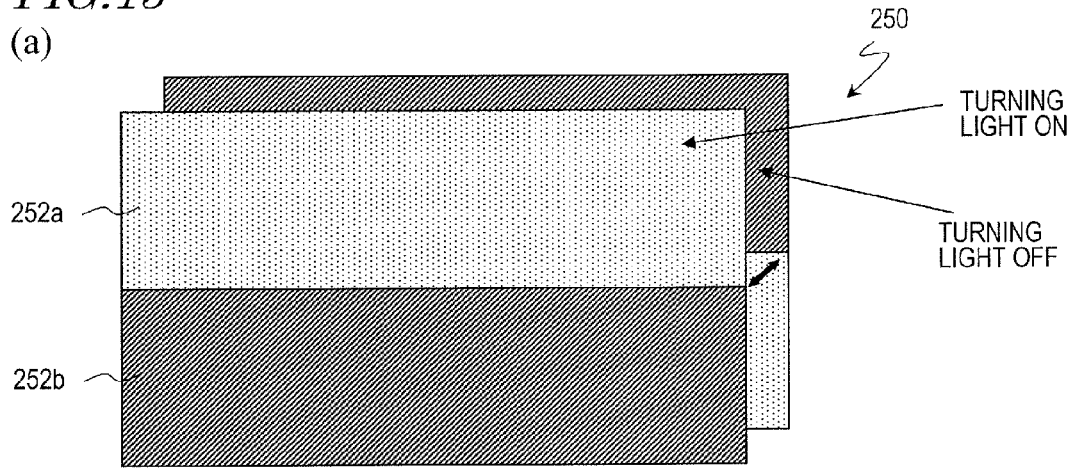
(b)
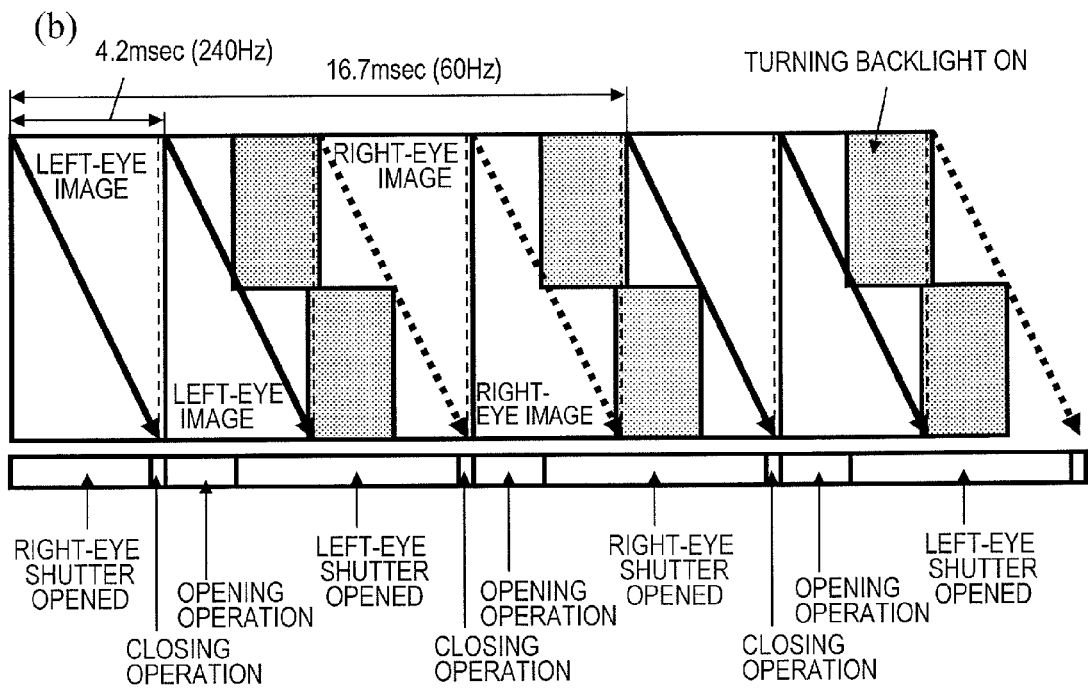
FIG.14
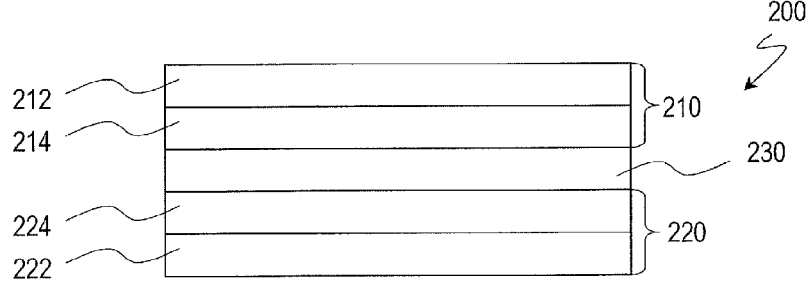

FIG.17
(a)
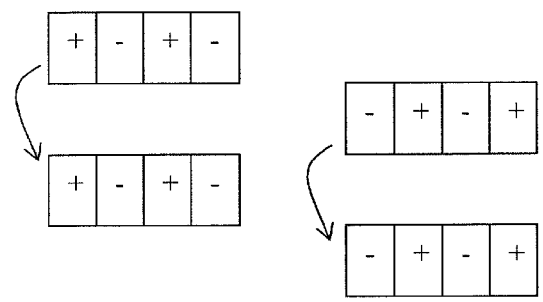
(b)
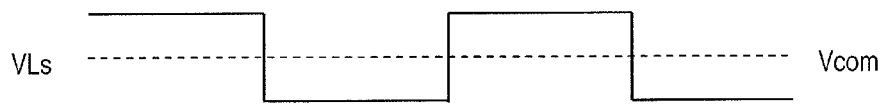
FIG.18
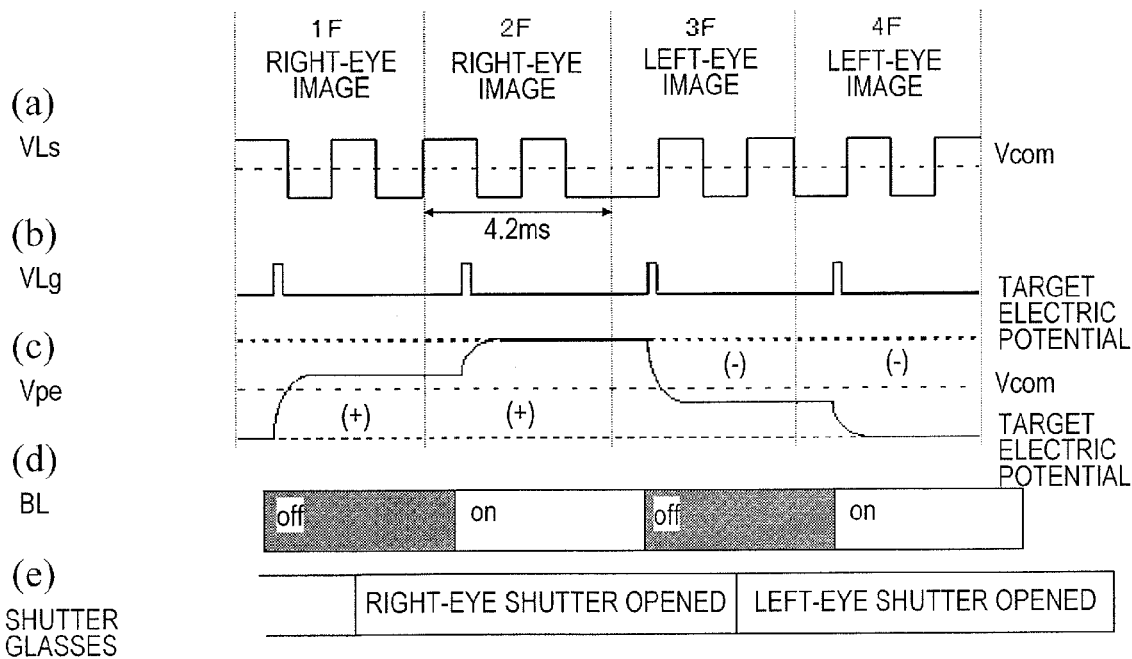

FIG.30
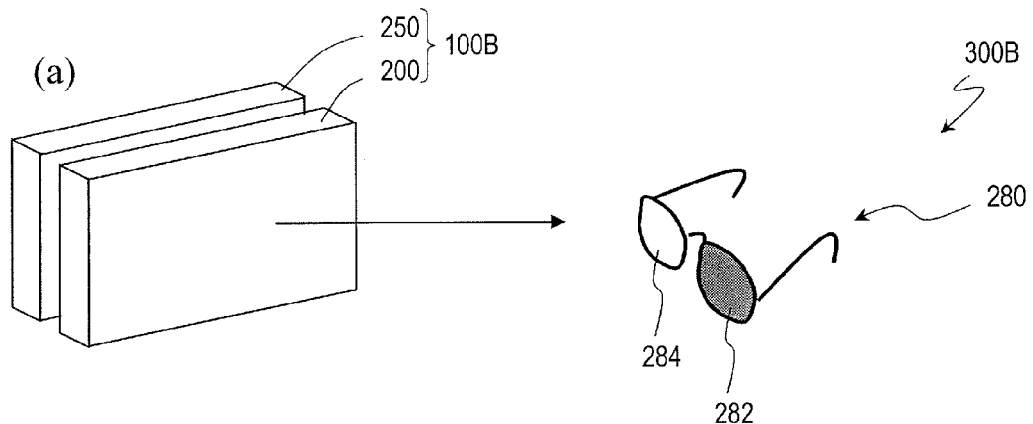
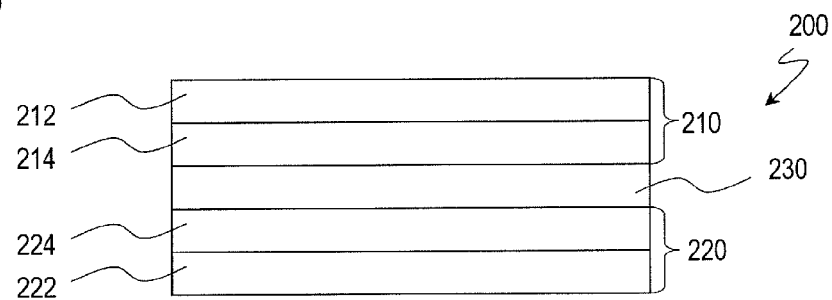
FIG.31
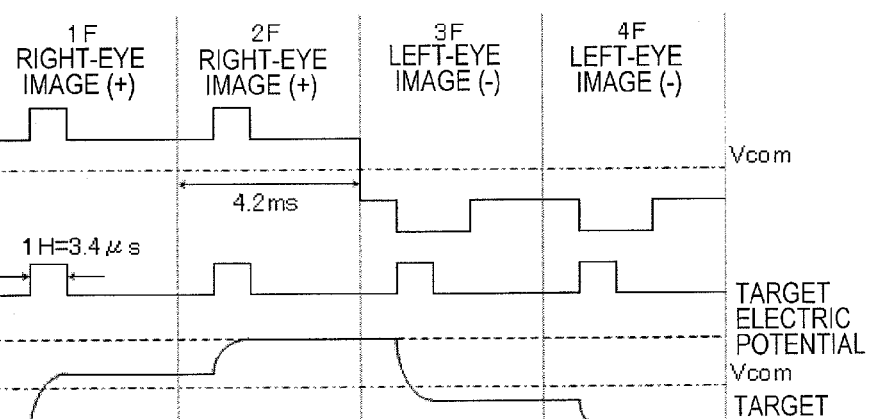

FIG.32
(a)
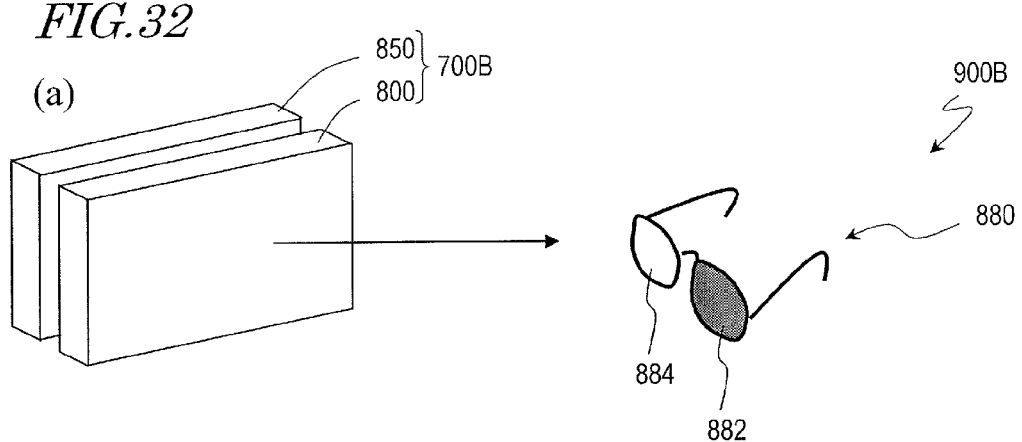
(b)
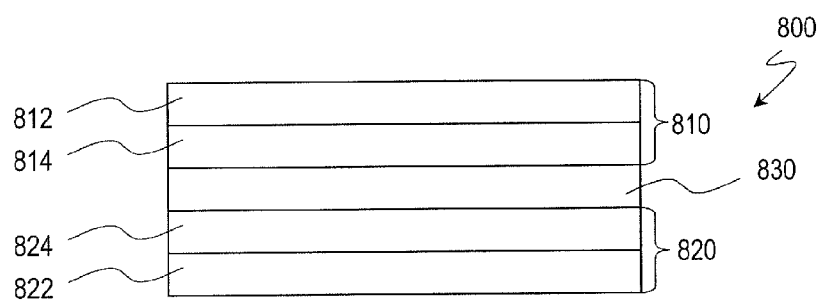
FIG.33
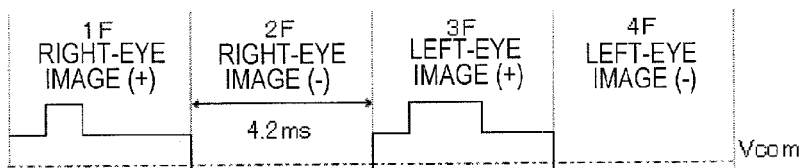
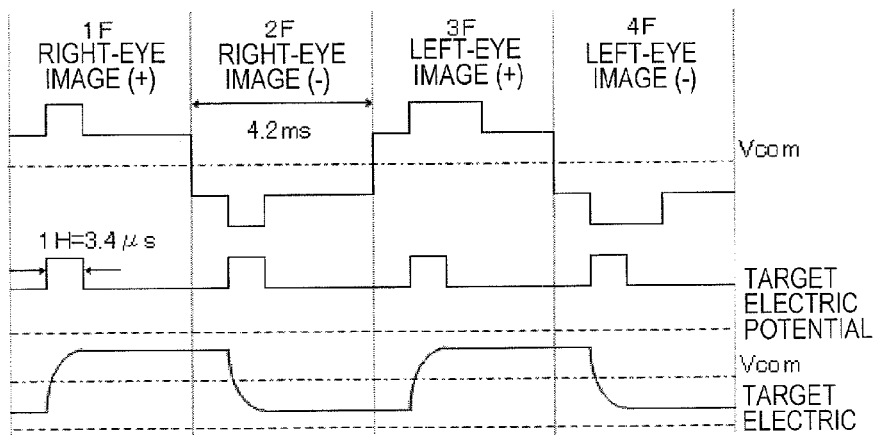
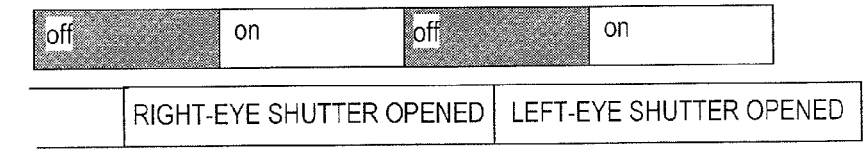

FIG.36
(a)
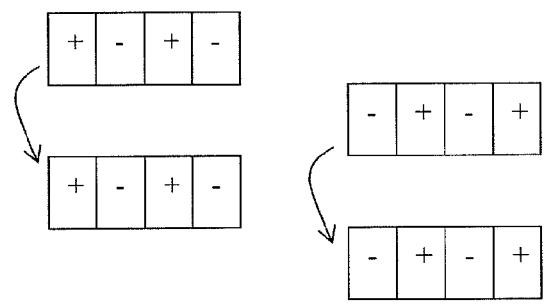
(b)
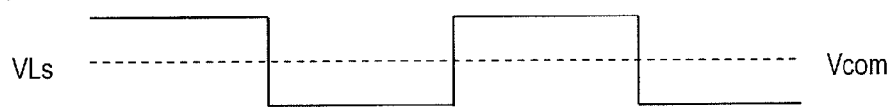
FIG.37
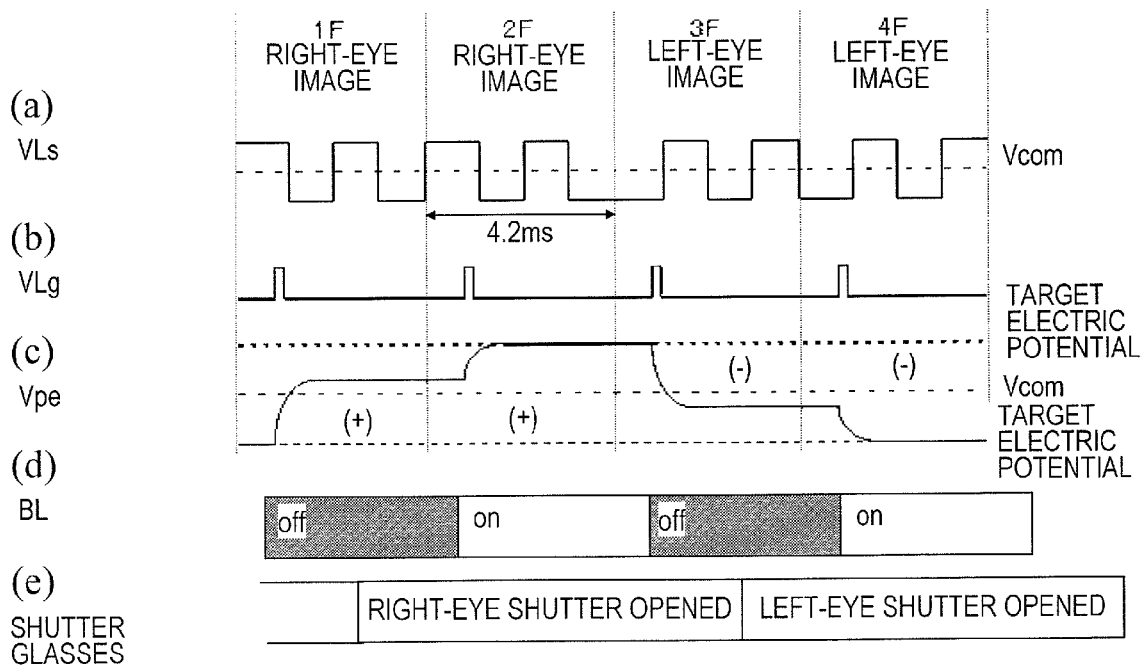

*FIG.42*
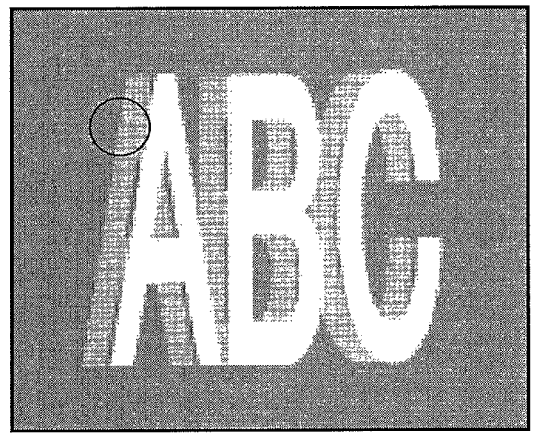
*FIG.43*
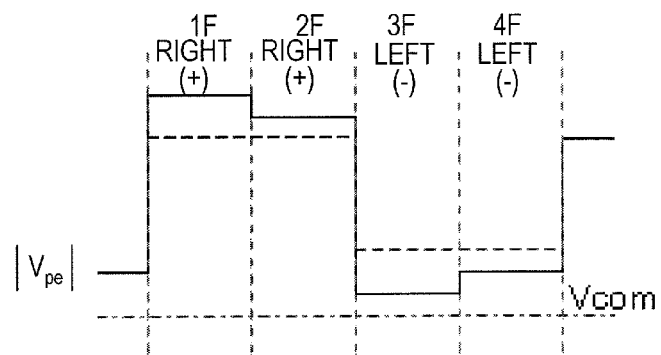
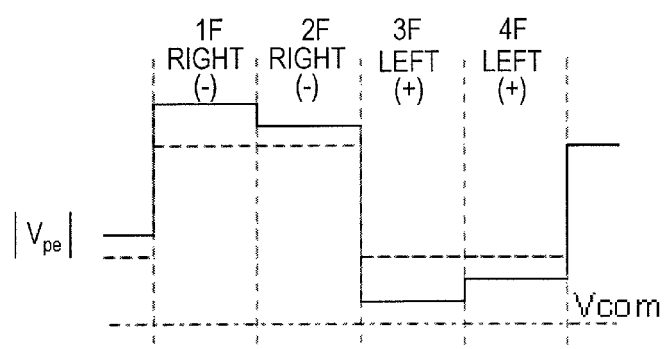

LIQUID-CRYSTAL DISPLAY DEVICE

This application is the U.S. national phase of International Application No. PCT/JP2011/061246 filed 16 May 2011 which designated the U.S. and claims priority to JP Patent Application No. 2010-113530 filed 17 May 2010,the entire contents of each of which are hereby incorporated by reference.

TECHNICAL FIELD

The present invention relates to a liquid crystal display device and a driving method thereof.

BACKGROUND ART

A liquid crystal display device has advantages such as a light and thin body, and low power consumption. Thus, the liquid crystal display device is utilized not only as a small display device in a display portion of a cellular phone or the like, but also as a large television set. A general liquid crystal display device performs planar display. In recent years, it is suggested to perform stereoscopic display with more presence by using a liquid crystal display device (see Patent Document No. 1).

Patent Document No. 1 discloses a stereoscopic image display device (stereoscopic display system) provided with a liquid crystal display device which alternately displays a frame for left eye and a frame for right eye, and shutter glasses. The observer wearing the shutter glasses observes a display screen of the liquid crystal display device.

In the stereoscopic image display device in Patent Document No. 1, the liquid crystal display device displays the first and the second frames for left eye of the same image successively. Thereafter, the first and the second frames for right eye of the same image are successively displayed. At this time, a left-eye shutter of the shutter glasses is opened from a vertical blanking period after the first left-eye frame is written into the liquid crystal display device to the next period for the second left-eye frame. A right-eye shutter of the shutter glasses is opened from a vertical blanking period after the first right-eye frame is written into the liquid crystal display device to the next period for the second right-eye frame. As described above, in the stereoscopic image display device in Patent Document No. 1, cross-talk in which an observer visually recognizes the left-eye frame and the right-eye frame simultaneously can be prevented, and the time period in which the observer can visually recognize the left-eye frame and the right-eye frame is extended, thereby attempting to increase the luminance.

CITATION LIST

Patent Literature

Patent Document No. 1: Japanese Laid-Open Patent Publication No. 2009-232249

SUMMARY OF INVENTION

Technical Problem

As described above, in the stereoscopic display system of Patent Document No. 1, the liquid crystal display device performs display of two frames for one left-eye frame (left-eye image), and the liquid crystal display device performs display of two frames for one right-eye frame (right-eye image). Thus, the liquid crystal display device performs display of four frames in order for an observer to visually recognize one stereoscopic image. In this case, in order for the observer to recognize a stereoscopic image which can be displayed as moving picture, it is necessary to drive the liquid crystal display device at higher vertical scanning frequencies. However, in the case where the liquid crystal display device is driven at higher vertical scanning frequencies, a time period for which each pixel is selected is shortened, so that the influence of signal delay is increased, and the luminance of the pixel is not varied to a predetermined value. As a result, display unevenness may occur.

In addition, the input video signal which is input into the liquid crystal display device does not always conform to the stereoscopic display mode. In some cases, an observer does not desire to visually recognize the stereoscopic display with wearing the shutter glasses. Accordingly, the liquid crystal display device is sometimes required to be capable of performing normal display (planar display) in addition to the stereoscopic display. However, the power consumption of the liquid crystal display device which can perform not only the stereoscopic display but also planar display is disadvantageously increased as compared with a general liquid crystal display device.

In addition, in the stereoscopic display, display is performed by switching right-eye image and left-eye image. For this reason, if the response of liquid crystal is slow, there arises a problem that the influence of left-eye image remains when the right-eye image is displayed, for example, so that the quality of stereoscopic display is degraded. According to the study of the inventors of the present invention, the problem that the image in the present frame is affected by the image in the previous frame (referred to as "cross-talk between frames") is remarkable especially in the stereoscopic display. However, the problem may also arise in planar display, and the problem is particularly serious in the driving at higher vertical scanning frequency.

The present invention has been conducted in view of the above-described problems, and the objective of the present invention is to provide a liquid crystal display device and a stereoscopic display system which can perform stereoscopic display with suppressed display unevenness. In addition, another objective of the present invention is to provide a liquid crystal display device and a stereoscopic display system with low power consumption in which a stereoscopic display mode and a planar display mode can be switched.

In addition, the objective of the present invention is to provide a liquid crystal display device capable of suppressing the occurrence of cross-talk between frames which is particularly remarkable in stereoscopic display.

Solution to Problem

The liquid crystal display device of the present invention is a liquid crystal display device having a vertical scanning period in which the polarity of a display signal supplied to a pixel is positive and a vertical scanning period in which the polarity of a display signal supplied to a pixel is negative, wherein when a pair of successive two vertical scanning periods is constituted by a first vertical scanning period and a second vertical scanning period, and when a target gradation level to be displayed in the first vertical scanning period is a first target gradation level GL1, and a target gradation level to be displayed in the second vertical scanning period immediately after the first vertical scanning period is a second target gradation level GL2, GL1 and GL2 being integers of 0 or more representing gradation levels, the liquid crystal display device includes a circuit capable of supplying a display voltage corresponding to a gradation level to a pixel in the second vertical scanning period, the gradation level being expressed by $GL2_{OD}$ which satisfies a condition where $|GL2_{OD}\text{-}GL1|$ is larger than $|GL2\text{-}GL1|$ and a condition where the sign of $(GL2_{OD}\text{-}GL1)$ is the same as that of $(GL2\text{-}GL1)$, when the second target gradation level GL2 is different from the first target gradation level GL1, the liquid crystal display device has a pair of successive two vertical scanning periods in which the polarity in the first vertical scanning period is positive and the polarity in the second vertical scanning period is negative, and a pair of successive two vertical scanning periods in which the polarity in the first vertical scanning period is negative and the polarity in the second vertical scanning period is positive, and the value of $GL2_{OD}$ when the polarity in the first vertical scanning period is positive and the polarity in the second vertical scanning period is negative is different from the value of $GL2_{OD}$ when the polarity in the first vertical scanning period is negative and the polarity in the second vertical scanning period is positive.

In one embodiment, the liquid crystal display device further includes a pair of successive two vertical scanning periods in which the polarity in the first vertical scanning period is positive and the polarity in the second vertical scanning period is positive, wherein the value of $GL2_{OD}$ when the polarity in the first vertical scanning period is positive and the polarity in the second vertical scanning period is negative is different from the value of $GL2_{OD}$ when the polarity in the first vertical scanning period is positive and the polarity in the second vertical scanning period is positive.

In one embodiment, the liquid crystal display device further includes a pair of successive two vertical scanning periods in which the polarity in the first vertical scanning period is positive and the polarity in the second vertical scanning period is positive, wherein the value of $GL2_{OD}$ when the polarity in the first vertical scanning period is positive and the polarity in the second vertical scanning period is negative is different from the value of $GL2_{OD}$ when the polarity in the first vertical scanning period is negative and the polarity in the second vertical scanning period is negative.

In one embodiment, the liquid crystal display device further includes a pair of successive two vertical scanning periods in which the polarity in the first vertical scanning period is positive and the polarity in the second vertical scanning period is positive, and a pair of successive two vertical scanning periods in which the polarity in the first vertical scanning period is negative and the polarity in the second vertical scanning period is negative, wherein the value of $GL2_{OD}$ when the polarity in the first vertical scanning period is positive and the polarity in the second vertical scanning period is positive is different from the value of $GL2_{OD}$ when the polarity in the first vertical scanning period is negative and the polarity in the second vertical scanning period is negative.

In one embodiment, the polarity of the display signal supplied to a pixel is inverted every two vertical scanning periods.

In one embodiment, the polarity of the display device supplied to a pixel is inverted every four vertical scanning periods.

In one embodiment, a plurality of kinds of lookup tables in which values of $GL2_{OD}$ are mutually different are prepared for a certain combination of the gradation level GL1 and the gradation level GL2.

In one embodiment, the liquid crystal display device can perform display by switching its mode between a stereoscopic display mode and a planar display mode.

In one embodiment, in the planar display mode, the value of $GL2_{OD}$ does not depend on the polarity in the first vertical scanning period and the polarity in the second vertical scanning period.

The liquid crystal display device of the present invention is a liquid crystal display device which can perform display by switching its mode between a stereoscopic display mode and a planar display mode, wherein when the liquid crystal display device has a vertical scanning period in which the polarity of a display signal supplied to a pixel is positive and a vertical scanning period in which the polarity of a display signal supplied to a pixel is negative, and a pair of successive two vertical scanning periods is constituted by a first vertical scanning period and a second vertical scanning period, and when a target gradation level to be displayed in the first vertical scanning period is a first target gradation level GL1, and a target gradation level to be displayed in the second vertical scanning period immediately after the first vertical scanning period is a second target gradation level GL2, GL1 and GL2 being integers of 0 or more representing gradation levels, the liquid crystal display device includes a circuit capable of supplying a display voltage corresponding to a gradation level to a pixel in the second vertical scanning period, the gradation level being expressed by $GL2_{OD}$ which satisfies a condition where $|GL2_{OD}\text{-}GL1|$ is larger than $|GL2\text{-}GL1|$ and a condition where the sign of $(GL2_{OD}\ GL1)$ is the same as that of $(GL2\text{-}GL1)$, when the second target gradation level GL2 is different from the first target gradation level GL1, and the value of $GL2_{OD}$ in the stereoscopic display mode is different from the value of $GL2_{OD}$ in the planar display mode.

In one embodiment, a vertical scanning frequency in the planar display mode is smaller than a vertical scanning frequency in the stereoscopic display mode. For example, the vertical scanning frequency in the stereoscopic display mode is 240 Hz, and the vertical scanning frequency in the planar display mode is 120 Hz.

In one embodiment, the value of $|GL2_{OD}\text{-}GL1|$ in the stereoscopic display mode is larger than the value of $|GL2_{OD}\text{-}GL1|$ in the planar display mode.

The liquid crystal display device according to the present invention is a liquid crystal display device, provided with a plurality of pixels, for performing display in a stereoscopic display mode, wherein left-eye image data and right-eye image data are alternately written every two successive vertical scanning periods into each of the plurality of pixels, and each of the plurality of pixels exhibits the same polarity over the two vertical scanning periods in which the left-eye image data is written and exhibits the same polarity over the two vertical scanning periods in which the right-eye image data is written.

In one embodiment, respective polarities of the plurality of pixels are inverted every two or more even-numbered vertical scanning periods.

In one embodiment, respective polarities of the plurality of pixels are inverted every two vertical scanning periods.

In one embodiment, respective polarities of the plurality of pixels are inverted every four vertical scanning periods.

In one embodiment, the plurality of pixels are arranged in a matrix of a plurality of rows and a plurality of columns, and when one of the left-eye image data and the right-eye image data is written in the entire of the plurality of pixels, polarities of pixels adjacent in the column direction among the plurality of pixels are equal to each other.

In one embodiment, the plurality of pixels are arranged in a matrix of a plurality of rows and a plurality of columns, and when one of the left-eye image data and the right-eye image data is written in the entire of the plurality of pixels, polarities of pixels adjacent in the row direction and in the column direction among the plurality of pixels are different from each other.

In one embodiment, the plurality of pixels are divided into one or more blocks corresponding to two or more rows of the plurality of rows, and the writing of the left-eye image data or the right-eye image data is performed to pixels in odd-numbered rows or even-numbered rows in the block, and thereafter is performed to pixels in the other ones of rows.

In one embodiment, the liquid crystal display device includes: a liquid crystal panel having a front substrate, a back substrate, and a liquid crystal layer disposed between the front substrate and the back substrate; a backlight unit for irradiating the liquid crystal panel with light; a frame rate control circuit for generating, based on an input video signal, a video signal having a higher frame rate than that of the input video signal; a timing controller for generating, based on the video signal, a display signal; a scanning signal driving circuit for supplying a scanning signal for selecting a pixel into which the writing is performed; a display signal driving circuit for supplying the display signal to the selected pixel; a writing state signal transmitting circuit for transmitting a writing state signal indicating a writing state of the plurality of pixels; and a backlight driving circuit for controlling the turning on and off of the backlight unit.

In one embodiment, the backlight unit is turned on in at least part of the latter one of the two vertical scanning periods in which the left-eye image data and the right-eye image data are written, respectively.

In one embodiment, the liquid crystal display device performs, in each of the plurality of pixels, overdrive driving based on the left-eye image data and the right-eye image data written in one or more preceding vertical scanning period.

In one embodiment, the liquid crystal display device performs display by switching its mode between the stereoscopic display mode and a planar display mode, and in the planar display mode, the driving is performed at a lower vertical scanning frequency than that in the stereoscopic display mode.

In one embodiment, each of the plurality of pixels has a first sub-pixel and a second sub-pixel.

In one embodiment, in the planar display mode, multi-pixel driving is performed, and in the stereoscopic display mode, the multi-pixel driving is not performed.

The liquid crystal display device according to the invention performs display by switching its mode between a stereoscopic display mode and a planar display mode in which the driving is performed at a lower vertical scanning frequency than that in the stereoscopic display mode.

In one embodiment, the driving in the planar display mode is performed at a vertical scanning frequency which is the half of that in the stereoscopic display mode.

In one embodiment, the liquid crystal display device includes: a liquid crystal panel provided with a plurality of pixels; a frame rate control circuit for generating, based on an input video signal, a video signal having a higher frame rate than that of the input video signal; a timing controller for generating, based on the video signal, a display signal; a scanning signal driving circuit for supplying a scanning signal for selecting a pixel into which the writing is performed; and a display signal driving circuit for supplying the display signal to the selected pixel, wherein the timing controller makes different the frame rate of the display signal in accordance with the stereoscopic display mode and the planar display mode.

In one embodiment, the liquid crystal display device further includes: a backlight unit for irradiating the liquid crystal panel with light; and a backlight driving circuit for controlling the turning on and off of the backlight unit.

In one embodiment, the irradiation with light by the backlight unit is changed in accordance with the stereoscopic display mode and the planar display mode.

In one embodiment, the backlight unit has a plurality of illuminating regions of which the turning on and off can be independently controlled, respectively.

In one embodiment, the plurality of pixels are arranged in a matrix of a plurality of rows and a plurality of columns, and each of the plurality of illuminating regions is disposed correspondingly to pixels in at least one row of the plurality of rows.

In one embodiment, in the case where the display is performed in the stereoscopic display mode, the plurality of illuminating regions are sequentially turned on.

In one embodiment, the liquid crystal panel includes: a front substrate having a counter electrode; a back substrate having a scanning line, a source line, and a pixel electrode; and a liquid crystal layer disposed between the front substrate and the back substrate.

In one embodiment, in the case where the display is performed in the planar display mode, the scanning signal driving circuit and the display signal driving circuit drive the liquid crystal panel at a vertical scanning frequency which is the half of that in the case where the display is performed in the stereoscopic display mode.

In one embodiment, the frame rate control circuit sets the frame rate of the video signal to be twice as high as the frame rate of the input video signal.

In one embodiment, in the case where the display is performed in the stereoscopic display mode, left-eye image data and right-eye image data are alternately arranged in the input video signal, and the frame rate control circuit arranges two sets of image data repeatedly in the video signal, each one of the two sets of image data including the left-eye image data and the right-eye image data in the input video signal.

In one embodiment, the timing controller successively arranges, in the display signal, a pair of the left-eye image data and a pair of the right-eye image data of the video signal, respectively.

In one embodiment, in the case where the display is performed in the stereoscopic display mode, the timing controller sets the frame rate of the display signal to be twice as high as the frame rate of the video signal, and in the case where the display is performed in the planar display mode, the timing controller sets the frame rate of the display signal to be equal to the frame rate of the video signal.

In one embodiment, the frame rate control circuit sets the frame rate of the video signal to be four times as high as the frame rate of the input video signal.

In one embodiment, in the case where the display is performed in the stereoscopic display mode, left-eye image data and right-eye image data are alternately arranged in the input video signal, and the frame rate control circuit arranges two sets of image data repeatedly in the video signal, in each of the two sets of image data, a pair of the left-eye image data and a pair of the right-eye image data in the input video signal being successively arranged, respectively.

In one embodiment, the timing controller arranges, in the display signal, the left-eye image data and the right-eye image data of the video signal.

In one embodiment, in the case where the display is performed in the stereoscopic display mode, the timing controller sets the frame rate of the display signal to be equal to the frame rate of the video signal, and in the case where the display is performed in the planar display mode, the timing controller sets the frame rate of the display signal to be the half of the frame rate of the video signal.

In one embodiment, the liquid crystal display device further includes a writing state signal transmitting circuit for transmitting a writing state signal indicating the writing state of the plurality of pixels.

In one embodiment, in each of the plurality of pixels, overdrive driving is performed based on the left-eye image data and the right-eye image data written in one or more preceding vertical scanning periods.

The stereoscopic display system according to the present invention includes: the above-described liquid crystal display device; and shutter glasses having a left-eye shutter which is opened in a period in which the liquid crystal display device displays a left-eye image and a right-eye shutter which is opened in a period in which the liquid crystal display device displays a right-eye image.

ADVANTAGEOUS EFFECTS OF INVENTION

The liquid crystal display device and the stereoscopic display system according to the present invention can perform stereoscopic display with suppressed display unevenness. In addition, according to the present invention, it is possible to provide a liquid crystal display device and a stereoscopic display system with low power consumption in which a stereoscopic display mode and a planar display mode can be switched.

BRIEF DESCRIPTION OF DRAWINGS

FIG. 1 is a schematic diagram of a liquid crystal display device and a stereoscopic display system in a first embodiment of the present invention, in which (a) is a schematic diagram of the stereoscopic display system which displays a left-eye image in a stereoscopic display mode, (b) is a schematic diagram of the stereoscopic display system which displays a right-eye image in the stereoscopic display mode, and (c) is a schematic diagram of the liquid crystal display device which performs display in a planar display mode.

In FIG. 3, (a) is a schematic diagram of the stereoscopic display mode of the stereoscopic display system shown in FIG. 2, and (b) is a schematic diagram of the planar display mode.

FIG. 4 is a schematic diagram showing a writing state signal transmitting circuit in the stereoscopic display system shown in FIG. 2 and the open/close of shutter glasses.

In FIG. 5, (a) is a schematic diagram of image data included in the input video signal input into the liquid crystal display device shown in FIG. 2 in the stereoscopic display mode, (b) is a schematic diagram of image data included in a video signal, and (c) is a schematic diagram of image data included in a display signal.

In FIG. 6, (a) is a schematic diagram of image data included in the input video signal input into the liquid crystal display device shown in FIG. 2 in the planar display mode, (b) is a schematic diagram of image data included in a video signal, and (c) is a schematic diagram of image data included in a display signal.

In FIG. 7, (a) is a schematic diagram of a stereoscopic display mode of a liquid crystal display device and a stereoscopic display system in a comparative example 1, and (b) is a schematic diagram of a planar display mode.

In FIG. 8, (a) is a schematic diagram of image data included in an input video signal input into the liquid crystal display device shown in FIG. 7 in the stereoscopic display mode, (b) is a schematic diagram of image data included in a video signal, and (c) is a schematic diagram of image data included in a display signal.

In FIG. 9, (a) is a schematic diagram of image data included in an input video signal input into the liquid crystal display device shown in FIG. 7 in the planar display mode, (b) is a schematic diagram of image data included in a video signal, and (c) is a schematic diagram of image data included in a display signal.

In FIG. 12, (a) is a schematic diagram showing the time change of the lighting of a backlight unit in the stereoscopic display system shown in FIG. 2, and (b) is a schematic diagram showing the timings of the turning-on of the backlight unit, the writing into each pixel, and the shutter glasses.

In FIG. 13, (a) is a schematic diagram showing the time change of the lighting of a backlight unit in the stereoscopic display system shown in FIG. 2, and (b) is a schematic diagram showing the timings of the turning-on of the backlight unit, the writing into each pixel, and the shutter glasses.

FIG. 14 is a schematic diagram of a liquid crystal panel in the liquid crystal display device shown in FIG. 2.

FIG. 17 is a diagram for illustrating the driving of the stereoscopic display system shown in FIG. 2, in which (a) is a schematic diagram showing the polarity of written pixel and the sequence of writing, and (b) is a waveform diagram of electric potential of a specific source line by using electric potential of a counter electrode as a reference in one frame updating period.

FIG. 18 is a diagram for illustrating the driving of the stereoscopic display system shown in FIG. 2, in which (a) is a waveform diagram of electric potential of a source line by using electric potential of a counter electrode as a reference, (b) is a waveform diagram of a scanning signal voltage, (c) is a waveform diagram of electric potential of a pixel electrode by using electric potential of a counter electrode as a reference, (d) is a schematic diagram showing the turning on/off of the backlight unit, and (e) is a schematic diagram showing the open/close of the shutter glasses.

In FIG. 30, (a) is a schematic diagram of the stereoscopic display system shown in FIG. 29, and (b) is a schematic diagram of a liquid crystal panel in the liquid crystal display device shown in (a).

FIG. 31 is a diagram for illustrating the driving of the stereoscopic display system shown in FIG. 29, in which (a) is a waveform diagram of a display signal voltage, (b) is a waveform diagram of a scanning signal voltage, (c) is a waveform diagram of electric potential of a pixel electrode by using electric potential of a counter electrode as a reference, (d) is a schematic diagram showing the turning on/off of the backlight unit, and (e) is a schematic diagram showing the open/close of the shutter glasses.

In FIG. 32, (a) is a schematic diagram of a liquid crystal display device and a stereoscopic display system in a comparative example 3, and (b) is a schematic diagram of a liquid crystal panel in the liquid crystal display device shown in (a).

FIG. 33 is a diagram for illustrating the driving of the stereoscopic display system in the comparative example 3, in which (a) is a waveform diagram of electric potential of a source line by using electric potential of a counter electrode as a reference, (b) is a waveform diagram of a scanning signal voltage, (c) is a waveform diagram of electric potential of a pixel electrode by using electric potential of the counter electrode as a reference, (d) is a schematic diagram showing the turning on/off of the backlight unit, and (e) is a schematic diagram showing the open/close of the shutter glasses.

FIG. 36 is a diagram for illustrating the driving of the stereoscopic display system shown in FIG. 29, in which (a) is a schematic diagram showing the polarity of written pixel and the sequence of writing, and (b) is a waveform diagram of electric potential of a specific source line by using electric potential of a counter electrode as a reference in one frame updating period.

FIG. 37 is a diagram for illustrating the driving of the stereoscopic display system shown in FIG. 29, in which (a) is a waveform diagram of electric potential of a source line by using electric potential of a counter electrode as a reference, (b) is a waveform diagram of a scanning signal voltage, (c) is a waveform diagram of electric potential of a pixel electrode by using electric potential of the counter electrode as a reference, (d) is a schematic diagram showing the turning on/off of the backlight unit, and (e) is a schematic diagram showing the open/close of the shutter glasses.

FIG. 42 is a diagram for illustrating the problem of cross-talk between frames in stereoscopic display, and is a diagram showing the condition where the left-eye image is visible as residual image when the right-eye image is displayed.

FIG. 43 is a diagram showing the variation of a pixel voltage |Vpe| in the liquid crystal display device in the embodiment of the present invention.

DESCRIPTION OF EMBODIMENTS

Figure 2:
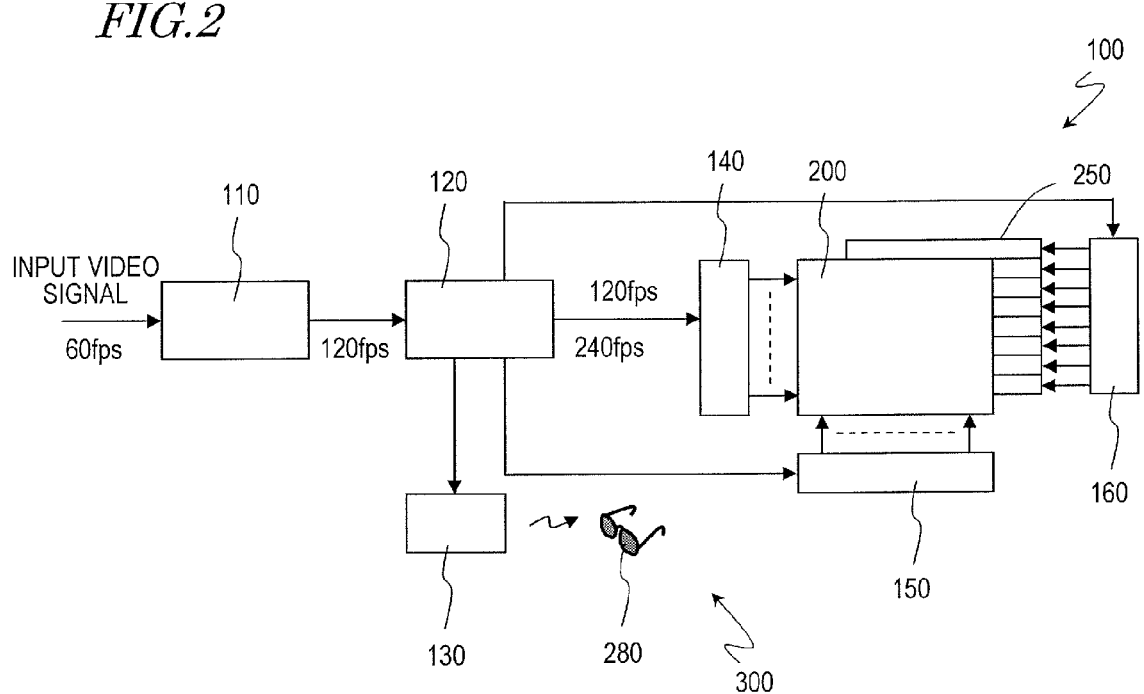
FIG. 2 is a schematic diagram of the stereoscopic display system shown in FIG. 1.

Hereinafter with reference to the drawings, embodiments of a liquid crystal display device and a stereoscopic display system according to the present invention will be described. However, the present invention is not limited to the embodiments described below.

(Embodiment 1)

Hereinafter, a first embodiment of a liquid crystal display device and a stereoscopic display system according to the present invention will be described. First with reference to FIG. 1, a liquid crystal display device 100 and a stereoscopic display system 300 in this embodiment will be described. The stereoscopic display system 300 is provided with the liquid crystal display device 100 and shutter glasses 280. The liquid crystal display device 100 is provided with a plurality of pixels.

The liquid crystal display device 100 performs display at least in a stereoscopic display mode. In the stereoscopic display mode, the liquid crystal display device 100 displays a left-eye image for a certain period of time, and displays a right-eye image for another period of time. In this way, the liquid crystal display device 100 which performs display in the stereoscopic display mode displays the left-eye image and the right-eye image in different periods of time.

In the stereoscopic display mode, the liquid crystal display device 100 is used together with shutter glasses 280. The shutter glasses 280 have a left-eye shutter 282 and a right-eye shutter 284. The shutter glasses 280 are designed so that an observer can wear the glasses.

The shutter glasses 280 is controlled based on a signal output from the liquid crystal display device 100. In the case where the liquid crystal display device 100 displays the left-eye image, the left-eye shutter 282 is opened, and in the case where the liquid crystal display device 100 displays the right-eye image, the right-eye shutter 284 is opened. Accordingly, the left eye of the observer who wears the shutter glasses 280 visually recognizes the left-eye image of the liquid crystal display device 100 via the left-eye shutter 282 of the shutter glasses 280. The right eye of the observer visually recognizes the right-eye image of the liquid crystal display deice 100 via the right-eye shutter 284 of the shutter glasses 280. The shutter glasses 280 are also referred to as active glasses.

As shown in FIG. 1(a), in the case where the liquid crystal display device 100 displays a left-eye image in the stereoscopic display mode, the left-eye shutter 282 of the shutter glasses 280 is opened but the right-eye shutter 284 is closed.

For example, the shutter glasses 280 are worn on the head portion of the observer similarly to so-called glasses for correcting nearsightedness, farsightedness, astigmatism, or the like, and the observer visually recognizes the liquid crystal display deice 100 via the shutter glasses 280. The shutter glasses 280 are designed so as to be worn simultaneously with the so-called glasses for correcting nearsightedness, farsightedness, astigmatism, or the like.

For example, the left-eye shutter 282 and the right-eye shutter 284 are fabricated by using liquid crystal, respectively. Specifically, the left-eye shutter 282 and the right-eye shutter 284 may be fabricated by using TN (Twisted Nematic) liquid crystal, and alternatively, may be fabricated by using OCB (Optically Compensated Bend) liquid crystal.

As shown in FIG. 1(b), in the case where the liquid crystal display device 100 displays a right-eye image in the stereoscopic display mode, the right-eye shutter 284 of the shutter glasses 280 is opened, and the left-eye shutter 282 is closed. The left-eye image and the right-eye image displayed by the liquid crystal display device 100 in the stereoscopic display mode are switched at a high speed. In response, the open/close of the left-eye and right-eye shutters 282 and 284 are switched at a high speed. In this way, the observer can visually recognize the image displayed on the liquid crystal display device 100 in the stereoscopic manner.

Herein, it is noted that the liquid crystal display device 100 can perform display not only in the stereoscopic display mode but also in the planar display mode. The liquid crystal display device 100 performs display by switching its mode between the stereoscopic display mode and the planar display mode. In general, the stereoscopic display mode may be sometimes referred to as 3D display, and the planar display mode may be sometimes referred to as 2D display.

FIG. 1(c) shows a schematic diagram of the liquid crystal display device 100 which performs display in the planar display mode. In the case where the liquid crystal display device 100 performs display in the planar display mode, the observer can visually recognize the normal display without using the shutter glasses 280.

For example, in the case where the input video signal includes information indicating for which mode, the stereoscopic display mode or the planar display mode, the image data included in the input video signal is, the switching between the stereoscopic display mode and the planar display mode is performed based on the input video signal. Alternatively, the switching between the stereoscopic display mode and the planar display mode may be performed based on an instruction from an observer and the like.

In the following description of the present specification, unless it is specifically mentioned, the term "a vertical scanning period" or "a frame period" means a period from a time at which a certain pixel is selected to a time at which the pixel is selected next, and typically means a period from a time at which a scanning line for selecting a pixel to which the writing is performed is selected to a time at which the scanning line is selected next. One vertical scanning period in a general liquid crystal panel which does not perform double-speed driving corresponds to one frame period of the input video signal in the case where the input video signal is a signal for non-interlace driving, and corresponds to one field period of the input video signal in the case where the input video signal is a signal for interlace driving. For example, in the case where the input video signal is an NTSC signal, one vertical scanning period of the liquid crystal display device is 16.7 ms which is the reciprocal of a field frequency (60 Hz) of the NTSC signal. In the liquid crystal display device, the writing is performed to all of the pixels in both of odd-numbered fields and even-numbered fields of the input video signal, so that the reciprocal of the field frequency of the NTSC signal corresponds to the vertical scanning period. In each vertical scanning period, a difference (a period) between a time at which a certain scanning line is selected and a time at which the next scanning line is selected is referred to as one horizontal scanning period (1H).

In the following description of the present specification, the term "a frame updating period" corresponds to a period from a time at which the writing of a certain frame is started, to a time at which the writing of the next frame is started. In other words, "the frame updating period" corresponds to a period from a time at which a scanning line corresponding to a certain frame (typically, a scanning line positioned at an upper end of the liquid crystal display device) is first selected, to a time at which a scanning line corresponding to the next frame (typically, a scanning line positioned at an upper end of the liquid crystal display device) is first selected. The above-described "vertical scanning period" is defined for each pixel or for each row of pixels of the liquid crystal display device, but "the frame updating period" is defined for the liquid crystal display device. Typically, the length of "a vertical scanning period" and the length of "a frame updating period" are equal to each other, but the starting points are not the same in accordance with the pixel to be focused on.

In the following description of the present specification, when "a vertical scanning period" or "a frame period" is simply mentioned, "the vertical scanning period" or "the frame period" means "a vertical scanning period of a liquid crystal display device or a liquid crystal panel" or "a frame period of a liquid crystal display device or a liquid crystal display panel", and hence "the vertical scanning period" or "the frame period" (i.e. "the vertical scanning period of the liquid crystal display device or the liquid crystal panel" or "the frame period of the liquid crystal display device or the liquid crystal panel) has another meaning from "a vertical scanning period of the input video signal" or "a frame period of the input video signal". The "vertical scanning period of the input video signal" is a period of one frame or one field of the input video signal.

As described above, the liquid crystal display device displays a left-eye image and a right-eye image in the stereoscopic display mode. However, if the period in which the left-eye image and the right-eye image are continuously displayed, respectively, is long, the observer visually recognizes the left-eye image or the right-eye image itself, and cannot visually recognize a stereoscopic image. Accordingly, it is preferred that the period in which the left-eye image or the right eye image is continuously displayed is short.

In the liquid crystal display device 100, a plurality of scanning lines are selected in a frame updating period, and the writing is performed to pixels corresponding to the selected scanning lines. Typically, in the frame updating period of the liquid crystal display device 100, the writing is performed sequentially to pixels for each row from pixels in a row corresponding to the upper end scanning line of the liquid crystal display device to pixels in a row corresponding to a lower end scanning line of the liquid crystal display device. For example, in a frame updating period for the writing of a left-eye image, the writing of left-eye image data is performed to pixels for each row from pixels in a row corresponding to the upper end scanning line of the liquid crystal display device 100 to pixels in a row corresponding to a lower end scanning line of the liquid crystal display device 100. In a frame updating period for the writing of a right-eye image, the writing of right-eye image data is performed to pixels for each row from pixels in a row corresponding to the upper end scanning line of the liquid crystal display device 100 to pixels in a row corresponding to a lower end scanning line of the liquid crystal display device 100. Alternatively, the plurality of pixels may be divided into one or more blocks corresponding to two or more rows, respectively. After the writing is sequentially performed with the same polarity to the pixels in one of the odd-numbered row and the even-numbered row in the block, the writing may be performed sequentially to the pixels in the other one of the rows in the block with different polarity from the above-described pixels.

In the frame updating period in which the image data to be written is changed from the right-eye image data to the left-eye image data, there exists a period in which although the writing of the left-eye image data is completed in part of the liquid crystal display device 100 (e.g. in an upper portion), the writing of the left-eye image data is not completed and the written right-eye image data remains in another part of the liquid crystal display device 100 (e.g. in a lower portion). Similarly, in the frame updating period in which the image data to be written is changed from the left-eye image data to the right-eye image data, there exists a period in which although the writing of the right-eye image data is completed in part of the liquid crystal display device 100 (e.g. in the upper portion), the writing of the right-eye image data is not completed and the written left-eye image data remains in another part of the liquid crystal display device 100 (e.g. in the lower portion). In such a period, both of the left-eye image data and the right-eye image data are written as a whole of the liquid crystal display device 100. If the observer observes such display, the observer visually recognizes both of the left-eye image and the right-eye image. Such phenomenon is also referred to as cross-talk.

In the liquid crystal display device 100, in the stereoscopic display mode, the left-eye image data and the right-eye image data are alternately written in every two successive frame updating periods, and in a period in which the liquid crystal display device 100 displays both of the left-eye image and the right-eye image, the backlight unit 250 is turned off, and/or both of the left-eye shutter 282 and the right-eye shutter 284 of the shutter glasses 280 are closed. In this way, the cross-talk can be suppressed.

In the liquid crystal display device 100, in the latter frame updating period of the two frame updating periods in which the left-eye image data is successively written, the backlight unit 250 is turned on, and the left-eye shutter 282 of the shutter glasses 280 is opened, so that the observer visually recognizes the left-eye image. Similarly, in the latter frame updating period of the two frame updating periods in which the right-eye image data is successively written, the backlight unit 250 is turned on, and the right-eye shutter 284 of the shutter glasses 280 is opened, so that the observer visually recognizes the right-eye image.

A conventional liquid crystal display device is driven at the vertical scanning frequency of 60 Hz. However, in recent years, in order to realize high-speed driving, liquid crystal display devices driven at the vertical scanning frequency of 120 Hz are produced. The driving of such liquid crystal display devices is also referred to as double-speed driving. When such a liquid crystal display device of double-speed driving is driven at the vertical scanning frequency of 120 Hz and the stereoscopic display is performed without degrading the moving picture performance, it is necessary to switch the left-eye image and the right-eye image for every frame updating period. In such a case, for example, a blanking time from a time at which the right-eye image data is written in all of the pixels to a time at which the writing of the left-eye image data is started next is only 1 msec. or less. Several milliseconds are required as the time period from a time at which the right-eye image data is written in the lower end pixel of the liquid crystal display device to a time at which liquid crystal molecules response. For this reason, if the right-eye shutter is opened after the liquid crystal molecules in the lower portion of the liquid crystal display device response, the left-eye image data is already written in the pixels in the upper portion of the liquid crystal display device. Therefore, the observer visually recognizes the left-eye image in addition to the right-eye mange. Thus, the cross talk occurs. On the other hand, in the case where a liquid crystal display device driven at the vertical scanning frequency of 240 Hz is used, the left-eye image and the right-eye image can be written twice, respectively, in a period in which the left-eye image and the right-eye image are written once, respectively, in the liquid crystal display device driven at the vertical scanning frequency of 120 Hz. For this reason, for example, even if the shutter glasses are opened in the second frame updating period of 4.2 msec. or more, both of the left-eye image and the right-eye image are not visually recognized, so that the occurrence of cross-talk can be suppressed. Herein, when a single stereoscopic image is visually recognized by a single left-eye image and a single right-eye image, it can be said that a stereoscopic image of 60 Hz is visually recognized by driving the liquid crystal display device at the vertical scanning frequency of 240 Hz.

As described above, it is preferred that the liquid crystal display device be driven at a relatively higher vertical scanning frequency in the stereoscopic display mode. However, in the case where the liquid crystal display device is driven at such a relatively higher vertical scanning frequency also in the planar display mode, the influence of signal delay of the liquid crystal display device increases, and appropriate display cannot be performed in some cases. In addition, if a liquid crystal display device in which a line width is increased and the influence of signal delay is suppressed is produced, the aperture ratio is disadvantageously reduced due to the increase of the line width.

The liquid crystal display device 100 in this embodiment is driven at a lower vertical scanning frequency in the planar display mode than in the stereoscopic display mode. Accordingly, the power consumption in the planar display mode can be reduced without decreasing the aperture ratio. For example, the liquid crystal display device 100 is driven at the vertical scanning frequency of 240 Hz in the stereoscopic display mode, and driven at the vertical scanning frequency of 120 Hz in the planar display mode. In this case, if the input video signal is the NTSC signal, the vertical scanning period of the input video signal is 16.7 ms (=1/60), the vertical scanning period in the stereoscopic display mode in the liquid crystal display device 100 is 4.2 ms (=1/240), and the vertical scanning period in the planar display mode is 8.4 ms (=1/120).

Hereinafter, with reference to FIG. 2, a liquid crystal display device 100 and a stereoscopic display system 300 will be described. FIG. 2 shows a schematic diagram of the liquid crystal display device 100 and the stereoscopic display system 300. The liquid crystal display device 100 includes a frame rate control circuit 110, a timing controller 120, a writing state signal transmitting circuit 130, a scanning signal driving circuit 140, a display signal driving circuit 150, a backlight driving circuit 160, a liquid crystal panel 200, and a backlight unit 250. The scanning signal driving circuit 140 is also referred to as a gate driver, and the display signal driving circuit 150 is also referred to as a source driver.

The liquid crystal panel 200 has a plurality of pixels arranged in a matrix of a plurality of rows and a plurality of columns. Typically, red pixels, green pixels and blue pixels are provided as the pixels, and a color display pixel constituted by a red pixel, a green pixel, and a blue pixel functions as a display unit of an arbitrary color. The color display pixel may further have any other pixels than the red, green, and blue pixels (e.g. a yellow pixel). Although not shown in the figure, the liquid crystal panel 200 includes a front substrate, a back substrate, and a liquid crystal layer sandwiched therebetween.

Herein, an input video signal having a frame rate of 60 fps is input into the frame rate control circuit 110. For example, the input video signal is the NTSC signal. The frame rate control circuit 110 generates a video signal having a higher frame rate than the frame rate of the input video signal based on the input video signal. The frame rate of the video signal generated by the frame rate control circuit 110 is a predetermined value, so that the processing is also referred to as FRC (Frame Rate Control). The number of fields per second included in the input video signal displayed on a general television device is 60, and the frame rate of the input video signal is expressed as 60 fps (frames per second).

For example, the frame rate control circuit 110 generates a video signal having a frame rate of 120 fps based on the input video signal having the frame rate of 60 fps. In the case of the stereoscopic display mode, the video signal includes image data to be displayed in the stereoscopic display mode. In the case of the planar display mode, the video signal includes image data to be displayed in the planar display mode. In the case where the video signal is expressed as 24 p based on the BD standard or the like, for example, 2-3 pull-down conversion is performed before the video signal is input into the frame rate control circuit 110, and an input video signal having a frame rate of 60 fps is input into the frame rate control circuit 110.

The timing controller 120 controls the writing state signal transmitting circuit 130, the scanning signal driving circuit 140, the display signal driving circuit 150, and the backlight driving circuit 160. The timing controller 120 generates a display signal based on the video signal, and outputs the display signal to the display signal driving circuit 150. In the case where the video signal includes the image data to be displayed in the stereoscopic display mode, the timing controller 120 sets the frame rate of the display signal to be 240 fps. In the case where the video signal includes the image data to be displayed in the planar display mode, the timing controller 120 sets the frame rate of the display signal to be 120 fps. As described above, the timing controller 120 makes the frame rates of the display signals different depending on the display modes. The scanning signal driving circuit 140 supplies a scanning signal for selecting a pixel to which the writing is performed in the liquid crystal panel 200. The display signal driving circuit 150 supplies a display signal to the selected pixel in the liquid crystal panel 200. The scanning signal driving circuit 140 and the display signal driving circuit 150 drive the liquid crystal panel 200 at the vertical scanning frequency in accordance with the frame rate of the display signal. In this way, the timing controller 120 makes the frame rates of the display signal different depending on the display modes, so as to make the vertical scanning frequencies of the liquid crystal panel 200 different depending on the display modes.

The writing state signal transmitting circuit 130 transmits a writing state signal indicating the writing state of a plurality of pixels in the stereoscopic display mode. The shutter glasses 280 open/close the left-eye shutter 282 and the right-eye shutter 284 base on the writing state signal. The backlight driving circuit 160 drives the backlight unit 250.

Hereinafter, with reference to FIG. 3 to FIG. 6, the stereoscopic display mode and the planar display mode of the liquid crystal display device 100 in this embodiment will be described.

First, with reference to FIG. 3(a), FIG. 4, and FIG. 5, the stereoscopic display mode of the liquid crystal display device 100 and the stereoscopic display system 300 will be described. FIG. 3(a) is a schematic diagram of the liquid crystal display device 100 which performs display in the stereoscopic display mode. FIG. 4 is a schematic diagram of the writing state signal transmitting circuit 130 and the open/close of the shutter glasses 280. The image data shown in FIG. 3(a) is enlarged and shown in FIG. 5. FIG. 5(a) is a schematic diagram of image data included in an input video signal, FIG. 5(b) is a schematic diagram of image data included in a video signal, and FIG. 5(c) is a schematic diagram of image data included in a display signal.

Herein, the input video signal having the frame rate of 60 fps is input into the frame rate control circuit 110, and the input video signal includes image data to be displayed in the stereoscopic display mode. In the input video signal, left-eye image data and right-eye image data are alternately shown, respectively. Among the frame rate of 60 fps of the input video signal, the left-eye image data corresponds to 30 fps, and the right-eye image data corresponds to 30 fps. In the input video signal, left-eye image data L1, right-eye image data R1, left-eye image data L2, right-eye image data R2, . . . are arranged in this order (see also FIG. 5(a)). In the following description, in order to avoid verbose description, the left-eye image data L1, L2, . . . may be simply referred to as image data L1, L2, . . . , and the right-eye image data R1, R2, . . . may be simply referred to as image data R1, R2, . . . , in some cases. Although not shown in the figures, before the left-eye image data L1, right-eye image data R0 and the left-eye image data L0 are arranged.

The frame rate control circuit 110 generates a video signal having a higher frame rate than the frame rate of 60 fps of the input video signal based on the input video signal. For example, the frame rate of the video signal is set to be 120 fps. The frame rate control circuit 110 duplicates one set of left-eye image data and right-eye image data of the input video signal, and the two data sets are arranged repeatedly in the video signal. Herein, in the video signal, image data R0, L1, R1, L1, R1, L2, R2, . . . are arranged in this order (see also FIG. 5(b)). As described above, the frame rate of the video signal is set to be 120 fps, and the left-eye image data corresponds to 60 fps and the right-eye image data corresponds to 60 fps. In this way, the frame rate of the video signal (120 fps) is set to be twice as high as the frame rate of the input video signal (60 fps). Even in the case where the liquid crystal panel 200 complies with Full High-vision standard (1920×1080), the frame rate control circuit 110 can be produced by using one application specific integrated circuit (ASIC) with relatively higher versatility.

Based on the video signal output from the frame rate control circuit 110, the timing controller 120 controls the writing state signal transmitting circuit 130, the scanning signal driving circuit 140, the display signal driving circuit 150, and the backlight driving circuit 160. The timing controller 120 generates a display signal having a frame rate of 240 fps based on the video signal having the frame rate of 120 fps. The timing controller 120 duplicates the left-eye image data and the right-eye image data of the video signal, respectively, and successively arranges a pair of left-eye image data and a pair of right eye image data, respectively, in the display signal. Specifically, in the display signal, image data of R0, R0, L1, L1, R1, R1, L1, L1, R1, R1, L2, L2, . . . are arranged in this order (see also FIG. 5(c)). The frame rate of the display signal (240 fps) is set to be twice as high as the frame rate of the video signal (120 fps).

The timing controller 120 outputs the display signal to the display signal driving circuit 150. Based on the control of the timing controller 120, the scanning signal driving circuit 140 and the display signal driving circuit 150 drive the liquid crystal panel 200 at the vertical scanning frequency of 240 Hz. At this time, the left-eye image data corresponds to 120 fps, and the right-eye image data corresponds to 120 fps. Based on the control by the timing controller 120, the writing state signal transmitting circuit 130 transmits a writing state signal to the shutter glasses 280.

Herein with reference to FIG. 4, the operation of the shutter glasses 280 based on the writing state signal transmitting circuit 130 will be described.

The writing state signal transmitting circuit 130 outputs a writing state signal to the shutter glasses 280. Based on the signal, when the liquid crystal panel 200 displays the left-eye image, the left-eye shutter 282 of the shutter glasses 280 is opened, and when the liquid crystal panel 200 displays the right-eye image, the right-eye shutter 284 of the shutter glasses 280 is opened. For example, a two-level signal having two levels of High corresponding to the right-eye image and Low corresponding to the left-eye image is output from the timing controller 120 to the writing state signal transmitting circuit 130. Based on the two-level signal, the writing state signal transmitting circuit 130 outputs a two-level signal of High and Low as the writing state signal to the shutter glasses 280. For example, when the writing state signal is Low, and the liquid crystal panel 200 displays the left-eye image, the left-eye shutter 282 is opened, and the right-eye shutter 284 is closed. When the writing state signal is High, and the liquid crystal panel 200 displays the right-eye image, the right-eye shutter 284 is opened, and the left-eye shutter 282 is closed. It is noted that the writing state signal may be an infrared ray signal, a signal complying with Bluetooth standard, or a radio signal. As described above, the writing state signal is preferably transmitted by wireless.

Now, FIG. 3(a) is referred to again. As described above, in the display signal, a pair of left-eye image data and a pair of right-eye image data are successively arranged. The backlight driving circuit 160 controls the backlight unit 250, so that the backlight unit 250 turns off in accordance with the former one of respective pairs of left-eye image data and right-eye image data which are successively arranged, and turns on in accordance with the latter image data. In this way, the turning on/off of the backlight unit 250 is controlled, so that even if the liquid crystal panel 200 performs hold-type driving, the observer recognizes the display as impulse-type display.

Next, with reference to FIG. 3(b) and FIG. 6, the planar display mode of the liquid crystal display device 100 will be described. FIG. 3(b) is a schematic diagram of the liquid crystal display device 100 which performs display in the planar display mode. The image data included in the signal shown in FIG. 3(b) is enlarged and shown in FIG. 6. FIG. 6(a) is a schematic diagram of image data included in an input video signal, FIG. 6(b) is a schematic diagram of image data included in a video signal, and FIG. 6(c) is a schematic diagram of image data included in a display signal.

The input video signal having the frame rate of 60 fps is input into the frame rate control circuit 110, and the input video signal includes image data to be displayed in the planar display mode. In the input video signal, image data N1, N2, N3, N4, . . . are arranged in this order (see also FIG. 6(a)). Although not shown in the figure, before the image data N1, image data N0 is arranged.

The frame rate control circuit 110 generates a video signal having a higher frame rate than the frame rate of 60 fps of the input video signal based on the input video signal. Herein, the frame rate of the video signal is set to be 120 fps. For example, the frame rate control circuit 110 generates one interpolation image data based on two successive image data of the input video signal. In the video signal, the two successive image data are arranged, and the interpolation image data is arranged between the two successive image data. Specifically, the frame rate control circuit 110 generates interpolation image data C0 based on the image data N0 and N1. In the video signal, the image data N0 and N1 of the input video signal are arranged, and the interpolation image data C0 is arranged between the image data N0 and the image data N1. Similarly, the frame rate control circuit 110 generates interpolation image data C1 based on the image data N1 and N2. In the video signal, the interpolation image data C1 and the image data N2 are arranged after the image data N1 of the input video signal. In this way, by using interpolation image data generated based on two successive image data, the moving picture displaying performance can be improved. Herein, in the video signal, image data C0, N1, C1, N2, C2, N3, C3, N4 . . . are arranged in this order (see also FIG. 6(b)). As described above, in the video signal, image data included in the input video signal and interpolation image data generated by interpolation are alternately arranged, and the frame rate of the video signal (120 fps) is set to be twice as high as the frame rate of the input video signal (60 fps).

Based on the video signal output from the frame rate control circuit 110, the timing controller 120 controls the scanning signal driving circuit 140, the display signal driving circuit 150, and the backlight driving circuit 160. The timing controller 120 generates a display signal based on the video signal, and outputs the display signal to the display signal driving circuit 150. The frame rate of the display signal is set to be 120 fps similarly to the frame rate of the video signal. Similarly to the video signal, in the display signal, image data C0, N1, C1, N2, C2, N3, C3, N4, . . . are arranged in this order (see also FIG. 6(c)). The frame rate of the display signal (120 fps) is set to be equal to the frame rate of the video signal (120 fps).

The scanning signal driving circuit 140 and the display signal driving circuit 150 drive the liquid crystal panel 200 at the vertical scanning frequency of 120 Hz. In the planar display mode, the backlight driving circuit 160 controls the backlight unit 250 so that the backlight unit 250 is turned on for all of the periods. In the case where the backlight unit 250 has a plurality of illuminating regions of which the turning on and off can be individually controlled for each area of a display screen of the liquid crystal panel 200, the backlight driving circuit 160 may control the turning on/off of the illuminating regions of the backlight unit 250 in accordance with the gradation levels of pixels in the areas of the display screen.

As described above, in the liquid crystal display device 100, by the control of the timing controller 120, the vertical scanning frequency of the liquid crystal panel 200 is varied depending on the display modes. Specifically, the liquid crystal panel 200 is driven at the vertical scanning frequency of 240 Hz in the stereoscopic display mode, and driven at the vertical scanning frequency of 120 Hz in the planar display mode. Accordingly, the increase of power consumption in the planar display mode can be suppressed.

As is understood from the comparison between FIG. 5 and FIG. 6, the frame rate control circuit 110 increases the frame rate by generating interpolation image data based on the successive image data of the input video signal in the planar display mode, and increases the frame rate by duplicating image data of the input video signal in the stereoscopic display mode. In this way, in the stereoscopic display mode, the increase of frame rate can be simply and easily performed by duplicating the image data, instead of generating the interpolation image data. Alternatively, the frame rate control circuit 110 may generate interpolation left-eye image data based on successive left-eye image data included in the input video signal also in the stereoscopic display mode, and similarly may generate interpolation right-eye image data based on right-eye image data included in the input video signal, thereby further improving the moving picture display performance in the stereoscopic display mode.

Hereinafter, the advantage of the liquid crystal display device 100 and the stereoscopic display system 300 in this embodiment will be described as compared with a liquid crystal display device 700 and a stereoscopic display system 900 in a comparative example 1. First, with reference to FIG. 7, the liquid crystal display device 700 and the stereoscopic display system 900 in the comparative example 1 will be described. The stereoscopic display system 900 includes the liquid crystal display device 700 and shutter glasses 880. The liquid crystal display device 700 includes a frame rate control circuit 710, a timing controller 720, a writing state signal transmitting circuit 730, a scanning signal driving circuit 740, a display signal driving circuit 750, a backlight driving circuit 760, a liquid crystal panel 800, and a backlight unit 850. The liquid crystal display device 700 and the stereoscopic display system 900 are different from the liquid crystal display device 100 and the stereoscopic display system 300 in that the frame rate of a video signal generated by the frame rate control circuit 710 is set to be 240 fps, and the liquid crystal panel 800 is driven at the vertical scanning frequency of 240 Hz in both of the stereoscopic display mode and the planar display mode.

With reference to FIG. 7(a) and FIG. 8, the stereoscopic display mode of the liquid crystal display device 700 and the stereoscopic display system 900 will be described. FIG. 7(a) is a schematic diagram of the liquid crystal display device 700 which performs display in the stereoscopic display mode. The image data shown in FIG. 7(a) is enlarged and shown in FIG. 8. FIG. 8(a) is a schematic diagram of image data included in an input video signal, FIG. 8(b) is a schematic diagram of image data included in a video signal, FIG. 8(c) is a schematic diagram of image data included in a display signal.

An input video signal having a frame rate of 60 fps is input into the frame rate control circuit 710. In the input video signal, image data L1, R1, L2, R2, . . . are arranged in this order (see also FIG. 8(a)). Although not shown in the figure, before the left-eye image data L1, right-eye image data R0 and left-eye image data L0 are arranged. In this way, when the left-eye image data and the right-eye image data are alternately arranged in the input video signal, the display is performed in the stereoscopic display mode.

The frame rate control circuit 710 generates a video signal having a higher frame rate than the frame rate of 60 fps of the input video signal based on the input video signal. Herein, the frame rate of the video signal is set to be 240 fps. The frame rate control circuit 710 duplicates left-eye image data and right-eye image data of the input video signal, respectively, thereby obtaining one set of image data in which two left-eye image data and two right-eye image data are successively arranged. The thus-obtained one set of image data is repeated twice and arranged. Accordingly in the video signal output from the frame rate control circuit 710, image data R0, R0, L1, L1, R1, R1, L1, L1, R1, R1, L2, L2, . . . are arranged in this order (see also FIG. 8(b)). As described above, in the video signal, two left-eye image data and two right-eye image data are alternately arranged.

In the case where the liquid crystal panel 800 complies with Full High-vision standard (1920×1080), the frame rate control circuit 710 can be produced by using two application specific integrated circuits 712a and 712b with relatively higher versatility. The application specific integrated circuit 712a is utilized to drive the left half of the liquid crystal panel 800, and the application specific integrated circuit 712b is utilized to drive the right half of the liquid crystal panel 800.

Based on the video signal output from the frame rate control circuit 710, the timing controller 720 controls the writing state signal transmitting circuit 730, the scanning signal driving circuit 740, the display signal driving circuit 750, and the backlight driving circuit 760. The timing controller 720 generates a display signal based on the video signal, and outputs the display signal to the display signal driving circuit 750. The frame rate of the display signal is set to be 240 fps which is equal to the frame rate of the video signal. In the display signal, image data R0, R0, L1, L1, R1, R1, L1, L1, R1, R1, L2, L2, . . . are arranged in this order (see also FIG. 8(c)). Accordingly, the scanning signal driving circuit 740 and the display signal driving circuit 750 drive the liquid crystal panel 800 at the vertical scanning frequency of 240 Hz.

The backlight driving circuit 760 controls the backlight unit 850, so that the backlight unit 850 turns off corresponding to the former image data of respective left-eye image data and right-eye image data which are successively arranged, and turns on correspondingly to the latter image data. Based on the writing state signal from the writing state signal transmitting circuit 730, the shutter glasses 880 open the left-eye shutter 882 in a period in which the liquid crystal panel 800 displays the left-eye image and open the right-eye shutter 884 in a period in which the liquid crystal panel 800 displays the right-eye image.

Next, with reference to FIG. 7(b) and FIG. 9, the planar display mode of the liquid crystal display device 700 will be described. FIG. 7(b) is a schematic diagram of the liquid crystal display device 700 which performs display in the planar display mode. The image data included in the signal shown in FIG. 7(b) is enlarged and shown in FIG. 9. FIG. 9(a) is a schematic diagram of image data included in an input video signal, FIG. 9(b) is a schematic diagram of image data included in a video signal, and FIG. 9(c) is a schematic diagram of image data included in a display signal.

The input video signal having the frame rate of 60 fps is input into the frame rate control circuit 710. In the input video signal, image data N1, N2, N3, N4, . . . are arranged in this order (see also FIG. 9(a)). Although not shown in the figure, before the image data N1, image data N0 is arranged.

The frame rate control circuit 710 generates a video signal having a frame rate of 240 fps. For example, the frame rate control circuit 710 generates interpolation image data C0a, C0b, and C0c based on the image data N0 and N1 of the input video signal. In the video signal, the image data N0 and N1 are arranged, and the interpolation image data C0a, C0b, and C0c are arranged between the image data N0 and the image data N1. Similarly, the frame rate control circuit 710 generates interpolation image data C1a, C1b, and C1c based on the image data N1 and N2 of the input video signal. In the video signal, the interpolation image data C1a, C1b, and C1c and the image data N2 are arranged after the image data N1. In this way, the frame rate control circuit 710 generates three interpolation image data based on two successive image data included in the input video signal. In the video signal, together with the two successive image data, the three interpolation image data are arranged between the two successive image data. For example, in the video signal, image data N0, C0a, C0b, C0c, N1, C1a, C1b, C1c, N2, C2a, C2b, C2c, N3, C3a, C3b, C3c, N4, . . . are arranged in this order (see also FIG. 9(b)). As described above, the frame rate of the video signal (240 fps) output from the frame rate control circuit 710 is set to be four times as high as the frame rate of the input video signal (60 fps).

Based on the video signal output from the frame rate control circuit 710, the timing controller 720 controls the scanning signal driving circuit 740, the display signal driving circuit 750, and the backlight driving circuit 760. The timing controller 720 generates a display signal based on the video signal, and outputs the display signal to the display signal driving circuit 750. The frame rate of the display signal is set to be 240 fps which is equal to the frame rate of the video signal. In the display signal, image data N0, C0a, C0b, C0c, N1, C1a, C1b, C1c, N2, C2a, C2b, C2c, N3, C3a, C3b, C3c, N4, . . . are arranged in this order (see also FIG. 9(c)). Accordingly, the scanning signal driving circuit 740 and the display signal driving circuit 750 drive the liquid crystal panel 800 at the vertical scanning frequency of 240 Hz. In the planar display mode, the backlight driving circuit 760 controls the backlight unit 850 so that the backlight unit 850 is turned on in all of the periods.

As described above, in the liquid crystal display device 700 in the comparative example 1, the liquid crystal panel 800 is driven at the vertical scanning frequency of 240 Hz irrespective of the stereoscopic display mode and the planar display mode. Accordingly, the power consumption is increased. On the contrary, in the liquid crystal display device 100 in this embodiment, the liquid crystal panel 200 is driven at the vertical scanning frequency of 120 Hz in the planar display mode which is the half in the stereoscopic display mode. Thus, the increase in power consumption can be suppressed. For example, in the case where the liquid crystal panels 200 and 800 are Full High-vision display panels of 60 inches, in the planar display mode, the power consumption of the liquid crystal display device 700 is 24 W and the power consumption of the liquid crystal display device 100 is 15 W.

As described above, in the case where the frame rate control circuit 710 suitable for the liquid crystal panel 800 complying with Full HD standard is produced by using an application specific integrated circuit with relatively higher versatility, it is necessary to use two application specific integrated circuits 712a and 712b. The application specific integrated circuit 712a is utilized to drive the pixels in the left half of the display screen of the liquid crystal panel 800, and the application specific integrated circuit 712b is utilized to drive the pixels in the right half of the display screen of the liquid crystal panel 800. On the other hand, the frame rate control circuit 110 can be produced by using a single application specific integrated circuit with relatively higher versatility. In addition, in the stereoscopic display mode, the liquid crystal panel 200 is driven at the vertical scanning frequency of 240 Hz, so that the timing controller 120 is required to generate a display signal having a frame rate of 240 fps. However, in the stereoscopic display, the duplication of image data is only performed, so that the cost and the circuit scale can be suppressed.

In the above-mentioned description, the frame rate of the input video signal input into the liquid crystal display device 100 is 60 fps, but the present invention is not limited to this. The frame rate of the input video signal may have any other value. For example, the input video signal may be a PAL signal, and the frame rate of the input video signal may be 50 fps. In this case, the frame rate of the video signal is set to be 100 fps, and the frame rate of the display signal is set to be 200 fps in the stereoscopic display mode and set to be 100 fps in the planar display mode.

Hereinafter, with reference to FIG. 10(a), the backlight unit 250 in the liquid crystal display device 100 in this embodiment will be described. Herein, the backlight unit 250 has eight illuminating regions 252 of which the turning on and off can be individually controlled. Each of the illuminating regions 252 is disposed so as to illuminate at least one row of pixels of the liquid crystal panel 200. The pixels provided in the liquid crystal panel 200 are irradiated with any one of the plurality of illuminating regions 252.

For example, a light source (not shown) is disposed correspondingly to the illuminating region 252, and the light source is disposed along the plurality of rows of pixels provided in the liquid crystal panel 200. For example, the light source may be an LED (Laser Emitting Diode), or may be a CCFL (Cold Cathode Fluorescent Lamp). Alternatively, the backlight unit 250 may have a divided light guiding plate, or may have a light guiding plate with slit structure.

In the stereoscopic display mode, the plurality of illuminating regions 252 are sequentially turned on, and then turned off after a predetermined time elapses. In FIG. 10(a), in a certain period, only one illuminating region 252 is turned on, and the other illuminating regions 252 are turned off. Alternatively, two or more illuminating regions 252 may be turned on in a certain period.

Figure 10:
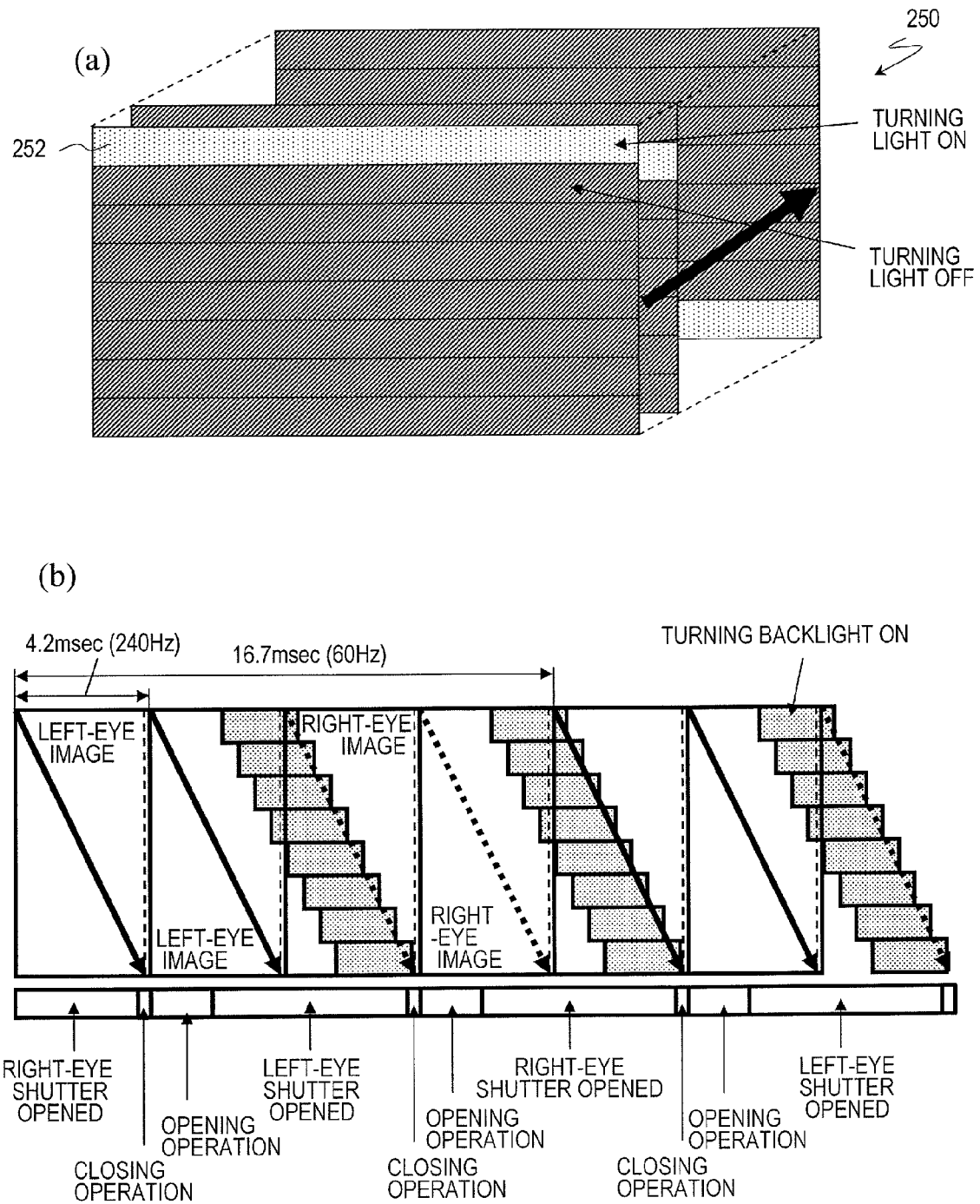
In FIG. 10, (a) is a schematic diagram showing the time change of the lighting of a backlight unit in the stereoscopic display system shown in FIG. 2, and (b) is a schematic diagram showing the timings of the turning-on of the backlight unit, the writing into each pixel, and the shutter glasses.

FIG. 10(b) shows the timings of the writing of left-eye image data and right-eye image data into the liquid crystal panel 200 and the open/close of the shutter glasses 280 in the stereoscopic display mode. Herein, the vertical scanning period is 1/240 (4.2 m) seconds, and the vertical scanning frequency is 240 Hz.

First, the writing of left-eye image data in the liquid crystal panel 200 will be described. As described above, the writing of the left-eye image is successively performed in two frame updating periods. After the second writing of the left-eye image data into the liquid crystal panel 200, the corresponding illuminating region 252 of the backlight unit 250 starts to illuminate. It is noted that in the liquid crystal panel 200, the alignment direction of liquid crystal molecules depends on the previous right-eye image data even after one vertical scanning period or more elapses from the first writing of the left-eye image data. For example, even if the gradation levels of the left-eye image data are the same, in the case where the gradation level of the previously written right-eye image data is different, the alignment direction of liquid crystal molecules is not the same immediately after one vertical scanning period elapses from the first writing of the left-eye image data. Accordingly, after a predetermined time period elapses from the second writing of the left-eye image data, the illumination of the corresponding illuminating region 252 is started.

Herein, immediately before the writing of the right-eye image data, or after a predetermined time period elapses from the writing of right-eye image data, the corresponding illuminating region 252 is turned off. If the liquid crystal molecules response in a short time, the illuminating region 252 should be turned off before the writing of the right-eye image data in principle. However, in actuality, the response of liquid crystal molecules requires a certain amount of time, so that for a while even after the writing of the right-eye image data, the alignment direction of liquid crystal molecules depends on not the right-eye image data but the previously written left-eye image data. For this reason, the illumination of the illuminating region 252 in this period does not cause any actual difference.

Herein, at the start of the frame updating period in which the second writing of left-eye image is performed, the operation for opening the left-eye shutter 282 is started. The left-eye shutter 282 is opened before the illuminating region 252 is first turned on in the frame updating period.

Herein, the period in which each of the illuminating regions 252 is turned on is within the period in which the left-eye shutter 282 is opened. In the period in which the illuminating region 252 is turned on, the left-eye shutter 282 is opened, so that the period in which the illuminating region 252 is turned on corresponds to the luminance of the pixel. As described above, the illumination of the corresponding illuminating region 252 is continued after the writing of the right-eye image data, so that the luminance of left-eye image can be increased. In the liquid crystal display device 100, the left-eye image and the right-eye image are displayed in different periods, so that if the luminance in an edge portion of a certain object included in an image which is displayed in a stereoscopic manner is appropriately displayed, the stereoscopic display is not appropriately performed. Therefore, it is preferred to perform the control in such a manner that the observer cannot visually recognize the display corresponding to the left-eye (or right-eye) image data depending on the immediately preceding right-eye (left-eye) image data.

The turning on and off of the illuminating regions 252 is sequentially performed correspondingly from the upper end portion to the lower end portion of the liquid crystal panel 200. The closing operation of the left-eye shutter 282 is started after the illuminating region 252 is finally turned off within the frame updating period.

Next, the writing of right-eye image data will be described. The writing of right-eye image is successively performed in two frame updating periods. For the same reason as described above, after a predetermined period of time elapses from the second writing of the right-eye image data into the liquid crystal panel 200, the corresponding illuminating region 252 of the backlight unit 250 starts to illuminate. The illuminating region 252 is turned off immediately before the writing of the next left-eye image data, or after a predetermined period of time elapses from the writing of the next left-eye image data.

Herein, the period in which each of the illuminating regions 252 is turned on is within the period in which the right-eye shutter 284 is opened. In the period in which the illuminating region 252 is turned on, the right-eye shutter 284 is opened, so that the period in which the illuminating region 252 is turned on corresponds to the luminance of the pixel. As described above, the illumination of the corresponding illuminating region 252 is continued after the writing of the left-eye image data, so that the luminance of right-eye image can be increased.

As described above, the left-eye shutter 282 is opened at least in a part of the period in which the liquid crystal display device 100 which performs display in the stereoscopic display mode displays the left-eye image, and is closed in the other part of the period. In this way, the period in which the liquid crystal display device 100 displays the left-eye image does not necessarily match the frame period in which the writing of left-eye image is performed. Similarly, the right-eye shutter 284 is opened at least in a part of the period in which the liquid crystal display device 100 which performs display in the stereoscopic display mode displays the right-eye image, and is closed in the other part of the period.

Into the liquid crystal panel 200, the left-eye image data is written twice and the right-eye image data is written twice in the period of 1/60 (=16.7 m) seconds. In the stereoscopic display mode, the ratio of the period in which respective one of the left-eye image and the right-eye image is visually recognized to the display period of the liquid crystal panel 200 is about 1/8.

In the description described above with reference to FIG. 10(b), both of the left-eye shutter 282 and the right-eye shutter 284 of the shutter glasses 280 are closed at the end of the frame updating period in which the first writing of the left-eye image data and the first writing of the right-eye image data are performed, but the present invention is not limited to this.

In FIG. 10(a), eight illuminating regions 252 are provided in the backlight unit 250, but alternatively, the number of the illuminating regions provided in the backlight unit 250 may be an arbitrary number.

FIG. 11(a) is a waveform diagram of a scanning signal voltage supplied to a plurality of scanning lines, FIG. 11(b) is a schematic diagram showing the turning on/off of the backlight unit 250, and FIG. 11(c) is a schematic diagram showing the open/close of the shutter glasses 280. Herein, the writing of right-eye image data is performed in a first frame updating period (1F) and a second frame updating period (2F), and the writing of left-eye image data is performed in a third frame updating period (3F) and a fourth frame updating period (4F).

In a first frame updating period (1F), the plurality of scanning lines are sequentially selected. Over the first frame updating period, the left-eye shutter 282 of the shutter glasses 280 is kept opened. At the start of the first frame updating period, the plurality of illuminating regions 252 provided in the backlight unit 250 are all in the on state. Thus, at the start of the first frame updating period, the left eye of the observer visually recognizes the left-eye image. In accordance with the selection of the scanning lines in the first frame updating period, corresponding illuminating regions 252 are sequentially turned off, so that the observer does not visually recognize the left-eye image.

In a second frame updating period (2F), the plurality of scanning lines are sequentially selected. Over the second frame updating period, the left-eye shutter 282 of the shutter glasses 280 is kept closed, and the right-eye shutter 284 is kept opened. At the start of the second frame updating period, the plurality of illuminating regions 252 provided in the backlight unit 250 are all in the off state. Thus, at this point of time, the observer does not visually recognize the left-eye image. In accordance with the selection of the scanning lines in the second frame updating period, corresponding illuminating regions 252 are sequentially turned on. Accordingly, the observer visually recognizes the right-eye image.

In a third frame updating period (3F), the plurality of scanning lines are sequentially selected. Over the third frame updating period, the right-eye shutter 284 of the shutter glasses 280 is kept opened. At the start of the third frame updating period, the plurality of illuminating regions 252 provided in the backlight unit 250 are all in the on state. Thus, at this point of time, the observer visually recognizes the right-eye image. In accordance with the selection of the scanning lines in the third frame updating period, corresponding illuminating regions 252 are sequentially turned off, so that the observer does not visually recognize the right-eye image.

In a fourth frame updating period (4F), the plurality of scanning lines are sequentially selected. Over the fourth frame updating period, the right-eye shutter 284 of the shutter glasses 280 is kept closed, and the left-eye shutter 282 is kept opened. At the start of the fourth frame updating period, the plurality of illuminating regions 252 provided in the backlight unit 250 are all in the off state. Thus, at this point of time, the observer does not visually recognize the left-eye image. In accordance with the selection of the scanning lines in the fourth frame updating period, corresponding illuminating regions 252 are sequentially turned on. Accordingly, the observer visually recognizes the left-eye image. As described above, in the case where the liquid crystal panel 200 performs display in the stereoscopic display mode, either one of the left-eye shutter 282 or the right-eye shutter 284 of the shutter glasses 280 is opened, and the visual recognition of the observer may vary in response to the turning on/off of the backlight unit 250.

In the above description, in the stereoscopic display mode, the turning on and off is controlled for the respective illuminating regions 252 of the backlight unit 250, but alternatively, the turning on and off of all of the illuminating regions 252 of the backlight unit 250 may be collectively controlled in the stereoscopic display mode. It should be understood that if the turning on and off of the respective illuminating regions 252 of the backlight unit 250 is individually performed, the display unevenness on the entire display screen can be easily suppressed.

Alternatively, the backlight unit 250 may include only a signal illuminating region of which the turning on and off can be controlled, and the entire of the liquid crystal panel 200 may be irradiated with the light from the illuminating region.

As shown in FIG. 12(a), the backlight unit 250 is turned on in a certain period of time so as to irradiate the entire of the liquid crystal panel 200 with light, and is turned off in another period of time.

FIG. 12(b) shows the timings of the writing of left-eye image data and right-eye image data into the liquid crystal panel 200 and the open/close of the shutter glasses 280 in the stereoscopic display mode. The vertical scanning period is also 1/240 (=4.2 m) seconds, and the vertical scanning frequency is 240 Hz.

Immediately before the end of the frame updating period in which the second writing of left-image data is performed, the backlight unit 250 is turned on, and then turned off after a predetermined period of time elapses from the start of the frame updating period in which the right-eye image data is written. The period corresponds to a period in which the alignment direction of liquid crystal molecules in the upper end portion of the liquid crystal panel 200 into which the right-eye image data is written first in the frame updating period in which the right-eye image data is written does not depend on the previously written left-eye image data.

Alternatively, the backlight unit 250 may have two illuminating regions.

As shown in FIG. 13(a), the backlight unit 250 has an illuminating region 252a for illuminating the upper half of the liquid crystal panel 200, and an illuminating region 252b for illuminating the lower half of the liquid crystal panel 200.

FIG. 13(b) shows the timings of the writing of left-eye image data and right-eye image data into the liquid crystal panel 200 and the open/close of the shutter glasses 280 in the stereoscopic display mode. The vertical scanning period is also 1/240 (=4.2 m) seconds, and the vertical scanning frequency is 240 Hz.

In the case where left-eye image data is to be written, immediately after the second writing of left-image data is completed to pixels in a row in the vicinity of the center of the liquid crystal panel 200, the illuminating region 252a is turned on, and then turned off immediately before the start of the frame updating period in which right-eye image data is written. The period in which the illuminating region b 252a is turned on corresponds to a period from the time at which the second writing of left-eye image data is last performed in the pixels corresponding to the illuminating region 252a to the time at which the writing of right-eye image data is first performed in the pixels corresponding to the illuminating region 252a.

Immediately before the end of the frame updating period in which the second writing of left-image data is performed, the illuminating region 252b is turned on, and then turned off immediately before the start of the writing of right-eye image data to the pixels of a row in the vicinity of the center of the liquid crystal panel 200. The period in which the illuminating region 252b is turned on corresponds to a period from the time at which the second writing of left-eye image data is last performed in the pixels corresponding to the illuminating region 252b to the time at which the writing of right-eye image data is first performed in the pixels corresponding to the illuminating region 252b. The turning on of the illuminating regions 252a and 252b is performed in a period in which the left-eye shutter 282 is opened. The writing of right-eye image data is performed in the same way.

In order to perform the control of the intensity of light from the backlight unit 250 for each area of the liquid crystal panel 200 in the planar display mode, it is preferred that the illuminating regions of the backlight unit 250 may be not only separated for each of the plurality of rows, but also separated for each of the plurality of columns.

In the above description, in the stereoscopic display mode, the turning on and off of the backlight unit 250 is controlled. Alternatively, the backlight unit 250 may be always turned on in the stereoscopic display mode, and the images visually recognized by the observer may be switched only by the open/close of the shutter glasses 280. It should be understood that if the turning on and off of the backlight unit 250 is performed, higher contrast ratio can be realized.

As described above, in the case where the backlight unit 250 has the plurality of illuminating regions 252, also in the planar display mode, the turning on and off of the illuminating regions 252 may be controlled in accordance with the gradation levels of pixels corresponding to the illuminating regions 252 in order to realize higher contrast ratio.

FIG. 14 shows a schematic diagram of the liquid crystal panel 200. The liquid crystal panel 200 includes a front substrate 210, a back substrate 220, and a liquid crystal layer 230 interposed between the front substrate 210 and the back substrate 220. The front substrate 210 has a transparent insulating substrate 212 and a counter electrode 214. The back substrate 220 has a transparent insulating substrate 222 and pixel electrodes 224. By the pixel electrodes 224, pixels are defined. The shape of a pixel when viewed from a normal direction of a principal surface of the liquid crystal panel 200 may be rectangular, or may be a shape extending in two orthogonal directions. The front substrate 210 and the back substrate 220 may be also referred to as a counter substrate and an active matrix substrate, respectively.

The liquid crystal layer 230 contains a nematic liquid crystal material having negative dielectric anisotropy, and performs display in normally black mode in combination with a polarizing plate disposed in a crossed-Nicol configuration. Although not shown in FIG. 14, typically, the front substrate 210 further includes a color filter layer, an alignment film, and the like, and the back substrate 220 further includes a scanning line, an insulating layer, a source line, a thin film transistor (TFT), an alignment film, and the like. On the outer sides of the front substrate 210 and the back substrate 220, polarizing plates are disposed. For example, any of the frame rate control circuit 110, the timing controller 120, the writing state signal transmitting circuit 130, the scanning signal driving circuit 140, the display signal driving circuit 150, and the backlight driving circuit 160 in the liquid crystal display device 100 shown in FIG. 2 may be mounted in a frame area of the back substrate 220.

The display signal driving circuit 150 supplies a display signal (a source signal) to a source line. In the liquid crystal panel 200, a voltage is applied across the liquid crystal layer 230 between the counter electrode 214 and the respective pixel electrodes 224, the above-mentioned timing controller 120 generates a display signal supplied to the source line in view of a counter signal supplied to the counter electrode 214 (and a storage capacitor signal supplied to a storage capacitor line as required).

In general, in a liquid crystal panel, the transmittance of liquid crystal layer (i.e. the luminance of pixel) is varied by controlling the voltage applied across the liquid crystal layer between the counter electrode and the pixel electrode. At this time, if the relationship between the electric potential of the counter electrode and the electric potential of the pixel electrode is not varied, burn-in occurs and the reliability is degraded. For this reason, in a typical liquid crystal panel, the voltage applied across the liquid crystal layer is set to be an AC voltage. Specifically, it is set in such a manner that the magnitude correlation between the electric potentials of the pixel electrode and the counter electrode is inverted at intervals of a predetermined period of time, and that the direction of electric field applied across the liquid crystal layer (the direction of line of electric force) is inverted at intervals of a predetermined period of time. In the following description of the present specification, the condition where the electric potential of the pixel electrode is higher than the electric potential of the counter electrode is represented as a positive polarity (+), and the condition where the electric potential of the pixel electrode is lower than the electric potential of the counter electrode is represented as a negative polarity (−), unless otherwise noted. The polarity indicates the direction of electric field applied across the liquid crystal layer. In the case where the writing with positive polarity (+) is performed, a display signal having higher electric potential than the counter electrode is supplied to the source line. In addition, in the case where the writing with negative polarity (−) is performed, a display signal having lower electric potential than the counter electrode is supplied to the source line.

As described above, in the liquid crystal display device 100, in the stereoscopic display mode, the writing of left-eye image data is performed over two successive frame updating periods, and the respective pixels exhibit the luminance corresponding to the left-eye image data over two vertical scanning periods. The writing of right-eye image data is performed over other two successive frame updating periods, and the respective pixels exhibit the luminance corresponding to the right-eye image data over two vertical scanning periods. At this time, if the polarity of the pixel is inverted in the two vertical scanning periods in which the right-eye image data and the left-eye image data is written, the pixel does not exhibit a predetermined luminance. Especially in the liquid crystal panel 200 which is driven at the vertical scanning frequency of 240 Hz, since the time period in which the scanning line is selected and a voltage is supplied to the pixel electrode 224 (the time period in which the liquid crystal layer 230 is charged) is short, the electric potential of the pixel electrode 224 does not reach the predetermined electric potential due to the influence of signal delay or the like. As a result, the pixel does not exhibit the predetermined luminance. For example, in the case where the electric potential of the pixel electrode 224 is largely varied for each vertical scanning period, the electric potential of the pixel electrode 224 does not reach the luminance corresponding to the gradation level, and the pixel does not exhibit the predetermined luminance.

For example, in the case where after the right-eye image data is written with the negative polarity, the left-eye image data is written with the positive polarity, and additionally the left-eye image data is written with the negative polarity, if the gradation level of the right-eye image data which is previously written is different, degrees of luminance of the plurality of pixels into which left-eye image data is written at the same gradation level are sometimes different from each other. As described above, by inverting the polarity of pixels for each vertical scanning period, the display of the corresponding right-eye image or left-eye image is influenced by the immediately preceding left-eye image or right-eye image, and the influence is visually recognized as display unevenness.

Accordingly, in the liquid crustal panel 200, in the case where in two vertical scanning periods in which the writing of the left-eye image data and the writing of the right-eye image data are successively performed, the polarity of pixels is inverted, it is preferred that the line width is increased and the resistance of line is reduced, thereby suppressing the influence of signal delay. Accordingly, the display unevenness can be suppressed. It is understood that if the line width is increased, the aperture ratio of the liquid crystal panel 200 may sometimes be reduced.

Therefore, in the liquid crystal panel 200, it is preferred that the polarities of respective pixels over the two vertical scanning periods in which the writing of right-eye image data and the writing of left-eye image data are successively performed may be the same. As a result, the display unevenness and the reduction in aperture ratio can be suppressed.

Hereinafter with reference to FIG. 15, the variation of signal voltage in the stereoscopic display system 300, the backlight unit 250, and the open/close of the shutter glasses 280 will be described.

FIG. 15(a) shows the variation of an electric potential VLs of a display signal by using an electric potential Vcom of the counter electrode 214 as a reference in the liquid crystal panel 200 in the stereoscopic mode, FIG. 15(b) shows the waveform of a scanning signal voltage VLg, FIG. 15(c) shows the variation of an electric potential Vpe of the pixel electrode 224 by using the electric potential Vcom of the counter electrode 214 as a reference, FIG. 15(d) shows the turning on/off of a specific one of illuminating regions 252 of the backlight unit 250, and FIG. 15(e) shows the open/close of the shutter glasses 280.

As described above, in the stereoscopic display mode, the liquid crystal panel 200 is driven at the vertical scanning frequency of 240 Hz, so that one vertical scanning period (a frame updating period) is about 4.2 ms. Herein the liquid crystal panel 200 complies with the High-vision standard, and a period in which one scanning line is selected is about 3.4 µs. The period corresponds to a horizontal scanning period. In a liquid crystal panel of so-called double-speed driving (the vertical scanning frequency of 120 Hz), the vertical scanning period is 8.4 ms, and a period in which one scanning line is selected is 6.8 µs.

As is understood from FIG. 15(a), the relationship between the electric potential of the display signal supplied to each source line and the electric potential of the counter electrode is not varied over the frame updating period, and the polarities of pixels adjacent in a column direction are mutually the same at the end of the frame updating period. Accordingly, the variation of the electric potential of the display signal within the frame updating period can be reduced, thereby reducing the power consumption. In FIG. 15(a), a display signal voltage of positive polarity is supplied to a source line in a first frame updating period, but a display signal voltage of negative polarity is supplied to a source line adjacent to the above-mentioned source line in the first frame updating period.

Herein in FIG. 15(c), the variation of an electric potential Vpe of the pixel electrode 224 in a specific pixel is focused on. For example, the maximum value and the minimum value of the electric potential Vpe of the pixel electrode 224 by using the electric potential Vcom of the counter electrode 214 as a reference are +7 V and −7 V, respectively, and the electric potential Vpe of the pixel electrode 224 by using the electric potential Vcom of the counter electrode 214 as a reference is varied within the range. In addition, the gradation level of the pixel is not varied from the first frame updating period (1F) to a fourth frame updating period (4F), and the gradation level of the pixel in the left-eye image data is substantially equal to the gradation level in the right-eye image data. For example, the pixel corresponds to a center portion of an object included in an image to be displayed in the stereoscopic manner.

In the first frame updating period (1F), a display signal indicating higher electric potential than that of the counter electrode 214 is supplied to the source line. Herein when the scanning signal voltage for selecting a certain pixel becomes an ON voltage, a display signal voltage is supplied to a pixel electrode 224 of the certain pixel, thereby performing the writing with positive polarity. At this time, the display signal voltage supplied to the source line is set so as to make the electric potential of the pixel electrode 224 a target electric potential. The target electric potential is set so that the potential difference between the counter electrode 214 and the pixel electrode 224 corresponds to the gradation level. In this way, the charging of the liquid crystal layer 230 is progressed by supplying the display signal voltage to the pixel electrode 224. However, since the liquid crystal panel 200 is driven at the vertical scanning frequency of 240 Hz, and the period in which a scanning line is selected and the display signal voltage is supplied to the pixel electrode 224 is relatively short, the electric potential of the pixel electrode 224 does not reach the target electric potential in some cases. For example, in the case where a so-called liquid crystal panel of double-speed driving (the vertical scanning frequency of 120 Hz) is used as the liquid crystal panel 200, the scanning signal voltage is returned to the OFF voltage before the electric potential of the pixel electrode 224 reaches the target electric potential. The illuminating region 252 of the backlight unit 250 is turned off at least in the middle of the first frame updating period, so that the right-eye image written in the first frame updating period is not visually recognized by the observer. The right-eye shutter 284 is opened in the latter half of the first frame updating period.

In a second frame updating period (2F), a display signal indicating higher electric potential than that of the counter electrode 214 is supplied to the source line. As described above, the writing of right-eye image is performed successively in two frame updating periods. When the scanning signal voltage for selecting the corresponding pixel becomes an ON voltage, a display signal voltage is supplied to a pixel electrode 224 of the corresponding pixel, thereby performing the writing with positive polarity. The polarity written in the second frame updating period is the same as that in the first frame updating period, and the display signal voltage supplied to the source line is set so as to make the electric potential of the pixel electrode 224 a target electric potential with the same polarity as that of the target electric potential in the first frame updating period. Accordingly, the electric potential of the pixel electrode 224 reaches the target electric potential. Herein the target electric potential in the second frame updating period is equal to the target electric potential in the first frame updating period. However, as described below, due to the overdrive driving and the like, the target electric potential in the second frame updating period may be different from the target electric potential in the first frame updating period. Thereafter, the scanning signal voltage is returned to the OFF voltage. The illuminating region 252 of the backlight unit 250 is turned on over one vertical scanning period after the writing of the corresponding pixel is performed in the second frame updating period. The right-eye shutter 284 is kept opened over the second frame updating period. Accordingly, the right-eye image written in the second frame updating period is visually recognized by the observer.

Next, in a third frame updating period (3F), left-eye image data is written. Herein in the third frame updating period, a display signal indicating lower electric potential than that of the counter electrode 214 is supplied to the source line. When the scanning signal voltage for selecting the corresponding pixel becomes the ON voltage, the display signal voltage is supplied to the pixel electrode 224 of the corresponding pixel, thereby performing the writing with negative polarity. Similarly, the display signal voltage supplied to the source line is set so as to make the electric potential of the pixel electrode 224 a target electric potential. However, the polarity of the target electric potential in the third frame updating period is set to be different from that in the second frame updating period, so that the scanning signal voltage is returned to the OFF voltage before the electric potential of the pixel electrode 224 reaches the target electric potential. At this time, the backlight unit 250 is still in the on state at the start of the third frame updating period, but is turned off before the writing of the left-eye image data is performed in the third frame updating period. Thus, the left-eye image written in the third frame updating period is not visually recognized by the observer. In the latter half of the third frame updating period, the left-eye shutter 282 is opened.

Also in the fourth frame updating period (4F), a display signal indicating lower electric potential than that of the counter electrode 214 is supplied to the source line. As described above, the writing of the left-eye image is performed successively in two frame updating periods. When the scanning signal voltage for selecting the corresponding pixel becomes the ON voltage, the display signal voltage is supplied to the pixel electrode 224 of the corresponding pixel, thereby performing the writing with negative polarity. The polarity written in the fourth frame updating period is the same as that in the third frame updating period, and the display signal voltage supplied to the source line is set so as to make the electric potential of the pixel electrode 224 a target electric potential with the same polarity as that of the target electric potential in the third frame updating period. Accordingly, the electric potential of the pixel electrode 224 reaches the target electric potential. Thereafter the scanning signal voltage is returned to the OFF voltage. The illuminating region 252 of the backlight unit 250 is turned on over one vertical scanning period after the writing of the corresponding pixel is performed in the fourth frame updating period. The left-eye shutter 282 is kept opened over the fourth frame updating period. Therefore, the left-eye image written in the fourth frame updating period can be visually recognized by the observer.

As described above, in the liquid crystal panel 200, left-eye image data is written successively in two vertical scanning periods with the same polarity, and right-eye image data is written successively in two vertical scanning periods with the same polarity, so that the reduction of aperture ratio and the display unevenness can be suppressed. As the liquid crystal panel 200, a so-called double-speed driving liquid crystal panel can be utilized. By inverting the polarity of pixels for every two vertical scanning periods as described above, the occurrence of flicker can be suppressed.

Figure 15:
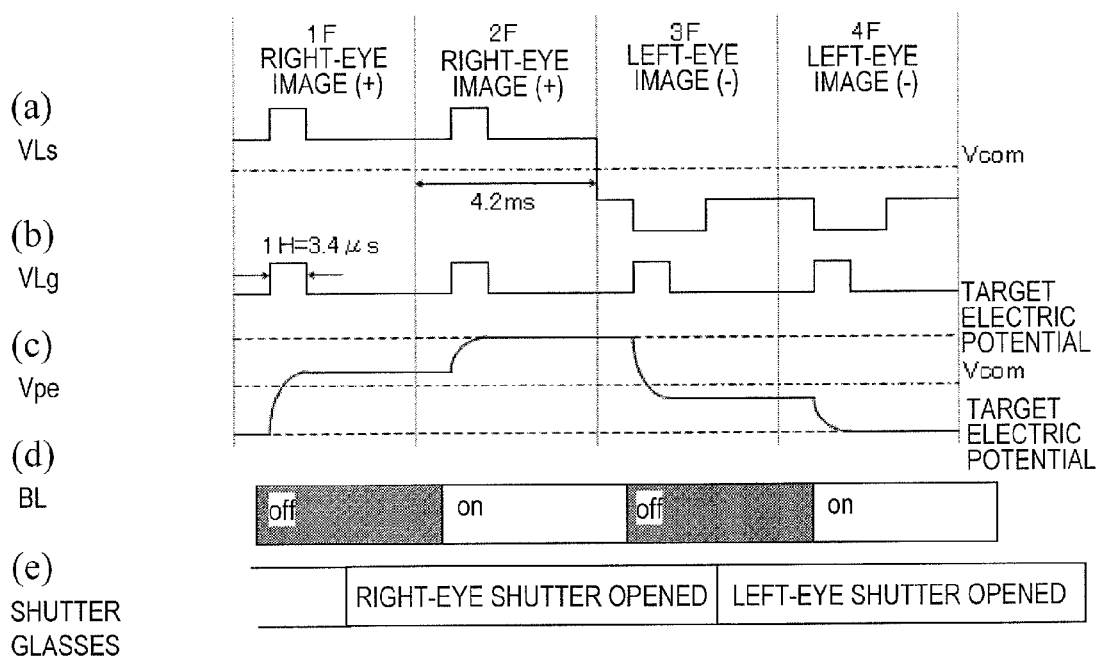
FIG. 15 is a diagram for illustrating the driving of the stereoscopic display system shown in FIG. 2, in which (a) is a waveform diagram of electric potential of a source line by using electric potential of a counter electrode as a reference, (b) is a waveform diagram of a scanning signal voltage, (c) is a waveform diagram of electric potential of a pixel electrode by using electric potential of a counter electrode as a reference, (d) is a schematic diagram showing the turning on/off of the backlight unit, and (e) is a schematic diagram showing the open/close of the shutter glasses.

It is noted that when the writing in four frame updating periods shown in FIG. 15 is repeatedly performed, the right-eye image data is written with the positive polarity, and the left-eye image data is written with the negative polarity. In this case, even if the gradation levels of right-eye image data and left-eye image data for a certain pixel are the same, the luminance of the pixel to which the right-eye image data is written is different from the luminance of the pixel to which the left-eye image data is written, so that appropriate display cannot be performed in some cases. Accordingly, it is preferred that the right-eye image data is written with positive polarity and negative polarity in accordance with the periods, and similarly, the left-eye image data is written with positive polarity and negative polarity in accordance with the periods.

Figure 16:
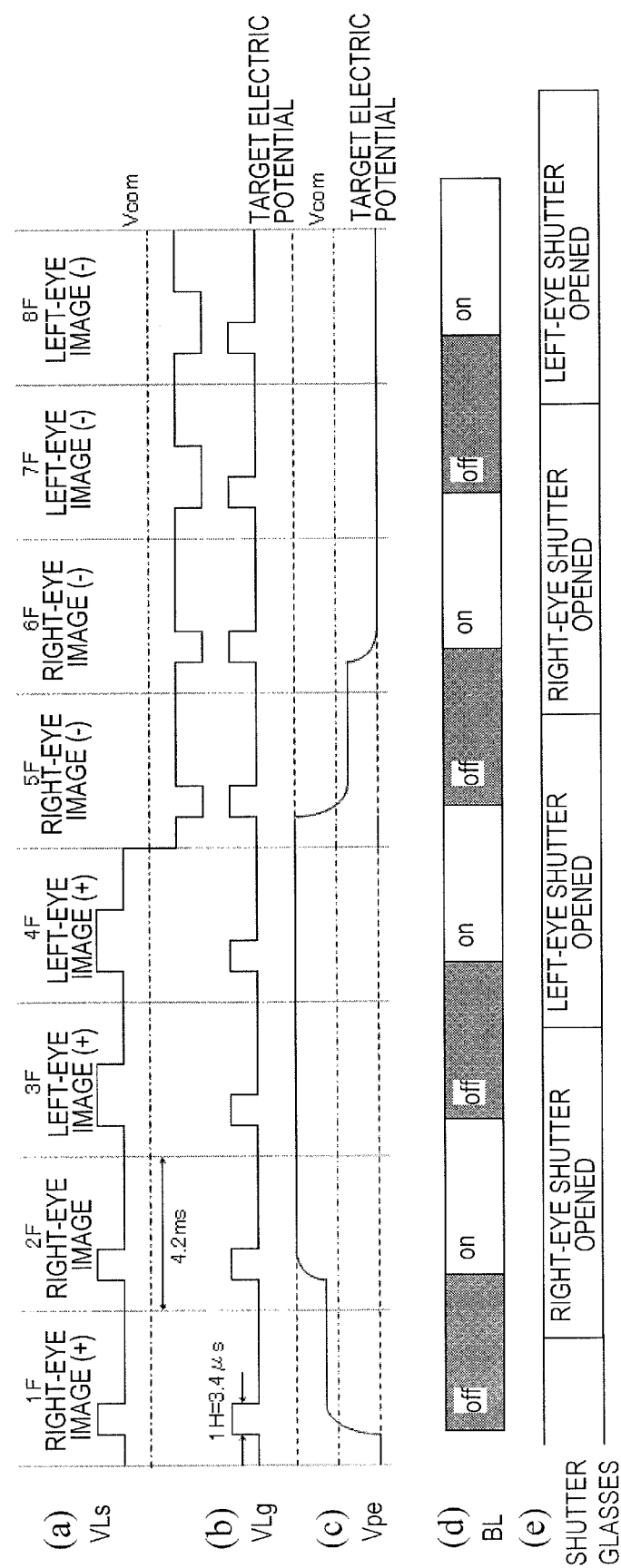
FIG. 16 is a diagram for illustrating the driving of the stereoscopic display system shown in FIG. 2, in which (a) is a waveform diagram of a display signal voltage, (b) is a waveform diagram of a scanning signal voltage, (c) is a waveform diagram of electric potential of a pixel electrode by using electric potential of a counter electrode as a reference, (d) is a schematic diagram showing the turning on/off of the backlight unit, and (e) is a schematic diagram showing the open/close of the shutter glasses.

Hereinafter, with reference to FIG. 16, the variation of signal voltage in the stereoscopic display system 300, the backlight unit 250, and the open/close of the shutter glasses 280 will be described.

FIG. 16(a) shows the variation of an electric potential VLs of a source line by using an electric potential Vcom of the counter electrode 214 as a reference, FIG. 16(b) shows the waveform of a scanning signal voltage VLg, FIG. 16(c) shows the variation of an electric potential Vpe of the pixel electrode 224 by using the electric potential Vcom of the counter electrode 214 as a reference, FIG. 16(d) shows the turning on/off of the backlight unit 250, and FIG. 16(e) shows the open/close of the shutter glasses 280.

As is understood from FIG. 16(a), the relationship between the electric potential of the display signal supplied to each source line and the electric potential of the counter electrode is not varied in the frame updating period. Accordingly, the variation of the electric potential of the display signal within the frame updating period can be reduced, thereby reducing the power consumption.

Herein in FIG. 16(c), the variation of an electric potential Vpe of the pixel electrode in a specific pixel is focused on. The gradation level of this pixel is not varied from the first frame updating period (1F) to the eighth frame updating period (8F), and the gradation level of this pixel of the left-eye image data is substantially the same as the gradation level of the right-eye image data. For example, the pixel corresponds to a center portion of an object included in an image to be displayed in the stereoscopic manner.

In the first frame updating period (1F), a display signal indicating higher electric potential than that of the counter electrode 214 is supplied to the source line. When the scanning signal voltage for selecting a certain pixel becomes an ON voltage, a display signal voltage is supplied to a pixel electrode 224 of the certain pixel, thereby performing the writing with positive polarity. At this time, the display signal voltage supplied to the source line is set so as to make the electric potential of the pixel electrode 224 a target electric potential. The target electric potential is set so that the potential difference between the counter electrode 214 and the pixel electrode 224 corresponds to the gradation level. In this way, the charging of the liquid crystal layer 230 is progressed by supplying the display signal voltage to the pixel electrode 224. However, since the liquid crystal panel 200 is driven at the vertical scanning frequency of 240 Hz, and the period in which a scanning line is selected and the display signal voltage is supplied to the pixel electrode 224 is relatively short, the scanning signal voltage is returned to the OFF voltage before the electric potential of the pixel electrode 224 reaches the target electric potential. The illuminating region 252 of the backlight unit 250 is turned off at least in the middle of the first frame updating period, so that the right-eye image written in the first frame updating period is not visually recognized by the observer. The right-eye shutter 284 is opened in the latter half of the first frame updating period.

In a second frame updating period (2F), a display signal indicating higher electric potential than that of the counter electrode 214 is supplied to the source line. As described above, the writing of right-eye image is performed successively in two frame updating periods. When the scanning signal voltage for selecting the corresponding pixel becomes an ON voltage, a display signal voltage is supplied to a pixel electrode 224 of the corresponding pixel, thereby performing the writing with positive polarity. The polarity written in the second frame updating period is the same as that in the first frame updating period, and the display signal voltage supplied to the source line is set so as to make the electric potential of the pixel electrode 224 a target electric potential with the same polarity as that of the target electric potential in the first frame updating period. Accordingly, the electric potential of the pixel electrode 224 reaches the target electric potential. Thereafter, the scanning signal voltage is returned to the OFF voltage. The illuminating region 252 of the backlight unit 250 is turned on over one vertical scanning period after the writing of the corresponding pixel is performed in the second frame updating period. The right-eye shutter 284 is kept opened over the second frame updating period. Accordingly, the right-eye image written in the second frame updating period is visually recognized by the observer.

Next, in a third frame updating period (3F), left-eye image data is written. Herein in the third frame updating period, a display signal indicating higher electric potential than that of the counter electrode 214 is supplied to the source line. When the scanning signal voltage for selecting the corresponding pixel becomes the ON voltage, the display signal voltage is supplied to the pixel electrode 224 of the corresponding pixel, thereby performing the writing with positive polarity. Similarly, the display signal voltage supplied to the source line is set so as to make the electric potential of the pixel electrode 224 a target electric potential with the same polarity as that in the second frame updating period. Accordingly, the electric potential of the pixel electrode 224 reaches the target electric potential. The backlight unit 250 is still in the on state at the start of the third frame updating period, but is turned off before the writing of the left-eye image data is performed in the third frame updating period. Thus, the left-eye image written in the third frame updating period is not visually recognized by the observer. In the latter half of the third frame updating period, the left-eye shutter 282 is opened.

Also in a fourth frame updating period (4F), a display signal indicating higher electric potential than that of the counter electrode 214 is supplied to the source line. As described above, the writing of the left-eye image is performed successively in two frame updating periods. When the scanning signal voltage for selecting the corresponding pixel becomes the ON voltage, the display signal voltage is supplied to the pixel electrode 224 of the corresponding pixel, thereby performing the writing with positive polarity. The polarity written in the fourth frame updating period is the same as that in the third frame updating period, and the display signal voltage is set in such a manner that the electric potential of the pixel electrode 224 has the same polarity as that of the target electric potential in the third frame updating period. Accordingly, the electric potential of the pixel electrode 224 reaches the target electric potential. Thereafter the scanning signal voltage is returned to the OFF voltage. The illuminating region 252 of the backlight unit 250 is turned on over one vertical scanning period after the writing of the corresponding pixel is performed in the fourth frame updating period. The left-eye shutter 282 is kept opened over the fourth frame electric potential. Therefore, the left-eye image written in the fourth frame updating period can be visually recognized by the observer.

In a fifth frame updating period (5F), a display signal indicating lower electric potential than that of the counter electrode 214 is supplied to the source line. Herein when the scanning signal voltage for selecting a certain pixel becomes the ON voltage, the display signal voltage is supplied to the pixel electrode 224 of the corresponding pixel, thereby performing the writing with negative polarity. Similarly, the display signal voltage supplied to the source line is set so as to make the electric potential of the pixel electrode 224 a target electric potential. However, the polarity of the target electric potential in the fifth frame updating period is set to be different from that in the fourth frame updating period, so that the scanning signal voltage is returned to the OFF voltage before the electric potential of the pixel electrode 224 reaches the target electric potential. The illuminating region 252 of the backlight unit 250 is turned off in the middle of the fifth frame updating period. Thus, the right-eye image written in the fifth frame updating period is not visually recognized by the observer. In the latter half of the fifth frame updating period, the right-eye shutter 284 is opened.

Periods from a sixth frame updating period (6F) to an eighth frame updating period (8F) are the same as those from the second frame updating period (2F) to the fourth frame updating period (4F), except for the points that the polarity of the display signal voltage and the polarity of the pixel electrode 224 are different, so that the description which overlaps with the previous description is omitted in order to avoid verbose description. In this way, the inversion of polarity of the pixels may be performed every four vertical scanning periods in the liquid crystal panel 200.

As described above, by writing right-eye image data and left-eye image data with the same polarity every two vertical scanning periods, the reduction of aperture ratio and the display unevenness can be suppressed. In addition, by performing the inversion of polarity of the pixel every four vertical scanning periods, the right-eye image data can be written with positive polarity and negative polarity and the left-eye image data can be written with positive polarity and negative polarity in accordance with the vertical scanning periods. As a result, the shift in luminance caused by the polarity can be suppressed.

In the above description, display signal voltages with different polarities are supplied to adjacent source lines, but the present invention is not limited to this. Alternatively, in a certain frame updating period, display signal voltages with the same polarity may be supplied to all of the source lines. Alternatively, in a certain frame updating period, the polarity of a display signal voltage supplied to respective source line may be inverted every horizontal scanning period. For example, the liquid crystal panel 200 may be driven by dot inversion. That is, at the end of a certain frame updating period, polarities of pixels adjacent in a row direction and a column direction may be inverted.

In the above description, pixels arranged in a matrix are sequentially selected from the upper end of the liquid crystal panel to the lower end thereof, but the present invention is not limited to this. For example, a plurality of pixels may be divided into one or more blocks corresponding to two or more rows, respectively, and the writing may be sequentially performed into pixels of one of an odd-numbered row and an even-numbered row in a block with the same polarity. Thereafter, the writing may be sequentially performed into pixels of the other row in the block with polarity which is different from that of the pixels of the above-mentioned one row.

In the case where pixels correspond to one block in the liquid crystal panel 200, in a frame updating period, after the writing is sequentially performed into pixels of one of the odd-numbered row and the even-numbered row, the writing is sequentially performed into pixels of the other row. Such driving is also referred to as source-line inversion driving.

Alternatively, in the case where pixels correspond to a plurality of blocks in the liquid crystal panel 200, in a frame updating period, after the writing is sequentially performed into pixels of one of the odd-numbered row and the even-numbered row in the block with the same polarity, the writing is sequentially performed into pixels of the other row with polarity which is different from that of the pixels of the above-mentioned one row. For example, after the writing is sequentially performed into pixels of one of the odd-numbered row and the even-numbered row in a block, the writing is sequentially performed into pixels of the other row, and after the writing is sequentially performed into pixels of one of the odd-numbered row and the even-numbered row in the next block, the writing is sequentially performed into pixels of the other row. Such driving is also referred to as block inversion driving. Typically, in the case where a plurality of blocks are provided, the numbers of rows of pixels (i.e. the numbers of scanning lines) included in each block are equal to each other. Alternatively, the numbers of rows of pixels (i.e. the numbers of scanning lines) included in each block may be different from each other. Such source-line inversion driving and block inversion are disclosed in International Publication No. W02008/139693. In the present specification, the description of International Publication No. W02008/139693 is incorporated by reference.

FIG. 17(*a*) shows the polarities of written pixels and the sequence in which the writing is performed in one block. For example, in a certain horizontal scanning period, after the writing is performed with different polarities into pixels adjacent in the row direction in a certain row, in the next horizontal scanning period, a row adjacent to the row of pixels to which the writing is performed in the immediately preceding horizontal scanning period is skipped, and the writing is performed into pixels of a row which is separated by two rows from the row of pixels into which the writing is performed in the immediately preceding horizontal scanning period with the same polarity as that in the immediately preceding horizontal scanning period. Thereafter the writing is sequentially performed with the same polarity every other row in the block. Thereafter, the writing is sequentially performed into the pixels of the row which is skipped in the previous writing in the block with polarity different from that of the previous writing. The writing also performed with the same polarity in every other row. Accordingly, for example, as for pixels in a block of a certain column, the writing with positive polarity is performed into pixels of the even-numbered row, and the writing with negative polarity is performed into pixels of the odd-numbered row.

FIG. 17(*b*) shows the variation of electric potential VLs of the source line by using the electric potential Vcom of the counter electrode 214 as a reference. Herein the variation of electric potential VLs in one frame updating period of a specific source line in the liquid crystal panel 200 which is divided into two blocks is focused on. In this source line, in one frame updating period, for example, the writing with positive polarity is performed into pixels of odd-numbered rows in the first block, and then the writing with negative polarity is performed into pixels of even-numbered rows. Next, the writing with positive polarity is performed into pixels of odd-numbered rows in the second block, and then the writing with negative polarity is performed into pixels of even-numbered rows. As for the source line adjacent to the above-mentioned source line, in the same frame updating period, the writing with negative polarity is performed into pixels of the odd-numbered rows in the first block, and then the writing with positive polarity is performed into pixels in the even-numbered rows. Next, the writing with negative polarity is performed into pixels of the odd-numbered row in the second block, and then the writing with positive polarity is performed into pixels of the even-numbered rows.

Hereinafter, with reference to FIG. 18, the variation of signal voltage in the stereoscopic display system 300, the backlight unit 250, and the open/close of the shutter glasses 280 will be described.

FIG. 18(*a*) shows the variation of an electric potential VLs of a display signal by using an electric potential Vcom of the counter electrode 214 as a reference in the liquid crystal panel 200 in the stereoscopic display mode, FIG. 18(*b*) shows the waveform of a scanning signal voltage VLg, FIG. 18(*c*) shows the variation of an electric potential Vpe of the pixel electrode 224 by using the electric potential Vcom of the counter electrode 214 as a reference, FIG. 18(*d*) shows the turning on/off of a specific illuminating region 252 of the backlight unit 250, and FIG. 18(*e*) shows the open/close of the shutter glasses 280. FIG. 18 is the same as FIG. 15 except for the point that the variation of the electric potential VLs of the display signal is different, so that the description which overlaps with the above-mentioned description is omitted in order to avoid the verbose description.

As is understood from FIG. 18(*a*), the relationship between the electric potential of the display signal supplied to the source line and the electric potential of the counter electrode is not varied over about one quarter of the frame updating period, so that the power consumption can be reduced. For example, after the writing is performed into pixels in odd-numbered row of the first block with positive polarity, the writing is performed into pixels in the even-numbered row with negative polarity. Then, the writing is performed into pixels in the odd-numbered row of the second block with positive polarity, and finally the writing is performed into pixels in the even-numbered row with negative polarity. Accordingly, the polarities of pixels adjacent in the column direction at the end of the frame updating period are different from each other. In FIG. 18(*a*), the source line in which the polarity of the display signal voltage is varied in the order of positive, negative, positive, and negative polarity in the first frame updating period is focused on. However, the polarity of the display signal voltage supplied to a source line adjacent to the source line in the first frame updating period is varied in the order of negative, positive, negative, and positive polarity. In FIG. 18(*b*), the period in which the scanning signal voltage VLg is the ON voltage is 3.4 μs. FIG. 18(*c*) focuses on the variation of the electric potential Vpe of a pixel electrode 224 of a specific pixel selected when the display signal of positive polarity is supplied from the source line in the frame updating period.

In the first frame updating period (1F), the polarity of the display signal supplied to the source line is varied in the order of positive, negative, positive, and negative polarity. In such a case, when the scanning signal voltage for selecting the pixel becomes the ON voltage, a display signal voltage is supplied to the pixel electrode 224 of the pixel, so that the writing with positive polarity is performed. At this time, the period in which a scanning line is selected and the display signal voltage is supplied to the pixel electrode 224 is relatively short, so that the electric potential of the pixel electrode 224 does not reach the target electric potential in some cases.

In the second frame updating period (2F), the polarity of the display signal supplied to the source line is varied in the order of positive, negative, positive, and negative polarity. As described above, the writing of right-eye image data is performed successively in two frame updating periods. When the scanning signal voltage for selecting the corresponding pixel becomes the ON voltage, the display signal voltage is supplied to the pixel electrode 224 of the corresponding pixel, and the writing with positive polarity which is the same as the polarity in the first frame updating period is performed. Thus, the electric potential of the pixel electrode 224 reaches the target electric potential. Herein the target electric potential in the second frame updating period is equal to the target electric potential in the first frame updating period. Alternatively, as described below, due to the overdrive driving or the like, the target electric potential in the second frame updating period may be different from the target electric potential in the first frame updating period. Thereafter, the scanning signal voltage is returned to the OFF voltage. The illuminating region 252 of the backlight unit 250 is turned on over one vertical scanning period after the writing into the corresponding pixel is performed in the second frame updating period. The right-eye shutter 284 is kept opened over the second frame updating period. Accordingly, the right-eye image written in the second frame updating period is visually recognized by the observer.

Next, in the third frame updating period (3F), left-eye image data is written. In the third frame updating period, the polarity of the display signal supplied to the source line is varied in the order of negative, positive, negative, and positive polarity. When the scanning signal voltage for selecting the pixel becomes the ON voltage, a display signal voltage is supplied to the pixel electrode 224 of the corresponding pixel, and the writing with negative polarity is performed. Also herein the display signal voltage supplied to the source line is set so as to make the electric potential of the pixel electrode 224 a target electric potential. However, the polarity of the target electric potential in the third frame updating period is set to be different from that in the second frame updating period. Thus, before the electric potential of the pixel electrode 224 reaches the target electric potential, the scanning signal voltage is returned to the OFF voltage.

In the fourth frame updating period (4F), the polarity of the display signal supplied to the source line is varied in the order of negative, positive, negative, and positive polarity. When the scanning signal voltage for selecting the corresponding pixel becomes the ON voltage, a display signal voltage is supplied to the pixel electrode 224 of the corresponding pixel, and the writing is performed with negative polarity which is the same as that in the third frame updating period. Accordingly, the electric potential of the pixel electrode 224 reaches the target electric potential. Thereafter, the scanning signal voltage is returned to the OFF voltage. The illuminating region 252 of the backlight unit 250 is turned on over one vertical scanning period after the writing into the corresponding pixel in the fourth frame updating period is performed. The left-eye shutter 282 is kept opened throughout the fourth frame updating period. Accordingly, the left-eye image written in the fourth frame updating period is visually recognized by the observer.

As described above, in the liquid crystal panel 200, for each pixel, left-eye image data is written successively in two vertical scanning periods with the same polarity. In addition, for each pixel, right-eye image data is written successively in two vertical scanning periods with the same polarity. Accordingly, the reduction of aperture ratio and the display unevenness can be suppressed, and a so-called double-speed driving liquid crystal panel can be utilized as the liquid crystal panel 200. In addition, by inverting the polarity of pixels every two vertical scanning periods, the occurrence of flicker can be suppressed.

In the case where the writing of four frame updating periods shown in FIG. 18 is repeatedly performed, right-eye image data is written into the pixel with positive polarity, and left-eye image data is written with negative polarity. As described above, in the case where the respective polarities of the right-eye image data and the left-eye image data written into one and the same pixel are fixed, even if the gradation levels of the right-eye image data and the left-eye image data of a certain pixel are equal to each other, the luminance of the pixel into which the right-eye image data is written is different from the luminance of the pixel into which the left-eye image data is written. As a result, adequate display cannot be performed in some cases. Therefore, preferably, for each pixel, right-eye image data is written with positive polarity and negative polarity in accordance with the period, and similarly, left-eye image data is written with positive polarity and negative polarity in accordance with the period.

Hereinafter, with reference to FIG. 19, the variation of signal voltage in the stereoscopic display system 300, the backlight unit 250, and the open/close of the shutter glasses 280 will be described.

FIG. 19(a) shows the variation of an electric potential VLs of a source line by using an electric potential Vcom of the counter electrode 214 as a reference, FIG. 19(b) shows the waveform of a scanning signal voltage VLg, FIG. 19(c) shows the variation of an electric potential Vpe of the pixel electrode 224 by using the electric potential Vcom of the counter electrode 214 as a reference, FIG. 19(d) shows the turning on/off of the backlight unit 250, and FIG. 19(e) shows the open/close of the shutter glasses 280.

Figure 19:
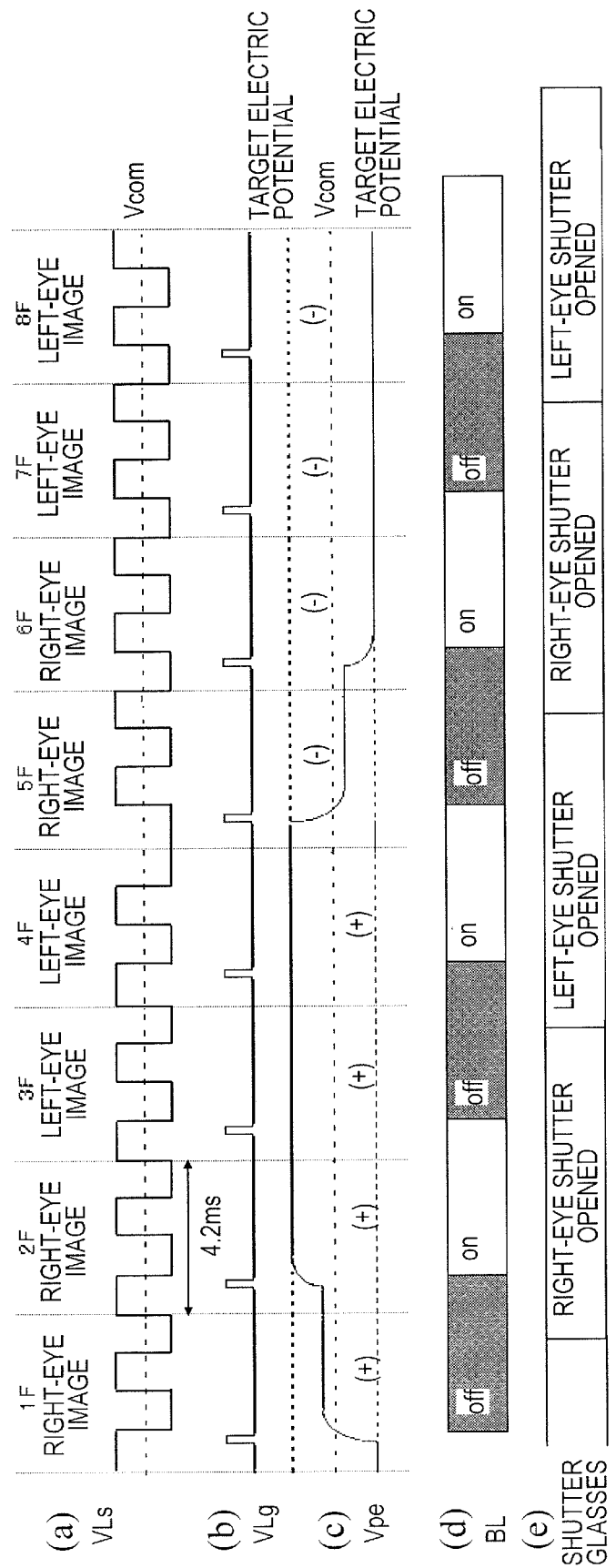
FIG. 19 is a diagram for illustrating the driving of the stereoscopic display system shown in FIG. 2, in which (a) is a waveform diagram of a display signal voltage, (b) is a waveform diagram of a scanning signal voltage, (c) is a waveform diagram of electric potential of a pixel electrode by using electric potential of a counter electrode as a reference, (d) is a schematic diagram showing the turning on/off of the backlight unit, and (e) is a schematic diagram showing the open/close of the shutter glasses.

As is understood from FIG. 19(a), the relationship between the electric potential of the display signal supplied to the source line and the electric potential of the counter electrode is not varied over about one quarter of the frame updating period, so that the power consumption can be reduced. In FIG. 19(a), the source line in which the polarity of the display signal is varied in the order of positive, negative, positive, and negative polarity in the first frame updating period is focused on. However, the polarity of the display signal supplied to a source line adjacent to the source line in the first frame updating period is varied in the order of negative, positive, negative, and positive polarity. FIG. 19(c) focuses on the variation of the electric potential Vpe of a pixel electrode 224 of a specific pixel selected when the display signal of positive polarity is supplied to the source line in the frame updating period. FIG. 19 is the same as FIG. 18 described above except for the point that the variation of the electric potential VLs of the display signal shown in FIG. 19(a) is different, so that the description which overlaps with the above-mentioned description is omitted in order to avoid the verbose description.

In a first frame updating period (1F), the polarity of the display signal supplied to the source line is varied in the order of positive, negative, positive, and negative polarity. Herein, when the scanning signal voltage for selecting the pixel becomes the ON voltage, a display signal voltage is supplied to the pixel electrode 224 of the pixel, so that the writing with positive polarity is performed. At this time, the display signal voltage supplied to the source line is set so as to make the electric potential of the pixel electrode 224 the target electric potential. However, at this time, the period in which the scanning line is selected and the display signal voltage is supplied to the pixel electrode 224 is relatively short, so that the scanning signal voltage is sometimes returned to the OFF voltage before the electric potential of the pixel electrode 224 reaches the target electric potential.

In a second frame updating period (2F), the polarity of the display signal supplied to the source line is varied in the order of positive, negative, positive, and negative polarity. As described above, the writing of right-eye image is performed successively in two frame updating periods. When the scanning signal voltage for selecting the corresponding pixel becomes the ON voltage, the display signal voltage is supplied to the pixel electrode 224 of the corresponding pixel, and the writing with positive polarity is performed. The polarity with which the writing is performed in the second frame updating period is the same as the polarity in the first frame updating period. Thus, the electric potential of the pixel electrode 224 reaches the target electric potential. Thereafter, the scanning signal voltage is returned to the OFF voltage. The illuminating region 252 of the backlight unit 250 is turned on over one vertical scanning period after the writing into the corresponding pixel is performed in the second frame updating period. The right-eye shutter 284 is kept opened over the second frame updating period. Accordingly, the right-eye image written in the second frame updating period is visually recognized by the observer.

Next, in a third frame updating period (3F), left-eye image data is written. In the third frame updating period, the polarity of the display signal supplied to the source line is varied in the order of positive, negative, positive, and negative polarity. When the scanning signal voltage for selecting the pixel becomes the ON voltage, a display signal voltage is supplied to the pixel electrode 224 of the corresponding pixel, and the writing is performed with positive polarity which is the same as that in the second frame updating period. Thus, the electric potential of the pixel electrode 224 reaches the target electric potential.

In a fourth frame updating period (4F), the polarity of the display signal supplied to the source line is varied in the order of positive, negative, positive, and negative polarity. As described above, the writing of left-eye image is performed successively in two frame updating periods. When the scanning signal voltage for selecting the corresponding pixel becomes the ON voltage, a display signal voltage is supplied to the pixel electrode 224 of the corresponding pixel, and the writing is performed with positive polarity which is the same as that in the third frame updating period. Accordingly, the electric potential of the pixel electrode 224 reaches the target electric potential. Thereafter, the scanning signal voltage is returned to the OFF voltage. The illuminating region 252 of the backlight unit 250 is turned on over one vertical scanning period after the writing into the corresponding pixel is performed in the fourth frame updating period. The left-eye shutter 282 is kept opened throughout the fourth frame updating period. Accordingly, the left-eye image written in the fourth frame updating period is visually recognized by the observer.

In a fifth frame updating period (5F), the polarity of the display signal supplied to the source line is varied in the order of negative, positive, negative, and positive polarity. Herein, when the scanning signal voltage for selecting the corresponding pixel becomes the ON voltage, a display signal voltage is supplied to the pixel electrode 224 of the corresponding pixel, and the writing is performed with negative polarity. Also, the display signal voltage supplied to the source line is set so as to make the electric potential of the pixel electrode 224 the target electric potential. However, the polarity of the target electric potential in the fifth frame updating period is set so as to be different from the polarity in the fourth frame updating period. Thus, before the electric potential of the pixel electrode 224 reaches the target electric potential, the scanning signal voltage is returned to the OFF voltage.

Periods from a sixth frame updating period (6F) to an eighth frame updating period (8F) are the same as those from the second frame updating period (2F) to the fourth frame updating period (4F), except for the points that the timing at which the polarity of the display signal voltage is inverted is different, and that the polarity of the pixel electrode 224 is different, so that the description which overlaps with the above description is omitted in order to avoid verbose description. In this way, the inversion of polarities of the pixels may be performed every four vertical scanning periods in the liquid crystal panel 200.

In the description with reference to FIG. 17 to FIG. 19, all of the pixels in the liquid crystal panel 200 are divided into two blocks, but the present invention is not limited to this. The pixels may be divided into three or more blocks. In addition, the number of blocks may be set in accordance with the illuminating regions 252 of the backlight unit 250, for example. By the provision of three or more blocks in accordance with three or more illuminating regions, a time period from the end of writing into pixels in a block in a certain frame scanning period to the start of writing into pixels in the block in the next frame scanning period can be extended, so that a liquid crystal display device with high luminance in which the occurrence of cross-talk is suppressed can be easily and simply realized.

In the above description with reference to FIG. 17 to FIG. 19, the writing in the odd-numbered rows and the writing in the even-numbered rows in successive blocks are performed alternately, but the present invention is not limited to this. The writing of one of the odd-numbered row and the even-numbered row over the successive blocks may be performed successively. For example, the writing with positive polarity is performed into pixels in the odd-numbered rows of the first block, and then the writing with negative polarity is performed into pixels in the even-numbered rows of the first block. Thereafter, the writing with negative polarity is performed into pixels in the even-numbered rows of the second block, and then the writing with positive polarity is performed into pixels in the odd-numbered rows of the second block. In addition, the writing with positive polarity is performed into pixels in the odd-numbered rows of the third block, and then the writing with negative polarity is performed into pixels in the even-numbered rows of the third block.

In the above description, in the stereoscopic display mode, left-eye image data and right-eye image data are respectively written for two vertical scanning periods, and the polarity of each pixel is inverted every two or four vertical scanning periods, but the present invention is not limited to this. The polarity of each pixel may be inverted every two or more even-numbered vertical scanning periods. For example, the polarity of each pixel may be inverted every six, or eight or more vertical scanning periods.

In the above description, in the stereoscopic display mode, the right-eye image data and the left-eye image data written for the second time are the same as the right-eye image data and the left-eye image data written for the first time, respectively, and the writing of equal gradation level is performed twice into the respective pixel, but the present invention is not limited to this.

For each of the plurality of pixels, based on the gradation level of certain image data and the gradation level of image data previous to the above-mentioned image data, the gradation level of the above-mentioned image data may be set. In the case where the gradation level is varied over the successive image data, the gradation level is set in such a manner that the amount of variation of the gradation level is larger than the original amount of variation.

For example, in the successive image data, in the case where the gradation level corresponding to low effective voltage is changed into gradation level corresponding to high effective voltage, the gradation level is set so as to correspond to still higher effective voltage. Accordingly, even liquid crystal molecules with relatively slow response speed may be changed into the alignment condition corresponding to the high effective voltage in a relatively short time. Alternatively, in the successive image data, in the case where the gradation level corresponding to high effective voltage is changed into gradation level corresponding to low effective voltage, the gradation level is set so as to correspond to still lower effective voltage. Accordingly, liquid crystal molecules may be changed into the alignment condition corresponding to the low effective voltage in a relatively short time. Such driving is also referred to as overdrive driving.

Figure 20:
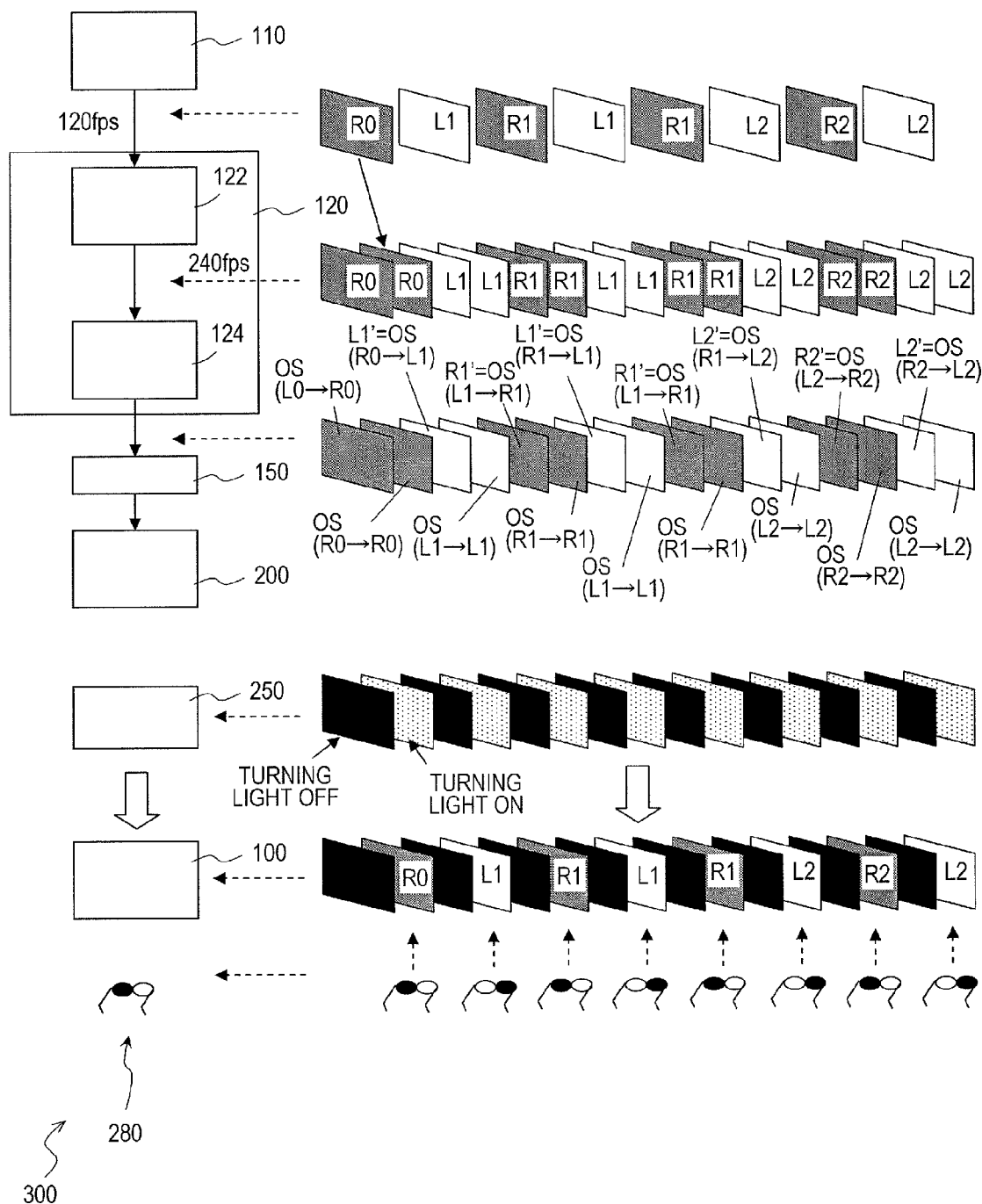
FIG. 20 is a schematic diagram showing the variation of image data in the stereoscopic display system shown in FIG. 2 in which overdrive processing is performed.

FIG. 20 shows the schematic diagram of the stereoscopic display system 300 which performs overdrive driving. The timing controller 120 includes a signal duplicating potion 122 and an overdrive driving portion b 124.

As described above with reference to FIG. 3(a) and FIG. 5, the frame rate control circuit 110 generates a video signal having a higher frame rate than the frame rate of 60 fps of the input video signal, based on the input video signal. Image data are arranged in the order of R0, L1, R1, L1, R1, L2, R2, L2 . . . in the video signal.

The signal duplicating portion 122 generates a display signal having a frame rate of 240 fps based on the video signal having a frame rate of 120 fps. Specifically, the signal duplicating portion 122 duplicates left-eye image data and right-eye image data of the video signal, respectively, and arranges them in the display signal in such a manner that paired left-eye image data and paired right-eye image data are successively arranged. Herein, in the display signal, image data R0, R0, L1, L1, R1, R1, L1, L1, R1, R1, L2, L2, R2, R2, L2, L2 . . . are arranged in this order.

The overdrive driving portion 124 produces new image data based on image data concerned and the previous image data. Specifically, for each of the plurality of pixels, new gradation level is set based on the gradation level of the image data concerned, and the gradation level of the previous image data.

Herein, one pixel is focused on in order to prevent the description from being excessively complicated, and the description of overdrive driving is performed in the case where the image data is varied in the order of R0, R0, L1, and L1.

In the case where the image data of the display signal output from the signal duplicating portion 122 is not varied, the overdrive driving is not performed. In such a case, the image data of the display signal output from the overdrive driving portion 124 is R0 (=OS(R0→R0)). Herein, the function OS(X→Y) indicates the image data of the display signal output from the overdrive driving portion 124 when the image data of the display signal output from the signal duplicating portion 122 is varied from X to Y.

Next, in the case where the image data of the display signal output from the signal duplicating portion 122 is varied from R0 to L1 which is different from R0, the overdrive driving is performed. First, it is assumed that the gradation level of a certain pixel in which the image data R0 is written corresponds to a lower voltage, and the gradation level of the pixel of the image data L1 corresponds to a higher voltage. Herein the lower voltage indicates that the absolute value of the applied voltage of the liquid crystal layer 230 of the liquid crystal panel 200 is small, and the higher voltage indicates that the absolute value of the applied voltage of the liquid crystal layer 230 of the liquid crystal panel 200 is large. As described above, the liquid crystal panel 200 is in the normally black mode, and the luminance corresponding to the lower voltage is higher than the luminance corresponding to the higher voltage.

In such a case, due to the overdrive driving by the overdrive driving portion 124, when the gradation level of the image data R0 is varied to the gradation level of the image data L1, image data L1' (=OS(R0→L1) is set instead of the image data L1. In this case, across the liquid crystal layer 230, a voltage VL1' which is still higher than the voltage VL1 corresponding to the gradation level of the image data L1 is applied. Thereafter, in the case where the image data of the display signal output from the signal duplicating portion 122 is varied from L1 to L1, the overdrive driving is not performed, and across the liquid crystal layer 230, a voltage VL1 corresponding to the gradation level of the image data L1 is applied. As described above, when the gradation level is varied in accordance with the variation from low voltage to high voltage, the overdrive driving portion 124 sets a gradation level which is still higher than the gradation level obtained by the signal duplicating portion 122. Such driving is also referred to as overshoot driving.

Next, the gradation level of the image data R0 corresponds to a higher voltage, and the gradation level of the image data L1 corresponds to a lower voltage. In such a case, due to the overdrive driving by the overdrive driving portion 124, image data L1' (=OS(R0→L1)) is set instead of the image data L1. In this case, across the liquid crystal layer 230, a voltage VL1' which is still lower than the voltage VL1 corresponding to the gradation level of the image data L1 is applied. Thereafter, in the case where the image data output from the signal duplicating portion 122 is varied from L1 to L1, the overdrive driving is not performed, and across the liquid crystal layer 230, a voltage VL1 corresponding to the gradation level of the image data L1 is applied. As described above, when the gradation level of image data is varied in accordance with the variation from high voltage to low voltage, the overdrive driving portion 124 sets a gradation level corresponding to a voltage which is still lower than the gradation level obtained by the signal duplicating portion 122. Such driving is also referred to as undershoot driving.

In the present specification, the above-mentioned overshoot driving and undershoot driving are collectively referred to as overdrive driving. In the same meaning as the overdrive driving in the present specification, the term "overshoot driving" may be used. In addition, in such a case, the term "undershoot driving" may indicate the driving of applying a voltage corresponding to gradation lower than the target gradation.

In the display signal output from the overdrive driving portion 124, image data R0, R0, L1', L1, R1', R1, L1', L1, R1', R1, L2', L2, R2', R2, L2', L2, . . . are arranged in this order. Accordingly, in the vertical scanning period in which the right-eye image data and the left-eye image data are switched, the electric potential of the pixel electrode 224 can be the target electric potential.

Herein the backlight unit 250 is turned on in accordance with the latter vertical scanning period of the two vertical scanning periods into which the right-eye image data or the left-eye image data are successively written. Specifically, the backlight unit 250 is turned off in a period in which the image data after the overdrive driving is written, and is turned on in a period in which the next image data is written.

The left-eye shutter 282 of the shutter glasses 280 is opened in a period in which the liquid crystal panel 200 displays the left-eye image and the backlight unit 250 is turned on, and is closed in the other period. The right-eye shutter 284 of the shutter glasses 280 is opened in a period in which the liquid crystal panel 200 displays the right-eye image and the backlight unit 250 is turned on, and is closed in the other period.

By performing the above-described overdrive driving, the electric potential of the pixel electrode 224 reaches the target electric potential earlier, so that the turning-on of the illuminating region 252 of the backlight unit 250 and the opening of the shutter glasses 280 may be performed earlier, thereby attempting the increase of brightness. For example, when the shutter glasses 280 is opened, immediately after the end of the second writing of left-eye image and right-eye image, the illuminating region 252 of the backlight unit 250 may be turned on.

The overdrive driving may be performed with reference to a lookup table, or by way of arithmetic processing. Alternatively, the overdrive driving may be performed by combining them.

In the above description, the overdrive driving is performed based on the gradation level of the image data concerned, and the gradation level of the previous image data, but the present invention is not limited to this. The overdrive driving may be performed based on the gradation level of the image data concerned, and the gradation levels of two image data previous to the image data. As described above, the overdrive driving may be performed based on the gradation level of the image data concerned, and gradation levels of at least one image data previous to the image data.

In the case where the video signal includes image data to be displayed in the stereoscopic display mode, the signal duplicating portion 122 performs the duplication of image data, as described above. In the case where the video signal includes image data to be displayed in the planar display mode, the signal duplicating portion 122 does not perform the duplication of image data.

It is understood that the liquid crystal panel 200 may have a multi pixel structure. Each pixel has a plurality of sub-pixels of which the luminance can be different from each other, so that the viewing angle dependence of the gamma characteristics can be improved.

Figure 21:
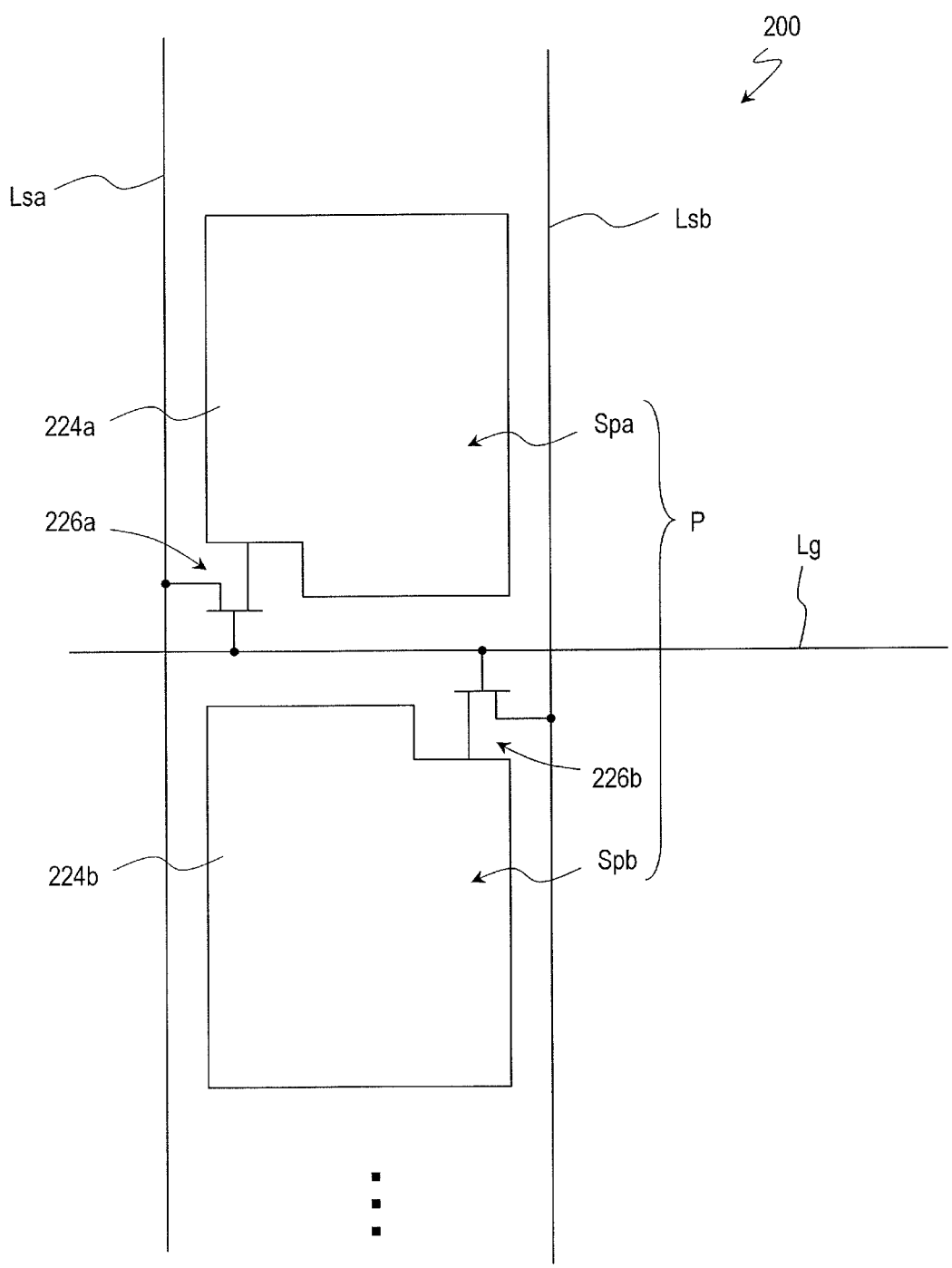
FIG. 21 is a schematic diagram showing a pixel in the liquid crystal panel shown in FIG. 14.

FIG. 21 shows a schematic diagram of one pixel in the liquid crystal panel 200. In the liquid crystal panel 200, a pixel P has a sub-pixel Spa and a sub-pixel Spb. The sub-pixel Spa is defined by a sub-pixel electrode 224a, and the sub-pixel Spb is defined by a sub-pixel electrode 224b.

Herein two source lines Lsa and Lsb are provided for pixels P in one column. The sub-pixel electrodes 224a and 224b are connected to different source lines Lsa and Lsb via different TFTs 226a and 226b. At least in a certain intermediate gradation, the driving is performed in such a manner that the electric potentials of the two sub-pixel electrodes 224a and 224b are different. As described above, due to the different electric potentials of the sub-pixel electrodes 224a and 224b, the applying voltages across the liquid crystal layer of the sub-pixels Spa and Spb are different. Thus, the luminance of the sub-pixel Spa and the luminance of the sub-pixel Spb are different from each other. Accordingly, the white float can be improved.

Figure 22:
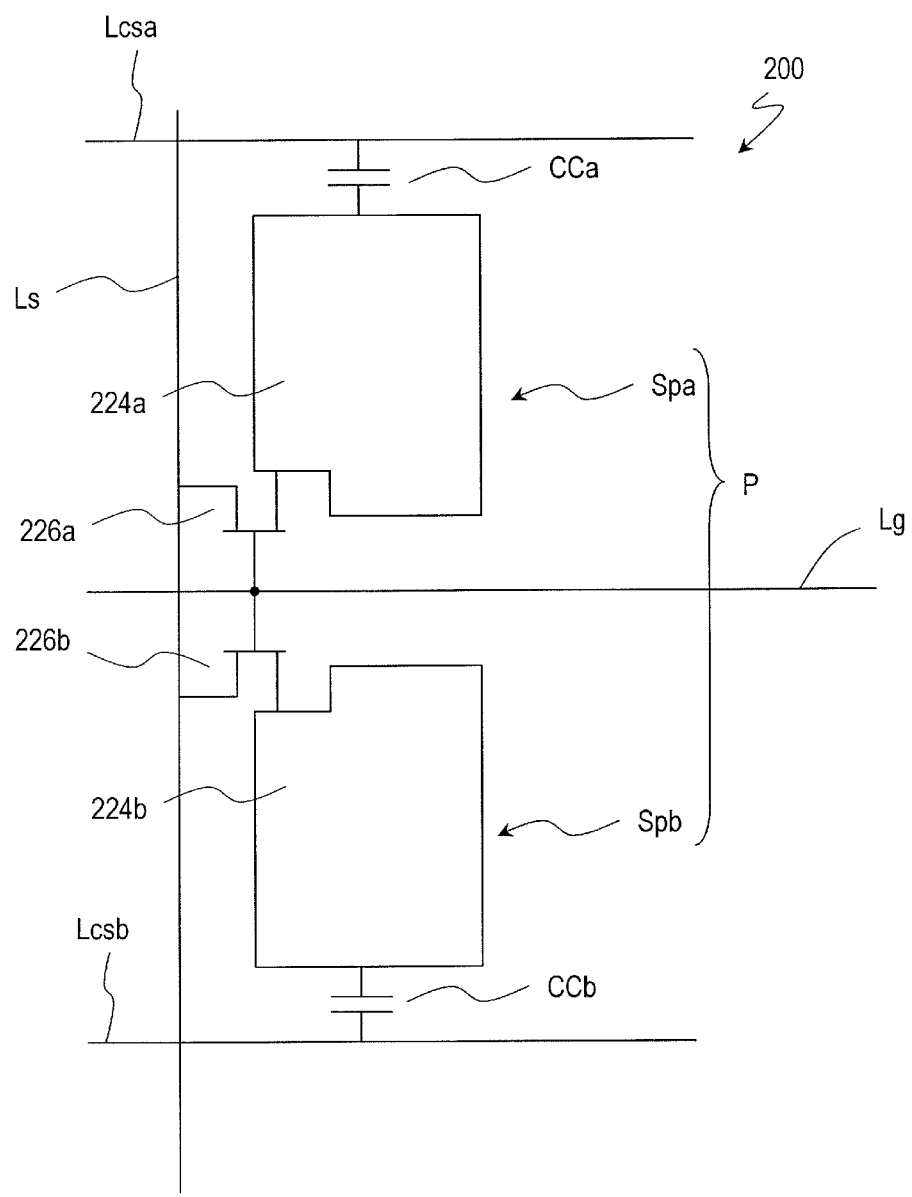
FIG. 22 is a schematic diagram showing a pixel in the liquid crystal panel shown in FIG. 14.

FIG. 22 shows a schematic diagram of one pixel in another liquid crystal panel 200. In the liquid crystal panel 200, a pixel P has a sub-pixel Spa and a sub-pixel Spb. The sub-pixel Spa is defined by a sub-pixel electrode 224a, and the sub-pixel Spb is defined by a sub-pixel electrode 224b.

The sub-pixel Spa has a liquid crystal capacitor and a storage capacitor CCa. The liquid crystal capacitor is constituted by the counter electrode 214, the sub-pixel electrode 224a, and the liquid crystal layer 230 disposed therebetween. The storage capacitor CCa is constituted by a storage capacitor electrode electrically connected to the sub-pixel electrode 224a, a storage capacitor counter electrode EOa electrically connected to a storage capacitor line Lcsa, and an insulating layer disposed therebetween.

The sub-pixel Spb has a liquid crystal capacitor and a storage capacitor CCb. The liquid crystal capacitor is constituted by the counter electrode 214, the sub-pixel electrode 224b, and the liquid crystal layer 230 disposed therebetween. The storage capacitor CCb is constituted by a storage capacitor electrode electrically connected to the sub-pixel electrode 224b, a storage capacitor counter electrode EOb electrically connected to a storage capacitor line Lcsb, and an insulating layer disposed therebetween.

The sub-pixel electrodes 224a and 224b are connected to one and the same source line Ls via different TFTs 226a and 226b. At least in a certain intermediate gradation, in accordance with a storage capacitor signal supplied to the storage capacitor lines Lcsa and Lcsb, the driving is performed in such a manner that the average electric potentials of the two sub-pixel electrodes 224a and 224b are different. For example, in the case where the average electric potential of one of the two sub-pixel electrodes 224a and 224b is increased from the electric potential corresponding to the display signal voltage supplied to the source line Ls, the average electric potential of the other one is lowered from the electric potential corresponding to the display signal voltage supplied to the source line Ls. As described above, due to the different average electric potentials of the sub-pixel electrodes 224a and 224b, the applying voltages across the liquid crystal layer of the sub-pixels are different. As a result, the luminance of the sub-pixel Spa and the luminance of the sub-pixel Spb are different from each other, thereby improving the white float. In the liquid crystal panel 200 shown in FIG. 22, one source line is provided for one column of pixels, so that the reduction of aperture ratio and the increase of power consumption can be suppressed.

Figure 23:
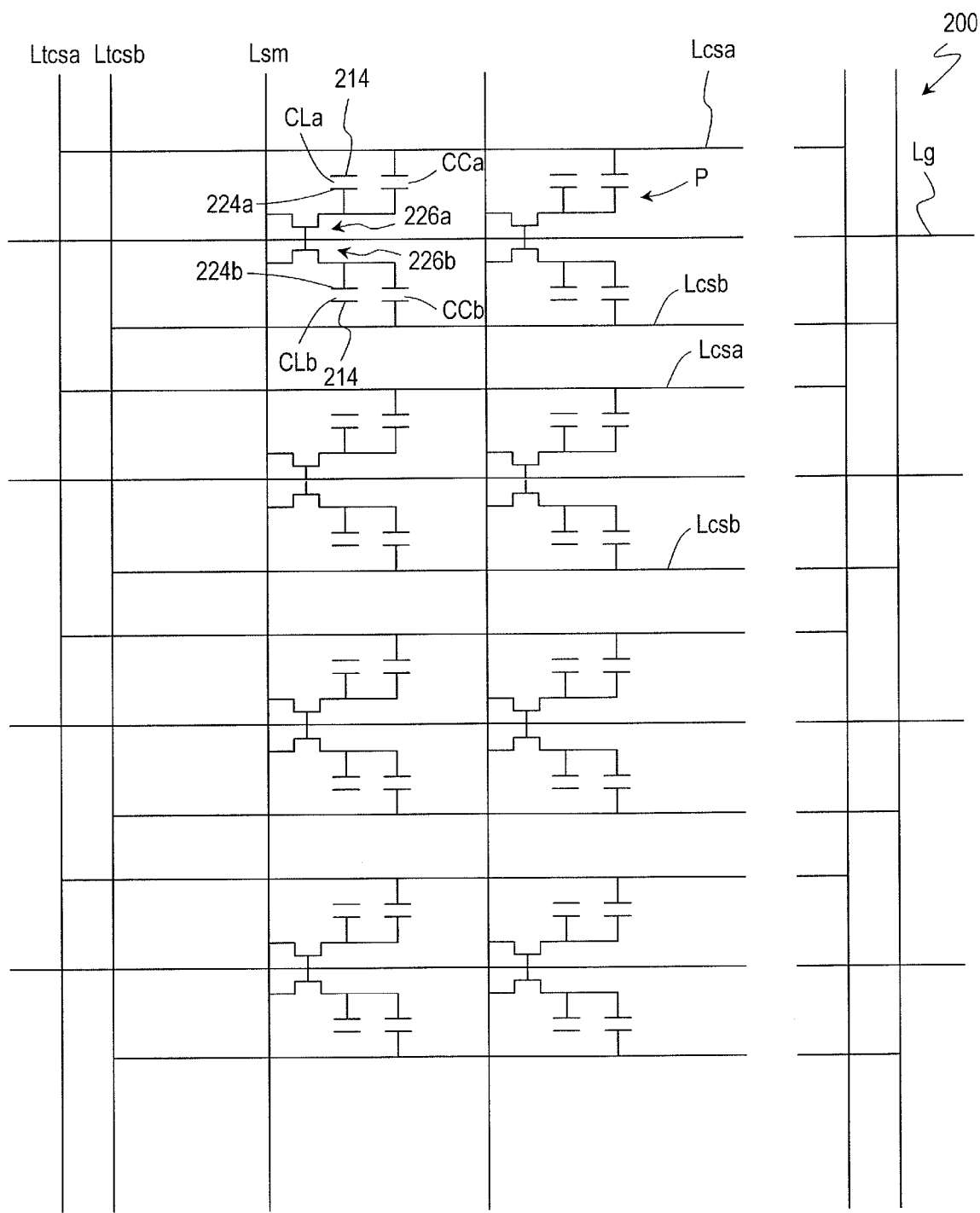
FIG. 23 is an equivalent circuit diagram of the liquid crystal panel shown in FIG. 22.

FIG. 23 shows an equivalent circuit of the liquid crystal panel 200 shown in FIG. 22. To the storage capacitor lines Lcsa and Lcsb, storage capacitor signals are supplied respectively from storage capacitor trunk lines Ltcsa and Ltcsb, respectively.

Herein, the writing to the pixel P in the liquid crystal panel 200 will be described. The scanning signal voltage supplied to the scanning line Lg is varied from the OFF voltage to the ON voltage, and accordingly the TFTs 226a and 226b are turned into the ON state. When the scanning line Lg selects a pixel in this way, the display signal voltage supplied to the source line Ls is applied to the sub-pixel electrodes 224a and 224b. Thereafter, the scanning signal voltage supplied to the scanning line Lg is varied from the ON voltage to the OFF voltage, and accordingly the TFTs 226a and 226b are turned into the OFF state. After the TFTs 226a and 226b are turned into the OFF state, the storage capacitor signal voltages supplied to the storage capacitor lines Lcsa and Lcsb are varied into different directions. Thus, the electric potential of the sub-pixel electrode 224a is varied.

For example, with respect to the pixel P to which the writing of positive polarity is performed, the first variation of the storage capacitor signal supplied to the storage capacitor line Lcsa after the TFTs 226a and 226b are turned into the OFF state is the increase, and the first variation of the storage capacitor signal supplied to the storage capacitor line Lcsb is the decrease, the luminance of the sub-pixel Spa is higher than that of the sub-pixel Spb. Alternatively, with respect to the pixel P to which the writing of negative polarity is performed, the first variation of the storage capacitor signal supplied to the storage capacitor line Lcsa after the TFTs 226a and 226b are turned into the OFF state is the increase, and the first variation of the storage capacitor signal supplied to the storage capacitor line Lcsb is the decrease, the luminance of the sub-pixel Spa is lower than that of the sub-pixel Spb.

As described above, the electric potentials of the sub-pixel electrodes 224a and 224b are substantially equal when the TFTs 226a and 226b are in the ON state, but the variations of the storage capacitor signal voltages supplied to the storage capacitor lines Lcsa and Lcsb after the TFT 226a and 226b are turned into the OFF state are different, so that the effective electric potentials of the sub-pixel electrodes 224a and 224b can be made different. Accordingly, the luminance of the sub-pixel Spa and the luminance of the sub-pixel Spb can be different from each other, and the viewing angle dependence of the gamma characteristics can be improved.

As described above, in the liquid crystal display device 100 in this embodiment, the liquid crystal panel 200 is driven at the vertical scanning frequency of 120 Hz in the planar display mode, and driven at the vertical scanning frequency of 240 Hz in the stereoscopic display mode. In this way, when the driving is performed at the vertical scanning frequency of 240 Hz, the effective voltage cannot be appropriately varied in some cases due to the signal delay of the storage capacitor signal supplied to the storage capacitor line, and the like. In such a case, in the stereoscopic display mode, the same storage capacitor signal may be supplied to the different storage capacitor lines. As described above, in the case where the liquid crystal panel 200 has the multi pixel structure, the multi pixel driving may be realized by supplying different storage capacitor signals to the storage capacitor lines Lcsa and Lcsb in the planar display mode, and the multi pixel driving may not be realized by supplying the same storage capacitor signal to the storage capacitor lines Lcsa and Lcsb in the stereoscopic display mode.

In the liquid crystal panel 200 having the multi pixel structure shown in FIG. 21 to FIG. 23, in the case where the liquid crystal panel 200 performs display in the planar display mode, the multi pixel drive is performed, and in the case where the liquid crystal panel 200 performs display in the stereoscopic display mode, the multi pixel drive is not necessarily performed. When the liquid crystal panel 200 performs display in the stereoscopic display mode, it is assumed that the observer observes the liquid crystal panel 200 in a range limited to some extent. Accordingly, in the planar display mode, by performing the multi pixel driving, the luminance of the sub-pixel Spa is made different from the luminance of the sub-pixel Spb in at least a certain intermediate gradation, thereby improving the viewing angle characteristics, and in the stereoscopic display mode, the multi pixel driving is not performed, and the luminance of the sub-pixel Spa may be equal to the luminance of the sub-pixel Spb in an arbitrary gradation. In this way, the multi pixel driving is not performed in the stereoscopic display mode in which the driving is performed at higher vertical scanning frequencies, thereby suppressing the increase of computation in a source driver and/or the influence of signal delay. As a result, the cost reduction can be realized.

(Embodiment 2)

In the above description, the frame rate control circuit generates a video signal having a frame rate of 120 fps, but the present invention is not limited to this. The frame rate control circuit may generate a video signal having a frame rate of 240 fps.

Hereinafter, with reference to FIG. 24(a) and FIG. 24(b), a liquid crystal display device and a stereoscopic display system in a second embodiment will be described. In FIG. 24(a) and FIG. 24(b) are schematic diagrams of the liquid crystal display device 100A and the stereoscopic display system 300A in this embodiment. The stereoscopic display system 300A includes the liquid crystal display device 100A and shutter glasses 280. The liquid crystal display device 100A includes a frame rate control circuit 110, a timing controller 120, a writing state signal transmitting circuit 130, a scanning signal driving circuit 140, a display signal driving circuit 150, a backlight driving circuit 160, a liquid crystal panel 200, and a backlight unit 250. The liquid crystal display device 100A and the stereoscopic display system 300A have the same configurations as those of the above-described liquid crystal display device 100 and the stereoscopic display device 300 except for the point that the frame rate control circuit 110 generates a video signal having a frame rate of 240 fps. Thus, in order to avoid the verbose description, the description which overlaps with the above description is omitted.

Figure 24:
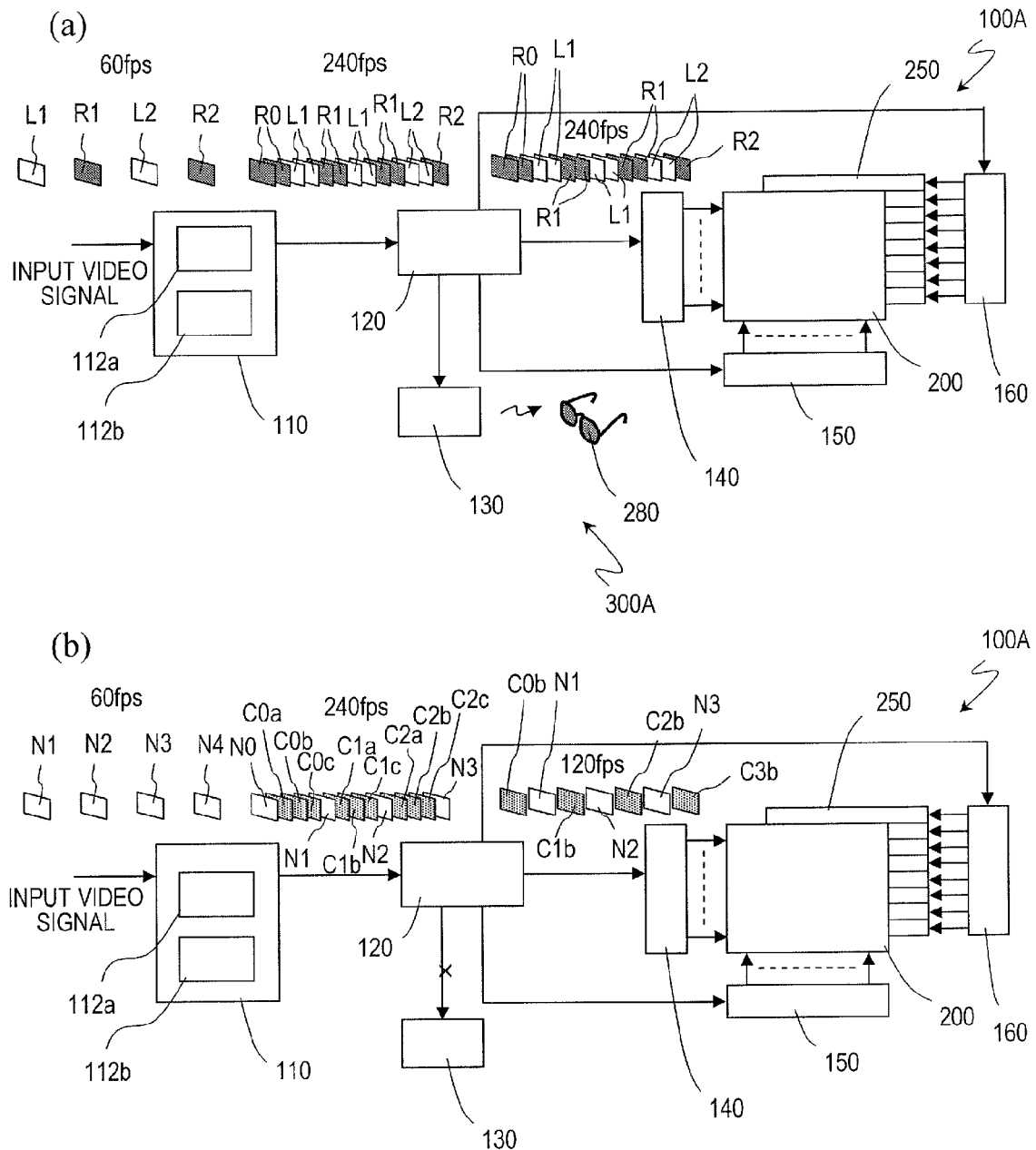
In FIG. 24, (a) is a schematic diagram of a stereoscopic display mode of a liquid crystal display device and a stereoscopic display system in a second embodiment of the present invention, and (b) is a schematic diagram of a planar display mode.
Figure 25:
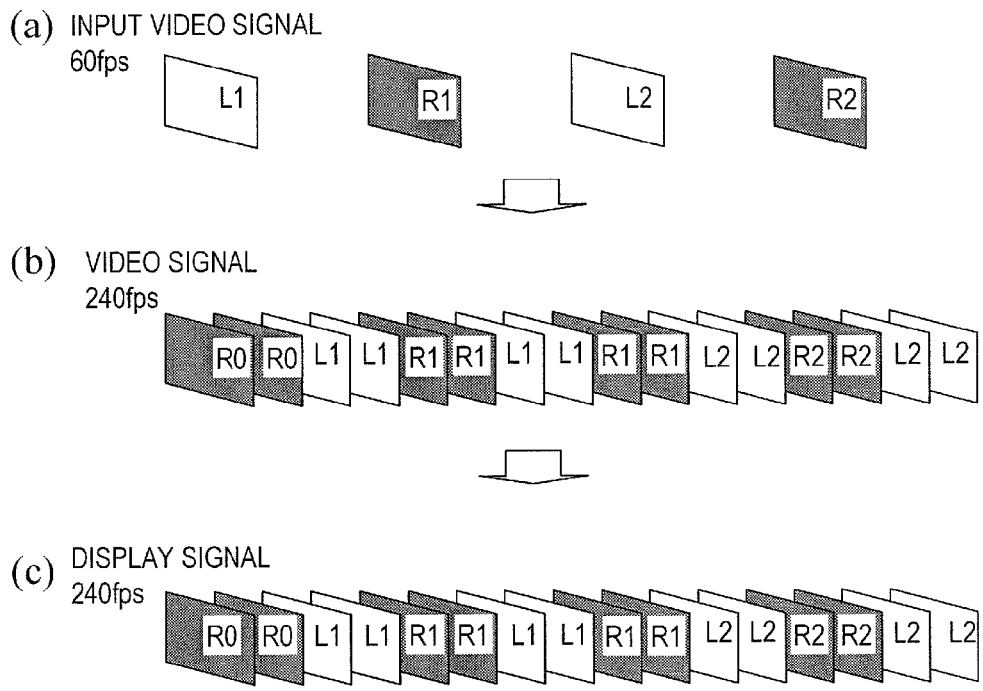
In FIG. 25, (a) is a schematic diagram of image data included in an input video signal input into the liquid crystal display device shown in FIG. 24 in the stereoscopic display mode, (b) is a schematic diagram of image data included in a video signal, and (c) is a schematic diagram of image data included in a display signal.

Hereinafter, with reference to FIG. 24(a) and FIG. 25, the stereoscopic display mode of the liquid crystal display device 100A and the stereoscopic display system 300A will be described. The image data shown in FIG. 24(a) is enlarged and shown in FIG. 25. FIG. 25(a) is a schematic diagram of image data included in an input video signal, FIG. 25(b) is a schematic diagram of image data included in a video signal, and FIG. 25(c) is a schematic diagram of image data included in a display signal.

Herein, the input video signal having a frame rate of 60 fps is input into the frame rate control circuit 110. For example, the input video signal is the NTSC signal. In the input video signal, image data to be displayed in the stereoscopic display mode is included. In the input video signal, left-eye image data and right-eye image data are alternately indicated. Herein in the video signal, image data L1, R1, L2, R2, . . . are arranged in this order (see also FIG. 25(a)). Although not shown in the figure, before the left-eye image data L1, right-eye image data R0 and left-eye image data L0 are arranged.

The frame rate control circuit 110 generates a video signal having a higher frame rate than the frame rate of 60 fps of the input video signal based on the input video signal. Herein, the frame rate of the video signal is set to be 240 fps. The frame rate control circuit 110 duplicates left-eye image data and right-eye image data of the input video signal, respectively, and two sets of image data each one of which is obtained by successively arranging a pair of left-eye image data and a pair of right-eye image data, respectively, are repeatedly arranged in the video signal. Accordingly, in the video signal, paired left-eye image data and paired right-eye image data are alternately arranged. Herein, in the video signal, image data R0, R0, L1, L1, R1, R1, L1, L1, R1, R1, L2, L2, . . . are arranged in this order (see also FIG. 25(b)). The frame rate of the video signal (240 fps) is set to be four time as high as the frame rate of the input video signal (60 fps).

As described above, the frame rate of the video signal is set to be 240 fps, and the left-eye image data corresponds to 120 fps and the right-eye image data corresponds to 120 fps. In the case where the liquid crystal panel 200 complies with Full High-vision standard (1920×1080), the frame rate control circuit 110 which generates a video signal having a frame rate of 240 fps is produced by using two application specific integrated circuits 112*a* and 112*b* with relatively higher versatility. The application specific integrated circuit 112*a* is utilized for driving the left half of the liquid crystal panel 200 and the application specific integrated circuit 112*b* is utilized for driving the right half of the liquid crystal panel 200.

Based on the video signal output from the frame rate control circuit 110, the timing controller 120 controls the writing state signal transmitting circuit 130, the scanning signal driving circuit 140, the display signal driving circuit 150, and the backlight driving circuit 160. The timing controller 120 generates a display signal based on the video signal, and outputs the display signal to the display signal driving circuit 150. The frame rate of the display signal is set to be 240 fps which is equal to the frame rate of the video signal. In the display signal, image data R0, R0, L1, L1, R1, R1, L1, L1, R1, R1, L2, L2, . . . are arranged in this order (see also FIG. 25(*c*)). The frame rate of the display signal (240 fps) is set to be equal to the frame rate of the video signal (240 fps). The scanning signal driving circuit 140 and the display signal driving circuit 150 drive the liquid crystal panel 200 at the vertical scanning frequency of 240 Hz. At this time, left-eye image data corresponds to 120 fps, and right-eye image data corresponds to 120 fps.

Based on the signal from the timing controller 120, the writing state signal transmitting circuit 130 transmits a writing state signal indicating the writing state of a plurality of pixels in the stereoscopic display mode. The shutter glasses 280 open and/or close the left-shutter 282 and the right-eye shutter 284 based on the writing state signal.

Figure 26:
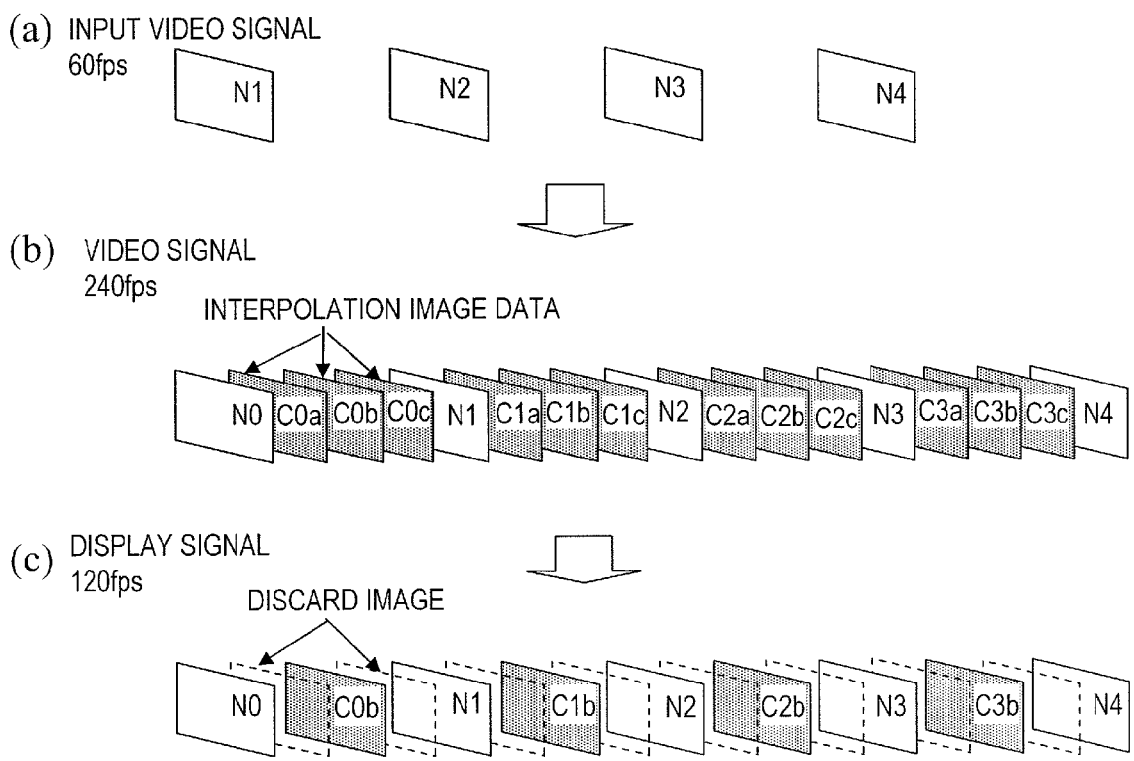
In FIG. 26, (a) is a schematic diagram of image data included in the input video signal input into the liquid crystal display device shown in FIG. 24 in the planar display mode, (b) is a schematic diagram of image data included in a video signal, and (c) is a schematic diagram of image data included in a display signal.

Next, with reference to FIG. 24(*b*), the planar display mode of the liquid crystal display device 100A will be described. FIG. 24(*b*) is a schematic diagram of the liquid crystal display device 100A which performs display in the planar display mode. The image data included in the signal shown in FIG. 24(*b*) is enlarged and shown in FIG. 26. FIG. 26(*a*) is a schematic diagram of image data included in an input video signal, FIG. 26(*b*) is a schematic diagram of image data included in a video signal, and FIG. 26(*c*) is a schematic diagram of image data included in a video signal output from the timing controller 120.

The input video signal having the frame rate of 60 fps is input into the frame rate control circuit 110. In the input video signal, image data N1, N2, N3, N4, . . . are arranged in this order (see also FIG. 26(*a*)). Although not shown in the figure, before the image data N1, image data N0 is arranged.

The frame rate control circuit 110 generates a video signal having a frame rate of 240 fps higher than the frame rate of 60 fps of the input video signal based on the input video signal. For example, the frame rate control circuit 110 generates three interpolation image data based on two successive image data included in the input video signal, and arranges the two image data in the video signal and the three interpolation image data between the two image data. Specifically, the frame rate control circuit 110 generates interpolation image data C0*a*, C0*b*, and C0*c* based on the image data N0 and N1 of the input video signal, and arranges the image data N0 and N1 in the video signal, and the interpolation image data C0*a*, C0*b*, and C0*c* between the image data N0 and the image data N1. In the video signal, image data N0, C0*a*, C0*b*, C0*c*, N1, C1*a*, C1*b*, C1*c*, N2, C2*a*, C2*b*, C2*c*, N3, C3*a*, C3*b*, C3*c*, N4 . . . are arranged in this order (see also FIG. 26(*b*)). As described above, in the video signal, image data included in the input video signal and interpolation image data generated by interpolation are arranged, and the frame rate of the video signal (240 fps) is set to be four times as high as the frame rate of the input video signal (60 fps).

Based on the video signal output from the frame rate control circuit 110, the timing controller 120 controls the scanning signal driving circuit 140, the display signal driving circuit 150, and the backlight driving circuit 160. The timing controller 120 generates a display signal having a frame rate of 120 fps which is lower than the frame rate of 240 Hz of the video signal. More concretely, the timing controller 120 generates a display signal by discarding a part of image data in the video signal. As described above, in the video signal, image data N0, C0*a*, C0*b*, C0*c*, N1, C1*a*, C1*b*, C1*c*, N2, C2*a*, C2*b*, C2*c*, N3, C3*a*, C3*b*, C3*c*, N4, . . . are arranged in this order. However, the timing controller 120 discards the image data C0*a*, C0*c*, C1*a*, C1*c*, C2*a*, C2*c*, C3*a*, and C3*c*. In this way, the timing controller 120 alternately discards the image data included in the video signal, so that the frame rate of the display signal is the half of the video signal. Herein in the display signal, image data N0, C0*b*, N1, C1*b*, N2, C2*b*, N3, C3*b*, N4, . . . are arranged in this order (see also FIG. 26(*c*)). The frame rate of the display signal (120 fps) is set to be the half of the frame rate of the video signal (240 fps). The scanning signal driving circuit 140 and the display signal driving circuit 150 drive the liquid crystal panel 200 at the vertical scanning frequency of 120 Hz. In the planar display mode, the backlight driving circuit 160 controls the backlight unit 250 so that the backlight unit 250 is turned on over all of the periods.

As described above, in the liquid crystal display deice 100A, by way of the control of the timing controller 120, the vertical scanning frequency of the liquid crystal panel 200 driven by the display signal driving circuit 150 and the backlight driving circuit 160 is varied in accordance with the display mode. Specifically, the liquid crystal panel 200 is driven at the vertical scanning frequency of 240 Hz in the stereoscopic display mode, and driven at the vertical scanning frequency of 120 Hz in the planar display mode. Accordingly, the increase of power consumption in the planar display mode can be suppressed.

As is understood from the comparison between FIG. 25 and FIG. 26, the frame rate control circuit 110 generates interpolation image data based on successive image data of the input video signal in the planar mode, thereby increasing the frame rate, and duplicates image data of the input video signal in the stereoscopic display mode, thereby increasing the frame rate. In this way, in the stereoscopic display mode, instead of the generation of interpolation image data, the duplication of image data is performed, so that the increase in frame rate can be easily performed. Alternatively, the frame rate control circuit 110 may generate interpolation left-eye image data based on successive left-eye image data included in the input video signal, and similarly, generate interpolation right-eye image data based on the right-eye image data included in the input video signal.

Figure 27:
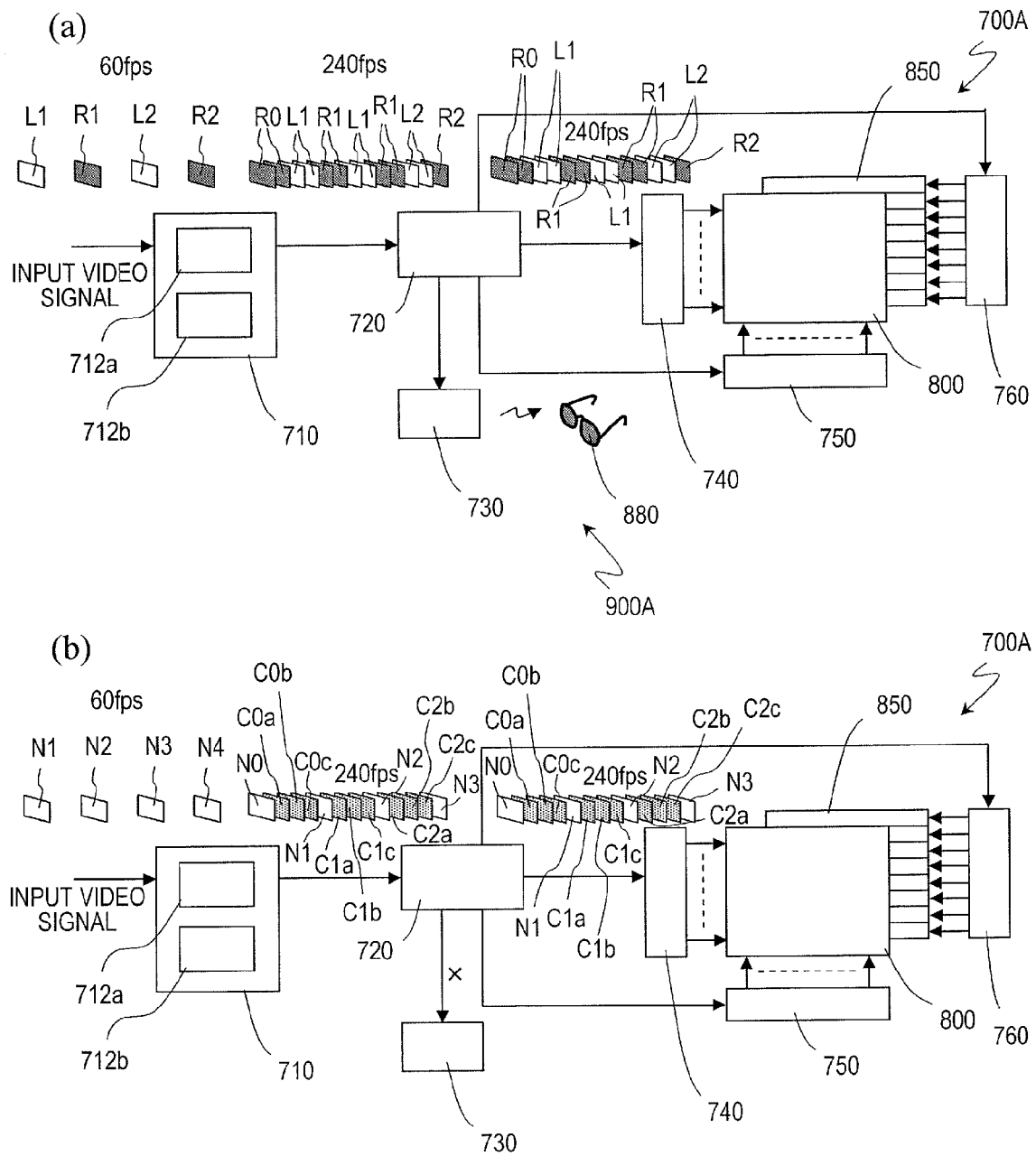
In FIG. 27, (a) is a schematic diagram of a stereoscopic display mode of a liquid crystal display device and a stereoscopic display system in a comparative example 2, and (b) is a schematic diagram of a planar display mode.

Hereinafter, advantages of the liquid crystal display device 100A and the stereoscopic display system 300A in this embodiment will be described in comparison with a liquid crystal display device 700A and a stereoscopic display system 900A in a comparative example 2. First, with reference to FIG. 27, the liquid crystal display device 700A and the stereoscopic display system 900A in the comparative example 2 will be described. The stereoscopic display system 900A includes the liquid crystal display device 700A and shutter glasses 880. The liquid crystal display device 700A includes a frame rate control circuit 710, a timing controller 720, a writing state signal transmitting circuit 730, a scanning signal driving circuit 740, a display signal driving circuit 750, a backlight driving circuit 760, a liquid crystal panel 800, and a backlight unit 850. The liquid crystal display device 700A and the stereoscopic display system 900A are different from the liquid crystal display device 100A and the stereoscopic display system 300A in that the frame rate control circuit 710 generates a video signal having a frame rate of 240 fps based on an input video signal having a frame rate of 60 fps, and the liquid crystal panel 800 is driven at the vertical scanning frequency of 240 Hz in both of the stereoscopic display mode and the planar display mode.

With reference to FIG. 27(a), the stereoscopic display mode of the liquid crystal display device 700A and the stereoscopic display system 900A will be described. An input video signal having the frame rate of 60 Hz is input into the frame rate control circuit 710. In the input video signal, image data L1, R1, L2, R2 . . . are arranged in this order. Although not shown in the figure, before the left-eye image data L1, right-eye image data R0 and left-eye image data L0 are arranged.

Based on the input video signal having the frame rate of 60 fps, the frame rate control circuit 710 generates a display signal having a frame rate of 240 fps. The frame rate control circuit 710 duplicates the left-eye image data and the right-eye image data of the input video signal, respectively, and repeatedly arranges two sets in each of which paired left-eye image data and paired right eye image data are successively arranged, in the video signal. Accordingly, in the video signal, a pair of left-eye image data and a pair of right-eye image data are alternately arranged. Herein in the video signal, image data R0, R0, L1, L1, R1, R1, L1, L1, R1, R1, L2, L2 . . . are arranged in this order. The frame rate control circuit 710 has application specific integrated circuits 712a and 712b.

The timing controller 720 controls the writing state signal transmitting circuit 730, the scanning signal driving circuit 740, the display signal driving circuit 750, and the backlight driving circuit 760 based on the video signal output from the frame rate control circuit 710. The timing controller 720 generates a display signal based on the video signal, and outputs the display signal to the display signal driving circuit 750. The frame rate of the display signal is set to 240 fps which is equal to the frame rate of the video signal. In the display signal, image data R0, R0, L1, L1, R1, R1, L1, L1, R1, R1, L2, L2 . . . are arranged in this order. The scanning signal driving circuit 740 and the display signal driving circuit 750 drive the liquid crystal panel 800 at the vertical scanning frequency of 240 Hz.

The backlight driving circuit 760 controls the backlight unit 850, so that the backlight unit 850 turns on in accordance with the latter image data of left-eye image data and right-eye image data which are successively arranged, respectively. Based on the writing state signal from the writing state signal transmitting circuit 730, the shutter glasses 880 opens the left-eye shutter 882 in a period in which the liquid crystal panel 800 displays the left-eye image, and opens the right-eye shutter 884 in a period in which the liquid crystal panel 800 displays the right-eye image.

Next, with reference to FIG. 27(b), the planar display mode of the liquid crystal display device 700A will be described. An input video signal having a frame rate of 60 fps is input into the frame rate control circuit 710. In the input video signal, image data N1, N2, N3, N4 are arranged in this order. Although not shown in the figure, before the image data N1, image data N0 is arranged.

The frame rate control circuit 710 generates a video signal having a frame rate of 240 fps based on the input video signal having the frame rate of 60 fps. The frame rate control circuit 710 generates three interpolation image data based on two successive image data included in the input video signal, and arranges the two image data in the video signal and the three interpolation image data between the two image data. For example, in the video signal, image data N0, C0a, C0b, C0c, N1, C1a, C1b, C1c, N2, C2a, C2b, C2c, N3, C3a, C3b, C3c, N4 are arranged in this order.

Based on the video signal output from the frame rate control circuit 710, the timing controller 720 controls the scanning signal driving circuit 740, the display signal driving circuit 750, and the backlight driving circuit 760. The timing controller 720 generates a display signal having a frame rate of 240 fps which is equal to the frame rate of 240 Hz of the video signal. In the video signal, image data N0, C0a, C0b, C0c, N1, C1a, C1b, C1c, N2, C2a, C2b, C2c, N3, C3a, C3b, C3c, N4, . . . are arranged in this order. The scanning signal driving circuit 740 and the display signal driving circuit 750 drive the liquid crystal panel 800 at the vertical scanning frequency of 240 Hz. In the planar display mode, the backlight driving circuit 760 controls the backlight unit 850 so that the backlight unit 850 is turned on over all of the periods.

As described above, in the liquid crystal display deice 700A in the comparative example 2, the liquid crystal panel 800 is driven at the vertical scanning frequency of 240 Hz regardless of the stereoscopic display mode and the planar display mode. Accordingly, the power consumption is increased. On the contrary, in the liquid crystal display device 100A, the liquid crystal panel 200 is driven at the vertical scanning frequency of 120 Hz which is the half of that in the stereoscopic display mode, so that the increase of power consumption can be suppressed.

In the above description, the frame rate of the input video signal input into the liquid crystal display device 100A is 60 fps, but the present invention is not limited to this. The frame rate of the input video signal may have another value. For example, the input video signal may be a PAL signal, and the frame rate of the input video signal may be 50 fps. In this case, the frame rate of the video signal is set to be 200 fps, and the frame rate of the display signal is set to be 200 fps in the stereoscopic display mode and set to be 100 fps in the planar display mode.

Also in the liquid crystal display device 100A in this embodiment, display signal voltages of different polarities may be supplied to adjacent source lines. Alternatively, in a certain frame updating period, a display signal voltage having the same polarity may be supplied to all of the source lines. In such a case, at the end of the certain frame updating period, the polarities of pixels adjacent in the column direction are the same.

Alternatively, at the end of the certain frame updating period, the polarities of pixels adjacent in the row direction and the column direction may be inverted. For example, in the certain frame updating period, the polarities of display signal voltages supplied to respective source lines may be inverted for each horizontal scanning period. For example, the liquid crystal panel 200 may be driven by dot inversion.

Also in the liquid crystal display device 100A in this embodiment, pixels may be selected sequentially from the upper end to the lower end of the liquid crystal panel. Alternatively, as for the pixels arranged in a matrix, the writing may be performed for pixels in odd-numbered rows and even-numbered rows in a block. For example, the writing into respective pixels may be performed in the way as described above with reference to FIG. 17 to FIG. 19.

As described above, in the stereoscopic display mode, in the liquid crystal panel 200, left-eye image data is written successively in two vertical scanning periods, and right-eye image data is written successively in two vertical scanning periods. Also in the liquid crystal display device 100A, as described above with reference to FIG. 15 and FIG. 16, it is preferred that the left-eye image data or the right-eye image data may be written with the same polarity in the successive two vertical scanning periods. In this case, even if the supply of the display signal voltage to the pixel electrode 224 is not sufficiently performed by the first writing of the left-eye image data or the right-eye image data because the period of time in which the pixel is selected is short, the supply of the display signal voltage to the pixel electrode 224 can be sufficiently performed by the second writing of the left-eye image data or the right-eye image data. Also in the liquid crystal display device 100A and the stereoscopic display system 300A, the overdrive driving may be performed.

Figure 28:
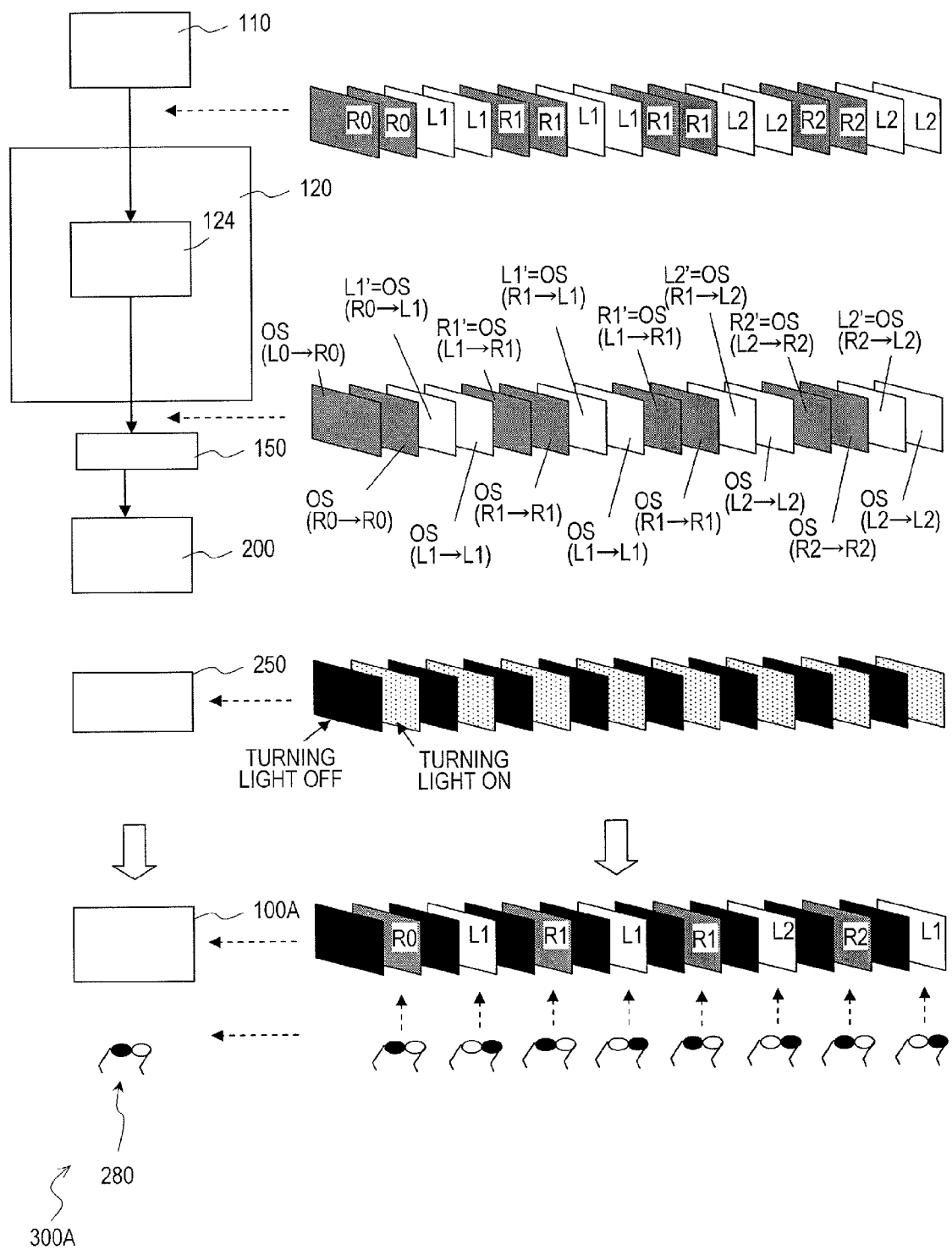
FIG. 28 is a schematic diagram showing the variation of image data in the stereoscopic display system shown in FIG. 24 in which overdrive processing is performed.

FIG. 28 shows a schematic diagram of the stereoscopic display system 300A which performs the overdrive driving. The stereoscopic display system 300A has the same configuration as that of the stereoscopic display system 300 described above with reference to FIG. 20 except for the point that the timing controller 120 does not include the signal duplicating portion 122. Thus, the description which overlaps with the above description is omitted in order to avoid verbose description.

As described above with reference to FIG. 24, the frame rate control circuit 110 generates a video signal having a frame rate of 240 fps which is higher than the frame rate of 60 fps of the input video signal based on the input video signal. In the video signal, image data R0, R0, L1, L1, R1, R1, L1 , L1, R1, R1, L2, L2, R2, R2, L2, L2 . . . are arranged in this order.

The overdrive driving portion 124 produces new image data based on image data concerned and the previous image data. Specifically, for each of the plurality of pixels, new gradation level is set based on the gradation level of the image data concerned, and the gradation level of the previous image data.

Herein, one pixel is focused on in order to prevent the description from being excessively complicated, and the description of overdrive driving is performed in the case where the image data is varied in the order of R0, R0, L1, and L1.

In the case where the image data of the video signal is not varied, the overdrive driving is not performed. In such a case, the image data of the display signal output from the overdrive driving portion 124 is R0 (=OS(R0→R0)).

In the case where the image data of the video signal is varied from R0 to L1 which is different from R0, the overdrive driving is performed. First, it is assumed that the gradation level of the image data R0 corresponds to a lower voltage, and the gradation level of the image data L1 corresponds to a higher voltage. In this case, due to the overdrive driving by the overdrive driving portion 124, when the image data R0 is varied to the image data L1, image data L1' (=OS(R0→L1) is set instead of the image data L1. In this case, across the liquid crystal layer 230, a voltage VL1' which is still higher than the voltage VL1 corresponding to the gradation level of the image data L1 is applied. Thereafter, in the case where the image data of the video signal is varied from L1 to L1, the overdrive driving is not performed, and across the liquid crystal layer 230, a voltage VL1 corresponding to the gradation level of the image data L1 is applied. As described above, when the gradation level is varied in accordance with the variation from a lower voltage to a higher voltage, the overdrive driving portion 124 sets a gradation level which is still higher than the gradation level of the image data in the video signal.

Next, it is assumed that the gradation level of the image data R0 corresponds to a higher voltage, and the gradation level of the image data L1 corresponds to a lower voltage. In this case, due to the overdrive driving by the overdrive driving portion 124, image data L1' (=OS(R0→L1)) is set instead of the image data L1. In this case, across the liquid crystal layer 230, a voltage VL1' which is still lower than the voltage VL1 corresponding to the gradation level of the image data L1 is applied. Thereafter, in the case where the image data of the video signal is varied from L1 to L1, the overdrive driving is not performed, and across the liquid crystal layer 230, a voltage VL1 corresponding to the gradation level of the image data L1 is applied. As described above, when the gradation level is varied in accordance with the variation from a higher voltage to a lower voltage, the overdrive driving portion 124 sets a gradation level corresponding to a voltage which is still lower than the gradation level of the image data in the video signal.

In the display signal output from the overdrive driving portion 124, image data R0, R0, L1', L1, R1', R1, L1', L1, R1', R1, L2', L2, R2', R2, L2', L2, . . . are arranged in this order. Accordingly, in the vertical scanning period in which the right-eye image data and the left-eye image data are switched, the electric potential of the pixel electrode 224 can be the target electric potential.

Herein the backlight unit 250 is turned on in accordance with the latter vertical scanning period of the two vertical scanning periods into which the right-eye image data and the left-eye image data are successively written. Specifically, the backlight unit 250 is turned off in a period in which the image data after the overdrive driving is written, and is turned on in a period in which the next image data is written.

The left-eye shutter 282 of the shutter glasses 280 is opened in a period in which the liquid crystal panel 200 displays the left-eye image and the backlight unit 250 is turned on, and is closed in the other period. The right-eye shutter 284 of the shutter glasses 280 is opened in a period in which the liquid crystal panel 200 displays the right-eye image and the backlight unit 250 is turned on, and is closed in the other period.

The overdrive driving may be performed with reference to a lookup table, or by way of arithmetic processing. Alternatively, the overdrive driving may be performed by combining them.

In the above description, the overdrive driving is performed based on the gradation level of the image data concerned, and the gradation level of one image data previous to the image data, but the present invention is not limited to this. The overdrive driving may be performed based on the gradation level of the image data concerned, and the gradation level of two or more image data previous to the image data. As described above, the overdrive driving may be performed based on the gradation level of the image data concerned, and gradation levels of at least one image data previous to the image data.

(Embodiment 3)

In the above-described liquid crystal display device, the stereoscopic display mode and the planar display mode can be switched, but the present invention is not limited to this. The liquid crystal display device may perform display only in the stereoscopic display mode, and the switching of display mode is not performed.

Figure 29:
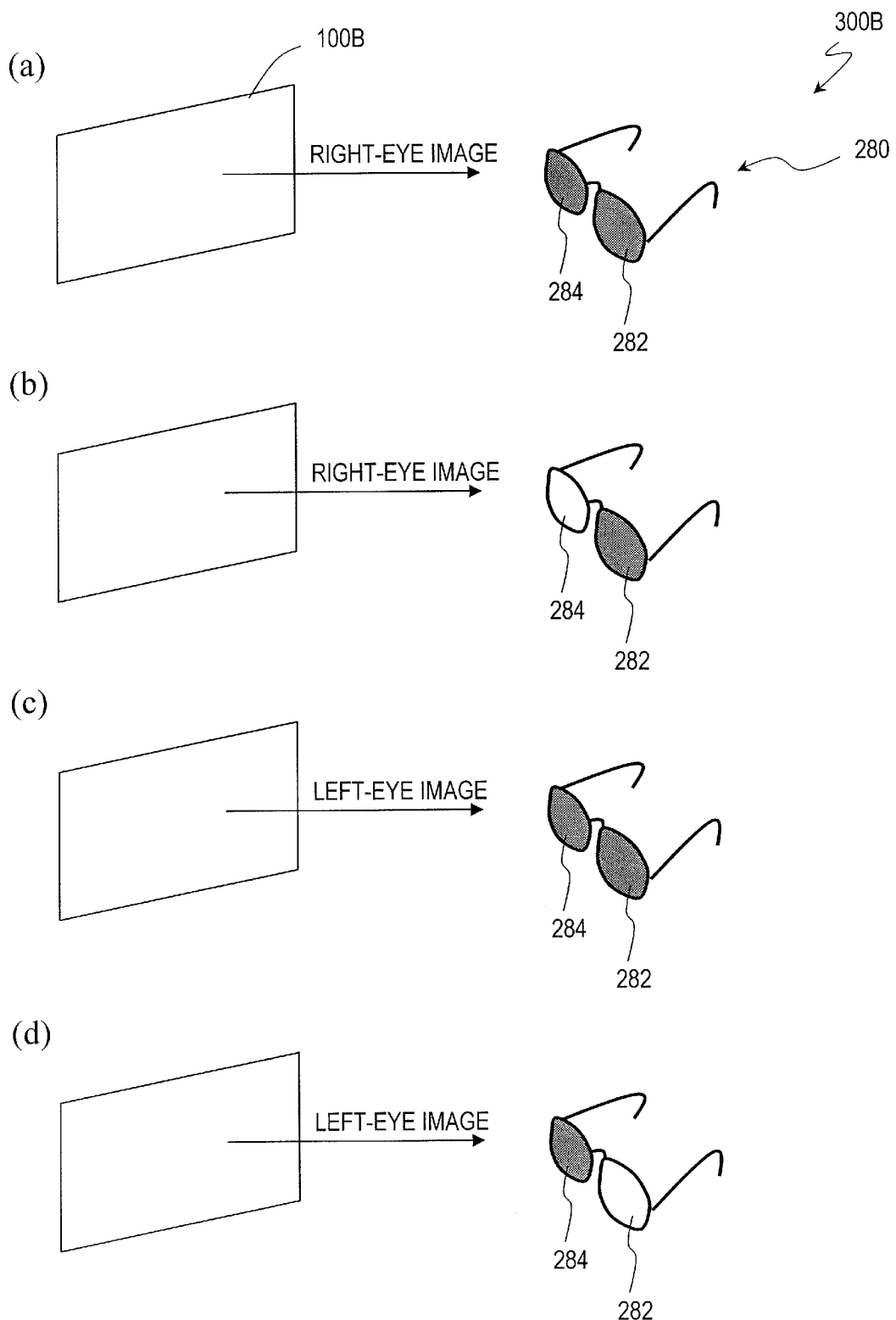
In FIG. 29, (a) to (d) are schematic diagrams showing images displayed on a liquid crystal display device and a stereoscopic display system in a third embodiment of the present invention.

Hereinafter, a liquid crystal display device and a stereoscopic display system in a third embodiment of the present invention will be described. FIG. 29 shows a liquid crystal display device 100B and a stereoscopic display system 300B in this embodiment. The liquid crystal display device 100B in this embodiment does not perform display in the planer display mode, but performs display only in the stereoscopic display mode. The stereoscopic display system 300 B includes the liquid crystal display device 100B and shutter glasses 280. The liquid crystal display device 100B is driven at the vertical scanning frequency of 240 Hz, for example.

FIG. 29(a) to FIG. 29(d) are schematic diagrams of the stereoscopic display system 300B in successive frame updating periods. FIG. 29(a) to FIG. 29(d) show, for example, the stereoscopic display system 300B at the end of the respective frame updating periods.

As shown in FIG. 29(a), in a certain frame updating period, the liquid crystal display device 100B displays right-eye image. The left-eye shutter 282 and the right-eye shutter 284 of the shutter glasses 280 are both closed.

At this time, as for the polarities of respective pixels of the liquid crystal display device 100B, for example, the polarities of pixels adjacent in the column direction are the same, and the polarities of pixels adjacent in the row direction are inverted. Alternatively, the polarities of all pixels may be the positive polarity or the negative polarity. Alternatively, the polarities of pixels adjacent in the row direction and the column direction may be inverted from each other.

As shown in FIG. 29(b), in the next frame updating period, the liquid crystal display device 100B displays right-eye image. Also in the liquid crystal display device 100B, the writing of right-eye image is performed over two successive frame updating periods. At this time, the right-eye shutter 284 of the shutter glasses 280 is opened, so that the observer can visually recognize the right-eye image. In the liquid crystal display device 100B, the writing of right-eye image data is performed in two successive vertical scanning periods with the same polarity, so that the polarities of respective pixels are the same as those in the previous frame updating period.

As shown in FIG. 29(c), in the frame updating period after the next one, the liquid crystal display device 100B displays left-eye image. At this time, the left-eye shutter 282 and the right-eye shutter 284 of the shutter glasses 280 are both closed. The polarities of respective pixels are inverted from the polarities in the previous frame updating period.

As shown in FIG. 29(d), in the next frame updating period, the liquid crystal display device 100B displays left-eye image. Also in the liquid crystal display device 100B, the writing of left-eye image is performed over two successive frame updating periods. At this time, the left-eye shutter 282 of the shutter glasses 280 is opened, so that the observer can visually recognize the left-eye image. In the liquid crystal display device 100B, the writing of left-eye image data is performed over the two successive vertical scanning periods with the same polarity, so that the polarities of respective pixels are the same as the polarities in the previous frame updating period.

As described above, in the liquid crystal display device 100B in this embodiment, the writing of left-eye image data is performed over two successive vertical scanning periods with the same polarity, and the writing of right-eye image data is performed over two successive vertical scanning periods with the same polarity. In this way, the writing of left-eye image data and the writing of right-eye image data are performed with the same polarities, so that the degrees of luminance of respective pixels in the visually recognized periods can be varied to predetermined degrees of luminance. Thus, the display unevenness can be suppressed.

Hereinafter, with reference to FIG. 30 and FIG. 31, the specific example of the liquid crystal display device 100B and the stereoscopic display system 300B will be described.

FIG. 30(a) is a schematic diagram of the stereoscopic display system 300B. The liquid crystal display device 100B includes a liquid crystal panel 200 and a backlight unit 250 for irradiating the liquid crystal panel 200 with light. For example, the liquid crystal panel 200 is driven at the vertical scanning frequency of 240 Hz. Although not shown in the figure, the backlight unit 250 has a plurality of illuminating regions which can be individually turned on/off, respectively.

FIG. 30(b) is a schematic diagram of the liquid crystal panel 200. The liquid crystal panel 200 includes a front substrate 210, a back substrate 220, and a liquid crystal layer 230 disposed between the front substrate 210 and the back substrate 220. The front substrate 210 has a transparent insulating substrate 212 and a counter electrode 214. The back substrate 220 has a transparent insulating substrate 222 and a pixel electrode 224. The liquid crystal panel 200 has the same configuration as that of the liquid crystal panel described above with reference to FIG. 14, and the description which overlaps with the above description is omitted in order to avoid verbose description.

Hereinafter, with reference to FIG. 31, the variation of signal voltage, the backlight unit 250, and the open/close of the shutter glasses 280 in the stereoscopic display system 300 will be described.

FIG. 31(a) shows the variation of an electric potential VLs of a source line by using an electric potential Vcom of the counter electrode 214 as a reference, FIG. 31(b) shows the waveform of a scanning signal voltage VLg, FIG. 31(c) shows the variation of an electric potential Vpe of the pixel electrode 224 by using the electric potential Vcom of the counter electrode 214 as a reference, FIG. 31(d) shows the turning on/off of a specific one of illuminating regions of the backlight unit 250, and FIG. 31(e) shows the open/close of the shutter glasses 280.

As described above, the liquid crystal panel 200 is driven at the vertical scanning frequency of 240 Hz, so that one vertical scanning period (a frame updating period) is about 4.2 ms. Herein the liquid crystal panel 200 complies with the High-vision standard, and a period in which one scanning line is selected is about 3.4 82 s.

As is understood from FIG. 31(a), the relationship between the electric potential of the display signal supplied to each source line and the electric potential of the counter electrode is not varied over the frame updating period, and the polarities of pixels adjacent in the column direction are mutually the same at the end of the frame updating period. Accordingly, the variation of the electric potential of the display signal within the frame updating period can be reduced, thereby reducing the power consumption. In FIG. 31(a), a display signal voltage of positive polarity is supplied to the source line in a first frame updating period, but a display signal voltage of negative polarity is supplied to a source line adjacent to the above-mentioned source line in the first frame updating period.

In the first frame updating period (1F), a display signal indicating higher electric potential than that of the counter electrode 214 is supplied to the source line. Herein when the scanning signal voltage for selecting a certain pixel becomes an ON voltage, a display signal voltage is supplied to a pixel electrode 224 of the certain pixel, thereby performing the writing with positive polarity. At this time, the display signal voltage supplied to the source line is set so as to make the electric potential of the pixel electrode 224 a target electric potential. The target electric potential is set so that the potential difference between the counter electrode 214 and the pixel electrode 224 corresponds to the gradation level. In this way, the charging of the liquid crystal layer 230 is progressed by supplying the display signal voltage to the pixel electrode 224. However, since the liquid crystal panel 200 is driven at the vertical scanning frequency of 240 Hz, and the period in which a scanning line is selected and the display signal voltage is supplied to the pixel electrode 224 is relatively short, the scanning signal voltage is returned to the OFF voltage before the electric potential of the pixel electrode 224 reaches the target electric potential. The illuminating region of the backlight unit 250 is turned off at least in the middle of the first frame updating period, so that the right-eye image written in the first frame updating period is not visually recognized by the observer. The right-eye shutter 284 is opened in the latter half of the first frame updating period.

In a second frame updating period (2F), a display signal indicating higher electric potential than that of the counter electrode 214 is supplied to the source line. As described above, the writing of right-eye image is performed successively in two frame updating periods. When the scanning signal voltage for selecting the corresponding pixel becomes an ON voltage, a display signal voltage is supplied to a pixel electrode 224 of the corresponding pixel, thereby performing the writing with positive polarity. In the liquid crystal display device 100B, the polarity written in the second frame updating period is the same as that in the first frame updating period, and the display signal voltage supplied to the source line is set so as to make the electric potential of the pixel electrode 224 a target electric potential with the same polarity as that of the target electric potential in the first frame updating period. Accordingly, the electric potential of the pixel electrode 224 reaches the target electric potential. Herein the target electric potential in the second frame updating period is equal to the target electric potential in the first frame updating period. However, due to the above-described overdrive driving and the like, the target electric potential in the second frame updating period may be different from the target electric potential in the first frame updating period. Thereafter, the scanning signal voltage is returned to the OFF voltage. The illuminating region of the backlight unit 250 is turned on over one vertical scanning period after the writing of the corresponding pixel is performed in the second frame updating period. The right-eye shutter 284 is kept opened over the second frame updating period. Accordingly, the right-eye image written in the second frame updating period is visually recognized by the observer. As described above, the electric potential of the pixel electrode 224 reaches the target electric potential, and the pixel exhibits the luminance corresponding to the gradation level.

Next, in a third frame updating period (3F), left-eye image data is written. Herein in the third frame updating period, a display signal indicating lower electric potential than that of the counter electrode 214 is supplied to the source line. When the scanning signal voltage for selecting the corresponding pixel becomes the ON voltage, the display signal voltage is supplied to the pixel electrode 224 of the corresponding pixel, and the writing with negative polarity is performed. Herein the display signal voltage supplied to the source line is set so as to make the electric potential of the pixel electrode 224 a target electric potential. The polarity of the target electric potential in the third frame updating period is set so as to be different from that in the second frame updating period, so that the scanning signal voltage is returned to the OFF voltage before the electric potential of the pixel electrode 224 reaches the target electric potential. At this time, the illuminating region of the backlight unit 250 is still in the on state at the start of the third frame updating period, but is turned off before the writing of the left-eye image data is performed in the third frame updating period. Thus, the left-eye image written in the third frame updating period is not visually recognized by the observer. In the latter half of the third frame updating period, the left-eye shutter 282 is opened.

Also in a fourth frame updating period (4F), a display signal indicating lower electric potential than that of the counter electrode 214 is supplied to the source line. As described above, the writing of the left-eye image is performed successively in two frame updating periods. When the scanning signal voltage for selecting the corresponding pixel becomes the ON voltage, the display signal voltage is supplied to the pixel electrode 224 of the corresponding pixel, thereby performing the writing with negative polarity. In the liquid crystal display device 100B, the polarity written in the fourth frame updating period is the same as that in the third frame updating period, and the display signal voltage supplied to the source line is set so as to make the electric potential of the pixel electrode 224 a target electric potential with the same polarity as that of the target electric potential in the third frame updating period. Accordingly, the electric potential of the pixel electrode 224 reaches the target electric potential. Thereafter the scanning signal voltage is returned to the OFF voltage. The illuminating region of the backlight unit 250 is turned on over one vertical scanning period after the writing of the corresponding pixel is performed in the fourth frame updating period. The left-eye shutter 282 is kept opened over the fourth frame updating period. Therefore, the left-eye image written in the fourth frame updating period is visually recognized by the observer. As described above, the electric potential of the pixel electrode 224 reaches the target electric potential, and the pixel exhibits the luminance corresponding to the gradation level.

As described above, in the liquid crystal panel 200, left-eye image data is written successively in two vertical scanning periods with the same polarity, and right-eye image data is written successively in two vertical scanning periods with the same polarity. For this reason, the reduction of aperture ratio and the display unevenness can be suppressed.

Hereinafter, advantages of the liquid crystal display device 100B and the stereoscopic display system 300B in this embodiment will be described in comparison with a liquid crystal display device and a stereoscopic display system in a comparative example 3. First, with reference to FIG. 32, the liquid crystal display device 700B and the stereoscopic display system 900B in the comparative example 3 will be described. FIG. 32(a) is a schematic diagram of the stereoscopic display system 900B. The stereoscopic display system 900B includes the liquid crystal display device 700B and shutter glasses 880. The liquid crystal display device 700B includes a liquid crystal panel 800 and a backlight unit 850. Although not shown in the figure, the backlight unit 850 has a plurality of illuminating regions which can be individually turned on/off, respectively. The liquid crystal panel 800 is driven at the vertical scanning frequency of 240 Hz. Also in the liquid crystal display device 700B in the comparative example 3, switching of the display mode is not performed, and the liquid crystal display device 700B performs display only in the stereoscopic display mode.

FIG. 32(b) is a schematic diagram of the liquid crystal panel 800. The liquid crystal panel 800 includes a front substrate 810, a back substrate 820, and a liquid crystal layer 830 disposed between the front substrate 810 and the back substrate 920. The front substrate 810 has a transparent insulating substrate 812 and a counter electrode 814. The back substrate 820 has a transparent insulating substrate 822 and a pixel electrode 824.

Hereinafter, with reference to FIG. 33, the variation of signal voltage, the backlight unit 850, and the open/close of the shutter glasses 880 in the stereoscopic display system 900B will be described.

FIG. 33(a) shows the variation of an electric potential VLs of a source line by using an electric potential of the counter electrode 814 as a reference, FIG. 33(b) shows the waveform of a scanning signal voltage VLg, FIG. 33(c) shows the variation of an electric potential Vpe of the pixel electrode 824 by using the electric potential of the counter electrode 814 as a reference, FIG. 33(*d*) shows the turning on/off of a specific one of illuminating regions of the backlight unit 850, and FIG. 33(*e*) shows the open/close of the shutter glasses 880.

In a first frame updating period (1F), a display signal indicating higher electric potential than that of the counter electrode 814 is supplied to the source line. Herein when the scanning signal voltage for selecting a certain pixel becomes an ON voltage, a display signal voltage is supplied to a pixel electrode 824 of the certain pixel, thereby performing the writing with positive polarity. At this time, the display signal voltage supplied to the source line is set so as to make the electric potential of the pixel electrode 824 a target electric potential. The target electric potential is set so that the potential difference between the counter electrode 814 and the pixel electrode 824 corresponds to the gradation level. In this way, the charging of the liquid crystal layer 830 is progressed by supplying the display signal voltage to the pixel electrode 824. However, since the liquid crystal panel 800 is driven at the vertical scanning frequency of 240 Hz, and the period in which a scanning line is selected and the display signal voltage is supplied to the pixel electrode 824 is relatively short, the scanning signal voltage is returned to the OFF voltage before the electric potential of the pixel electrode 824 reaches the target electric potential. The illuminating region of the backlight unit 850 is turned off at least in the middle of the first frame updating period, so that the right-eye image written in the first frame updating period is not visually recognized by the observer. The right-eye shutter 884 is opened in the latter half of the first frame updating period.

In a second frame updating period (2F), a display signal indicating lower electric potential than that of the counter electrode 814 is supplied to the source line. The writing of right-eye image is performed successively in two frame updating periods. When the scanning signal voltage for selecting the corresponding pixel becomes an ON voltage, a display signal voltage is supplied to a pixel electrode 824 of the corresponding pixel, thereby performing the writing with negative polarity. In the liquid crystal display device 700B in the comparative example 3, the polarity written in the second frame updating period is different from that in the first frame updating period. At this time, the display signal voltage supplied to the source line is set so as to make the electric potential of the pixel electrode 824 a target electric potential. The target electric potential is set so that the potential difference between the counter electrode 814 and the pixel electrode 824 corresponds to the gradation level. However, since the liquid crystal panel 800 is driven at the vertical scanning frequency of 240 Hz, and the period in which a scanning line is selected and the display signal voltage is supplied to the pixel electrode 824 is relatively short, the scanning signal voltage is returned to the OFF voltage before the electric potential of the pixel electrode 824 reaches the target electric potential. The illuminating region of the backlight unit 850 is turned on over one vertical scanning period after the writing of the corresponding pixel is performed in the second frame updating period. The right-eye shutter 884 is kept opened over the second frame updating period. Accordingly, the right-eye image written in the second frame updating period is visually recognized by the observer. As described above, the electric potential of the pixel electrode 824 does not reach the target electric potential, so that the pixel does not exhibit the luminance corresponding to the gradation level.

Next, in a third frame updating period (3F), left-eye image data is written. Herein in the third frame updating period, a display signal indicating higher electric potential than that of the counter electrode 814 is supplied to the source line. When the scanning signal voltage for selecting the corresponding pixel becomes the ON voltage, the display signal voltage is supplied to the pixel electrode 824 of the corresponding pixel. Thus, the electric potential of the pixel electrode 824 becomes higher than the electric potential of the counter electrode 814. In this way, the writing with positive polarity is performed in the third frame updating period. However, the polarity written in the third frame updating period is different from that in the second frame updating period, so that the scanning signal voltage is returned to the OFF voltage before the electric potential of the pixel electrode 824 reaches the target electric potential. At this time, the illuminating region of the backlight unit 850 is still in the on state at the start of the third frame updating period, but is turned off before the writing of the left-eye image data is performed in the third frame updating period. Thus, the left-eye image written in the third frame updating period is not visually recognized by the observer. In the latter half of the third frame updating period, the right-eye shutter 884 is opened.

Also in a fourth frame updating period (4F), a display signal indicating lower electric potential than that of the counter electrode 814 is supplied to the source line. As described above, the writing of the left-eye image is performed successively in two frame updating periods. When the scanning signal voltage for selecting the corresponding pixel becomes the ON voltage, the display signal voltage is supplied to the pixel electrode 824 of the corresponding pixel, thereby performing the writing with negative polarity. In the liquid crystal display device 700B in the comparative example 3, the polarity written in the fourth frame updating period is different from that in the third frame updating period. Therefore, before the electric potential of the pixel electrode 824 reaches the target electric potential, the scanning signal voltage is returned to the OFF voltage. The illuminating region of the backlight unit 850 is turned on over one vertical scanning period after the writing of the corresponding pixel is performed in the fourth frame updating period. The left-eye shutter 882 is kept opened over the fourth frame updating period. Therefore, the left-eye image written in the fourth frame updating period is visually recognized by the observer. As described above, the electric potential of the pixel electrode 824 does not reach the target electric potential, and the pixel does not exhibit the luminance corresponding to the gradation level.

As described above, the polarities of pixels in two vertical scanning periods in which the right-eye image data and the left-eye image data are written, respectively are different, so that in some cases, the electric potential of the pixel electrode 824 doest not reach the target electric potential in every period. Especially when the target electric potential which largely departs from the electric potential of the counter electrode 814, for example, when high luminance in the normally black mode is dealt with, the electric potential of the pixel electrode 824 does not reach the target electric potential in some cases.

In the above description, one pixel is focused on in order to prevent the description from being excessively complicated. Alternatively, if two different pixels are focused on, for example, in the case where the gradation levels of two pixels into which the left-eye image data are written in the fourth frame updating period are equal to each other, but the gradation levels of the right-eye image data which is written immediately before are different, the degrees of luminance of the two pixels into which the left-eye image data is written may be different in some cases. Specifically, in the case where the electric potential of the pixel electrode 824 of one of the pixels is equal to the electric potential of the counter electrode 814 in the second frame updating period (i.e., the gradation level of the pixel is low), the electric potential of the pixel electrode 824 reaches the target electric potential in the third frame updating period, but the electric potential of the pixel electrode 824 may not reach the target electric potential in some cases in the fourth frame updating period. On the contrary, in the case where the electric potential of the pixel electrode 824 of the other pixel is largely different from the electric potential of the counter electrode 814 in the second frame updating period (i.e., the gradation level of the pixel is high), the electric potential of the pixel electrode 824 does not reach the target electric potential in the third frame updating period, but the electric potential of the pixel electrode 824 reaches the target electric potential in the fourth frame updating period in some cases. As described above, if the polarities of pixels in the two vertical scanning periods in which the right-eye image data and the left-eye image data are written, respectively, are different, the display of the right-eye image or the left-eye image concerned may be affected by the left-eye image or right-eye image immediately before, in some cases. This may be visually recognized as display unevenness.

In order to suppress the signal delay or the like, if the line width in the liquid crystal panel 800 is increased, it is not impossible to suppress the display unevenness. However, in such a case, the aperture ratio of the liquid crystal panel 800 is deteriorated.

On the contrary, in the liquid crystal display device 100B in this embodiment, since the left-eye image data and the right-eye image data are written over two successive vertical scanning periods with the same polarity, the display unevenness can be suppressed without deteriorating the aperture ratio. Accordingly, as the liquid crystal panel 200 which is driven at the vertical scanning frequency of 240 Hz, a so-called double-speed driving liquid crystal panel can be suitably used. In addition, by inverting the polarities of pixels every two vertical scanning periods, the occurrence of flicker can be suppressed.

Figure 34:
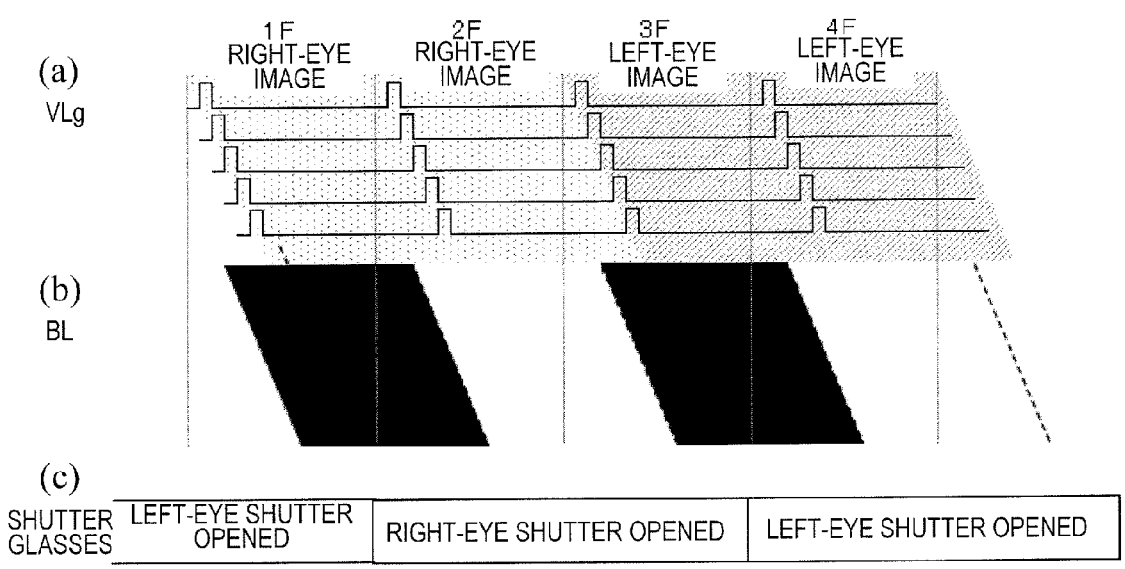
FIG. 34 is a diagram for illustrating the driving of the stereoscopic display system shown in FIG. 29, in which (a) is a waveform diagram of scanning signal voltages supplied to a plurality of scanning lines, (b) is a schematic diagram showing the turning on/off of the backlight unit, and (c) is a schematic diagram showing the open/close of the shutter glasses.

Hereinafter, with reference to FIG. 34, the stereoscopic display system 300B will be described. FIG. 34(a) is a waveform diagram of a scanning signal voltage supplied to a plurality of scanning lines, FIG. 34(b) is a schematic diagram showing the turning on/off of the backlight unit, and FIG. 34(c) is a schematic diagram showing the open/close of the shutter glasses.

In a first frame updating period (1F), the plurality of scanning lines are sequentially selected. Over the first frame updating period, the left-eye shutter 282 of the shutter glasses 280 is kept opened. At the start of the first frame updating period, the plurality of illuminating regions 252 provided in the backlight unit 250 are all in the on state. Thus, at the start of the first frame updating period, the left eye of the observer visually recognizes the left-eye image. In accordance with the selection of the scanning lines in the first frame updating period, corresponding illuminating regions 252 are sequentially turned off, so that the observer does not visually recognize the left-eye image.

In a second frame updating period (2F), the plurality of scanning lines are sequentially selected. Over the second frame updating period, the left-eye shutter 282 of the shutter glasses 280 is kept closed, and the right-eye shutter 284 is kept opened. At the start of the second frame updating period, the plurality of illuminating regions 252 provided in the backlight unit 250 are all in the off state. Thus, in this period, the observer does not visually recognize the left-eye image. In accordance with the selection of the scanning lines in the second frame updating period, corresponding illuminating regions 252 are sequentially turned on. Accordingly, the observer visually recognizes the right-eye image.

In a third frame updating period (3F), the plurality of scanning lines are sequentially selected. Over the third frame updating period, the right-eye shutter 284 of the shutter glasses 280 is kept opened. At the start of the third frame updating period, the plurality of illuminating regions 252 provided in the backlight unit 250 are all in the on state. Thus, in this period, the observer visually recognizes the right-eye image. In accordance with the selection of the scanning lines in the third frame updating period, corresponding illuminating regions 252 are sequentially turned off, so that the observer does not visually recognize the right-eye image.

In a fourth frame updating period (4F), the plurality of scanning lines are sequentially selected. Over the fourth frame updating period, the right-eye shutter 284 of the shutter glasses 280 is kept closed, and the left-eye shutter 282 is kept opened. At the start of the fourth frame updating period, the plurality of illuminating regions 252 provided in the backlight unit 250 are all in the off state. Thus, at this point of time, the observer does not visually recognize the left-eye image. In accordance with the selection of the scanning lines in the fourth frame updating period, corresponding illuminating regions 252 are sequentially turned on. Accordingly, the observer visually recognizes the left-eye image. As described above, either one of the left-eye shutter 282 or the right-eye shutter 284 of the shutter glasses 280 is opened, and the image visually recognized by the observer may vary in response to the turning on/off of the backlight unit 250.

In the case where the writing of four frame updating periods is repeatedly performed as shown in FIG. 31, into the pixel, the right-image data is written with positive polarity and the left-eye image data is written with negative polarity. In this case, even if the gradation levels of the right-eye image data and the left-eye image data of the pixel are mutually the same, the luminance of the pixel into which the right-eye image data is written is different from the luminance of the pixel into which the left-eye image data is written, and adequate display may not be performed in some cases. For this reason, it is preferred that the right-eye image data may be written with positive polarity and negative polarity in accordance with the periods, and similarly the left-eye image data may be written with positive polarity and negative polarity in accordance with the periods.

Figure 35:
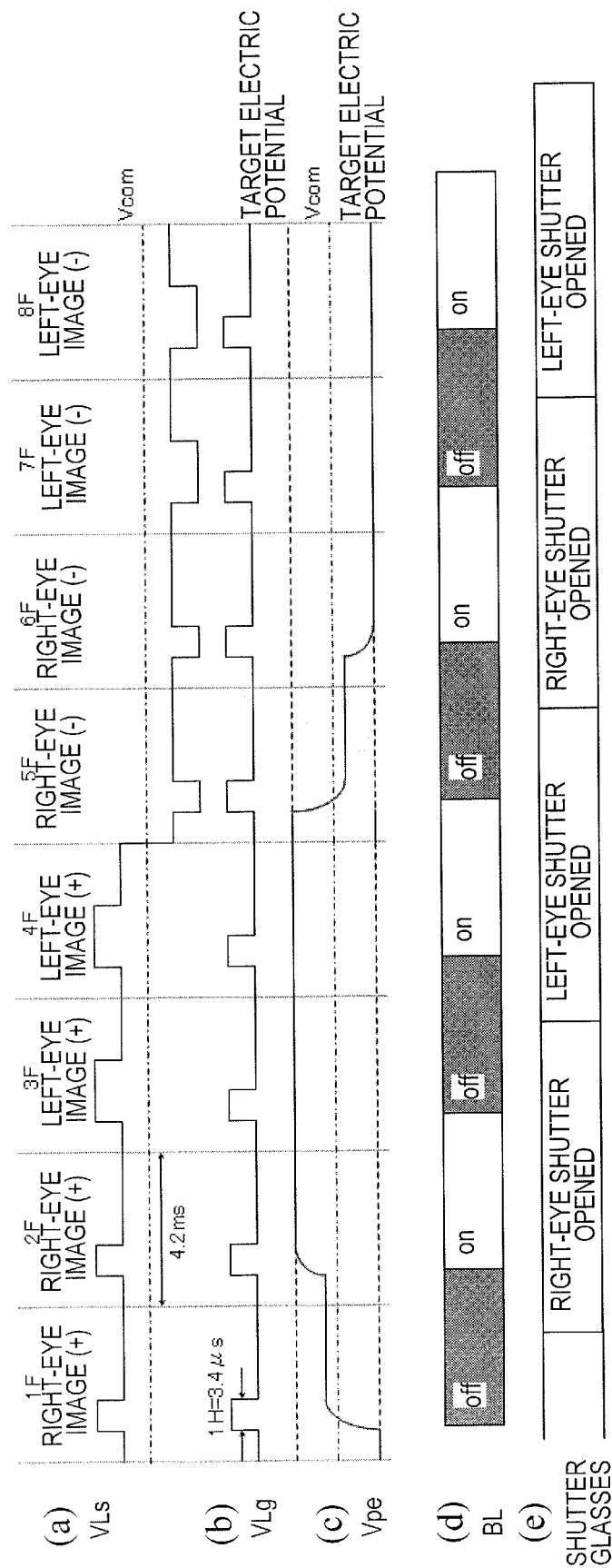
FIG. 35 is a diagram for illustrating the driving of the stereoscopic display system shown in FIG. 29, in which (a) is a waveform diagram of electric potential of a source line by using electric potential of a counter electrode as a reference, (b) is a waveform diagram of a scanning signal voltage, (c) is a waveform diagram of electric potential of a pixel electrode by using electric potential of the counter electrode as a reference, (d) is a schematic diagram showing the turning on/off of the backlight unit, and (e) is a schematic diagram showing the open/close of the shutter glasses.

FIG. 35(a) shows the variation of an electric potential VLs of a source line by using an electric potential Vcom of the counter electrode 214 as a reference, FIG. 35(b) shows the waveform of a scanning signal voltage VLg, FIG. 35(c) shows the variation of an electric potential Vpe of the pixel electrode 224 by using the electric potential Vcom of the counter electrode 214 as a reference, FIG. 35(d) shows the turning on/off of the backlight unit 250, and FIG. 35(e) shows the open/close of the shutter glasses 280.

As is understood from FIG. 35(a), the relationship between the electric potential of the display signal supplied to each source line and the electric potential of the counter electrode is not varied in the frame updating period. Thus, the variation of the electric potential of the display signal in the frame updating period can be decreased, so that the power consumption can be reduced.

Herein, the variation of the electric potential Vpe of a pixel electrode of a specific pixel is focused on in FIG. 35(c). The gradation level of the pixel is not varied from the first frame updating period (1F) to the eighth frame updating period (8F), and the gradation level of left-eye image data of this pixel is substantially equal to the gradation level of the right-eye image data. For example, the pixel corresponds to the center portion of an object included in the image which is displayed in the stereoscopic manner.

In a first frame updating period (1F), a display signal indicating higher electric potential than that of the counter electrode 214 is supplied to the source line. Herein when the scanning signal voltage for selecting a certain pixel becomes an ON voltage, a display signal voltage is supplied to a pixel electrode 224 of the certain pixel, thereby performing the writing with positive polarity. At this time, the display signal voltage supplied to the source line is set so as to make the electric potential of the pixel electrode 224 a target electric potential. The target electric potential is set so that the potential difference between the counter electrode 214 and the pixel electrode 224 corresponds to the gradation level. In this way, the charging of the liquid crystal layer 230 is progressed by supplying the display signal voltage to the pixel electrode 224. However, since the liquid crystal panel 200 is driven at the vertical scanning frequency of 240 Hz, and the period in which a scanning line is selected and the display signal voltage is supplied to the pixel electrode 224 is relatively short, the scanning signal voltage is returned to the OFF voltage before the electric potential of the pixel electrode 224 reaches the target electric potential. The illuminating region 252 of the backlight unit 250 is turned off at least in the middle of the first frame updating period, so that the right-eye image written in the first frame updating period is not visually recognized by the observer. The right-eye shutter 284 is opened in the latter half of the first frame updating period.

In a second frame updating period (2F), a display signal indicating higher electric potential than that of the counter electrode 214 is supplied to the source line. As described above, the writing of right-eye image is performed successively in two frame updating periods. When the scanning signal voltage for selecting the corresponding pixel becomes an ON voltage, a display signal voltage is supplied to a pixel electrode 224 of the corresponding pixel, thereby performing the writing with positive polarity. The polarity written in the second frame updating period is the same as that in the first frame updating period, and the display signal voltage supplied to the source line is set so as to make the electric potential of the pixel electrode 224 a target electric potential with the same polarity as that of the target electric potential in the first frame updating period. Accordingly, the electric potential of the pixel electrode 224 reaches the target electric potential. Thereafter, the scanning signal voltage is returned to the OFF voltage. The illuminating region 252 of the backlight unit 250 is turned on over one vertical scanning period after the writing of the corresponding pixel is performed in the second frame updating period. The right-eye shutter 284 is kept opened over the second frame updating period. Accordingly, the right-eye image written in the second frame updating period is visually recognized by the observer.

Next, in a third frame updating period (3F), left-eye image data is written. Herein in the third frame updating period, a display signal indicating higher electric potential than that of the counter electrode 214 is supplied to the source line. When the scanning signal voltage for selecting the corresponding pixel becomes the ON voltage, the display signal voltage is supplied to the pixel electrode 224 of the corresponding pixel, and the writing with positive polarity is performed. Herein the display signal voltage supplied to the source line is set so as to make the electric potential of the pixel electrode 224 a target electric potential having the same polarity as that in the second frame updating period. Thus, the electric potential of the pixel electrode 224 reaches the target electric potential. The backlight unit 250 is still in the on state at the start of the third frame updating period, but is turned off before the writing of the left-eye image data is performed in the third frame updating period. Thus, the left-eye image written in the third frame updating period is not visually recognized by the observer. In the latter half of the third frame updating period, the left-eye shutter 282 is opened.

Also in a fourth frame updating period (4F), a display signal indicating higher electric potential than that of the counter electrode 214 is supplied to the source line. As described above, the writing of the left-eye image is performed successively in two frame updating periods. When the scanning signal voltage for selecting the corresponding pixel becomes the ON voltage, the display signal voltage is supplied to the pixel electrode 224 of the corresponding pixel, thereby performing the writing with positive polarity. The polarity written in the fourth frame updating period is the same as that in the third frame updating period, and the display signal voltage is set so as to make the electric potential of the pixel electrode 224 a target electric potential with the same polarity as that of the target electric potential in the third frame updating period. Accordingly, the electric potential of the pixel electrode 224 reaches the target electric potential. Thereafter the scanning signal voltage is returned to the OFF voltage. The illuminating region 252 of the backlight unit 250 is turned on over one vertical scanning period after the writing of the corresponding pixel is performed in the fourth frame updating period. The left-eye shutter 282 is kept opened over the fourth frame updating period. Therefore, the left-eye image written in the fourth frame updating period is visually recognized by the observer.

In a fifth frame updating period (5F), a display signal indicating lower electric potential than that of the counter electrode 214 is supplied to the source line. Herein when the scanning signal voltage for selecting a certain pixel becomes the ON voltage, the display signal voltage is supplied to the pixel electrode 224 of the corresponding pixel, thereby performing the writing with negative polarity. Similarly, the display signal voltage supplied to the source line is set so as to make the electric potential of the pixel electrode 224 a target electric potential. However, the polarity of the target electric potential in the fifth frame updating period is set to be different from that in the fourth frame updating period, so that the scanning signal voltage is returned to the OFF voltage before the electric potential of the pixel electrode 224 reaches the target electric potential. At this time, the illuminating region 252 of the backlight unit 250 is turned off at least in the middle of the fifth frame updating period. Thus, the right-eye image written in the fifth frame updating period is not visually recognized by the observer. In the latter half of the fifth frame updating period, the right-eye shutter 284 is opened.

Periods from a sixth frame updating period (6F) to an eighth frame updating period (8F) are the same as those from the second frame updating period (2F) to the fourth frame updating period (4F), except for the points that the polarity of the display signal voltage and the polarity of the pixel electrode 224 are different, so that the description which overlaps with the previous description is omitted in order to avoid verbose description. In this way, in the liquid crystal panel 200, the inversion of polarity of pixels may be performed every four vertical scanning periods.

As described above, by writing right-eye image data and left-eye image data with the same polarity every two vertical scanning periods, the reduction of aperture ratio and the display unevenness can be suppressed. In addition, by performing the inversion of polarity of pixels every four vertical scanning periods, the right-eye image data can be written with positive polarity and negative polarity and the left-eye image data can be written with positive polarity and negative polarity in accordance with the vertical scanning periods. As a result, the shift in luminance caused by the polarity can be suppressed.

In the above description, display signal voltages with different polarities are supplied to adjacent source lines, but the present invention is not limited to this. Alternatively, in a certain frame updating period, display signal voltages with the same polarity may be supplied to all of the source lines. In such a case, the polarities of the pixels adjacent in the column direction are the same at the end of the frame updating period.

Alternatively, at the end of the frame updating period, the polarities of the pixels adjacent in the row direction and the column direction may be inverted. For example, in a certain frame updating period, the polarity of a display signal voltage supplied to respective source line may be inverted every horizontal scanning period, and the liquid crystal panel 200 may be driven by dot inversion. Alternatively, the pixels arranged in a matrix may be divided into one or more blocks in which the wiring is performed into pixels in one of the odd-numbered rows and the even-numbered rows and then the writing is performed into pixels in the other one of the rows.

FIG. 36(a) shows the polarities of pixels into which the writing is performed and the sequence in which the writing is performed in one block. For example, in a certain horizontal scanning period, the writing is performed with different polarities into pixels adjacent in the row direction in a certain row. Thereafter, in the next horizontal scanning period, a row adjacent to the row of pixels into which the writing is performed in the immediately preceding horizontal scanning period is skipped, and the writing is performed into pixels of a row which is separated by two rows from the row of pixels into which the writing is performed in the immediately preceding horizontal scanning period with the same polarity as that in the immediately preceding horizontal scanning period. Thereafter the writing is sequentially performed with the same polarity every other row in the block. Thereafter, the writing is sequentially performed into the pixels of the row which is skipped in the previous writing in the block with polarity different from that of the previous writing. The writing also performed with the same polarity every other row. Accordingly, for example, as for pixels in a block of a certain column, the writing with positive polarity is performed into pixels of the even-numbered rows, and the writing with negative polarity is performed into pixels of the odd-numbered rows.

FIG. 36(b) shows the variation of electric potential VLs of the source line by using the electric potential Vcom of the counter electrode 214 as a reference. Herein the variation of electric potential VLs in one frame updating period of a specific source line in the liquid crystal panel 200 which is divided into two blocks is focused on. In this source line, in one frame updating period, for example, the writing with positive polarity is performed into pixels of odd-numbered rows in the first block, and then the writing with negative polarity is performed into pixels of even-numbered rows. Next, the writing with positive polarity is performed into pixels of odd-numbered rows in the second block, and then the writing with negative polarity is performed into pixels of even-numbered rows. As for the source line adjacent to the above-mentioned source line, in the same frame updating period, the writing with negative polarity is performed into pixels of the odd-numbered rows in the first block, and then the writing with positive polarity is performed into pixels of the even-numbered rows. Next, the writing with negative polarity is performed into pixels of the odd-numbered rows in the second block, and then the writing with positive polarity is performed into pixels of the even-numbered rows.

Hereinafter, with reference to FIG. 37, the variation of signal voltage in the stereoscopic display system 300, the backlight unit 250, and the open/close of the shutter glasses 280 will be described.

FIG. 37(a) shows the variation of an electric potential VLs of a display signal by using an electric potential Vcom of the counter electrode 214 in the liquid crystal panel 200 as a reference, FIG. 37(b) shows the waveform of a scanning signal voltage VLg, FIG. 37(c) shows the variation of an electric potential Vpe of the pixel electrode 224 by using the electric potential Vcom of the counter electrode 214 as a reference, FIG. 37(d) shows the turning on/off of a specific illuminating region 252 of the backlight unit 250, and FIG. 37(e) shows the open/close of the shutter glasses 280. FIG. 37 is the same as FIG. 33 described above except for the point that the variation of the electric potential VLs of the display signal is different, so that the description which overlaps with the above-mentioned description is omitted in order to avoid the verbose description.

As is understood from FIG. 37(a), the relationship between the electric potential of the display signal supplied to the source line and the electric potential of the counter electrode is not varied over about one quarter of the frame updating period, so that the power consumption can be reduced. For example, after the writing is performed into pixels in an odd-numbered row of the first block with positive polarity, the writing is performed into pixels in an even-numbered row with negative polarity. Next, the writing is performed into pixels in the odd-numbered row of the second block with positive polarity, and finally the writing is performed into pixels in an even-numbered row with negative polarity. Accordingly, the polarities of pixels adjacent in the column direction at the end of the frame updating period are different from each other. In FIG. 37(a), the source line in which the polarity of the display signal voltage is varied in the order of positive, negative, positive, and negative polarity in the first frame updating period is focused on. However, the polarity of the display signal voltage supplied to a source line adjacent to the source line in the first frame updating period is varied in the order of negative, positive, negative, and positive polarity. In FIG. 37(b), the period in which the scanning signal voltage VLg is the ON voltage is 3.4 μs. FIG. 37(c) focuses on the variation of the electric potential Vpe of a pixel electrode 224 of a specific pixel selected when the display signal of positive polarity is supplied from the source line in the frame updating period.

In the first frame updating period (1F), the polarity of the display signal supplied to the source line is varied in the order of positive, negative, positive, and negative polarity. In such a case, when the scanning signal voltage for selecting the pixel becomes the ON voltage, a display signal voltage is supplied to the pixel electrode 224 of the pixel, so that the writing with positive polarity is performed. At this time, the period in which a scanning line is selected and the display signal voltage is supplied to the pixel electrode 224 is relatively short, so that the electric potential of the pixel electrode 224 does not reach the target electric potential in some cases.

In the second frame updating period (2F), the polarity of the display signal supplied to the source line is varied in the order of positive, negative, positive, and negative polarity. As described above, the writing of right-eye image data is performed successively in two frame updating periods. When the scanning signal voltage for selecting the corresponding pixel becomes the ON voltage, the display signal voltage is supplied to the pixel electrode 224 of the corresponding pixel, and the writing with positive polarity which is the same as the polarity in the first frame updating period is performed. Thus, the electric potential of the pixel electrode 224 reaches the target electric potential. Herein the target electric potential in the second frame updating period is equal to the target electric potential in the first frame updating period. Alternatively, as described below, due to the overdrive driving, the target electric potential in the second frame updating period may be different from the target electric potential in the first frame updating period. Thereafter, the scanning signal voltage is returned to the OFF voltage. The illuminating region 252 of the backlight unit 250 is turned on over one vertical scanning period after the writing into the corresponding pixel is performed in the second frame updating period. The right-eye shutter 284 is kept opened over the second frame updating period. Accordingly, the right-eye image written in the second frame updating period is visually recognized by the observer.

Next, in the third frame updating period (3F), left-eye image data is written. In the third frame updating period, the polarity of the display signal supplied to the source line is varied in the order of negative, positive, negative, and positive polarity. When the scanning signal voltage for selecting the pixel becomes the ON voltage, a display signal voltage is supplied to the pixel electrode 224 of the corresponding pixel, and the writing with negative polarity is performed. Also herein the display signal voltage supplied to the source line is set so as to make the electric potential of the pixel electrode 224 a target electric potential. However, the polarity of the target electric potential in the third frame updating period is set to be different from that in the second frame updating period. Thus, before the electric potential of the pixel electrode 224 reaches the target electric potential, the scanning signal voltage is returned to the OFF voltage.

In the fourth frame updating period (4F), the polarity of the display signal supplied to the source line is varied in the order of negative, positive, negative, and positive polarity. When the scanning signal voltage for selecting the corresponding pixel becomes the ON voltage, a display signal voltage is supplied to the pixel electrode 224 of the corresponding pixel, and the writing is performed with negative polarity which is the same as that in the third frame updating period. Accordingly, the electric potential of the pixel electrode 224 reaches the target electric potential. Thereafter, the scanning signal voltage is returned to the OFF voltage. The illuminating region 252 of the backlight unit 250 is turned on over one vertical scanning period after the writing into the corresponding pixel is performed in the fourth frame updating period. The left-eye shutter 282 is kept opened throughout the fourth frame updating period. Accordingly, the left-eye image written in the fourth frame updating period is visually recognized by the observer.

As described above, in the liquid crystal panel 200, for each pixel, left-eye image data is written successively in two vertical scanning periods with the same polarity. In addition, for each pixel, right-eye image data is written successively in two vertical scanning periods with the same polarity. Accordingly, the reduction of aperture ratio and the display unevenness can be suppressed, and a so-called double-speed driving liquid crystal panel can be utilized as the liquid crystal panel 200. In addition, by inverting the polarity of pixels every two vertical scanning periods, the occurrence of flicker can be suppressed.

In the case where the writing of four frame updating periods shown in FIG. 37 is repeatedly performed, right-eye image data is written into the pixel with positive polarity, and left-eye image data is written with negative polarity. As described above, in the case where the respective polarities of the right-eye image data and the left-eye image data written into one and the same pixel are fixed, even if the gradation levels of the right-eye image data and the left-eye image data of a certain pixel are equal to each other, the luminance of the pixel into which the right-eye image data is written is different from the luminance of the pixel into which the left-eye image data is written. As a result, adequate display cannot be performed in some cases. Therefore, preferably, for each pixel, right-eye image data is written with positive polarity and negative polarity in accordance with the period, and similarly, left-eye image data is written with positive polarity and negative polarity in accordance with the period.

Hereinafter, with reference to FIG. 38, the variation of signal voltage in the stereoscopic display system 300B, the backlight unit 250, and the open/close of the shutter glasses 280 will be described.

Figure 38:
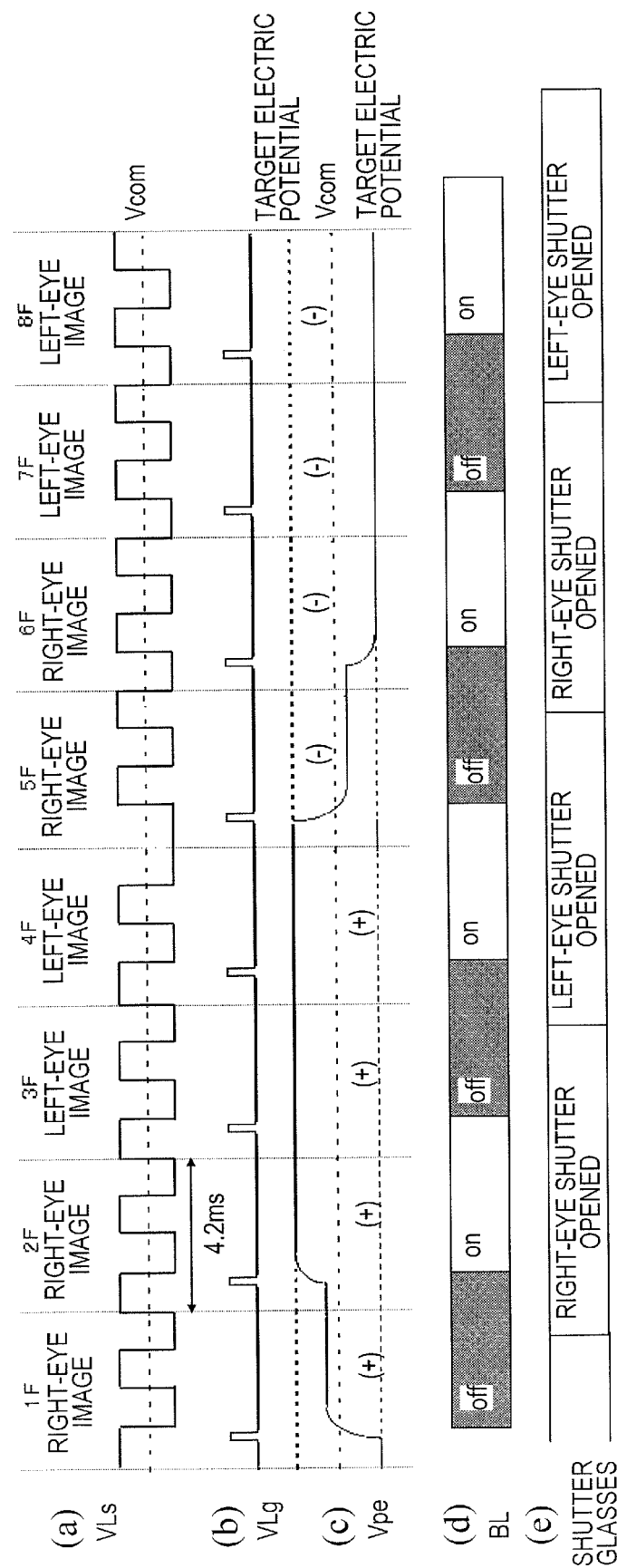
FIG. 38 is a diagram for illustrating the driving of the stereoscopic display system shown in FIG. 29, in which (a) is a waveform diagram of a display signal voltage, (b) is a waveform diagram of a scanning signal voltage, (c) is a waveform diagram of electric potential of a pixel electrode by using electric potential of a counter electrode as a reference, (d) is a schematic diagram showing the turning on/off of the backlight unit, and (e) is a schematic diagram showing the open/close of the shutter glasses.

FIG. 38(*a*) shows the variation of an electric potential VLs of a source line by using an electric potential Vcom of the counter electrode 214 as a reference, FIG. 38(*b*) shows the waveform of a scanning signal voltage VLg, FIG. 38(*c*) shows the variation of an electric potential Vpe of the pixel electrode 224 by using the electric potential Vcom of the counter electrode 214 as a reference, FIG. 38(*d*) shows the turning on/off of the backlight unit 250, and FIG. 38(*e*) shows the open/close of the shutter glasses 280.

As is understood from FIG. 38(*a*), the relationship between the electric potential of the display signal supplied to the source line and the electric potential of the counter electrode is not varied over about one quarter of the frame updating period, so that the power consumption can be reduced. In FIG. 38(*a*), the source line in which the polarity of the display signal is varied in the order of positive, negative, positive, and negative polarity in the first frame updating period is focused on. However, the polarity of the display signal supplied to a source line adjacent to the source line in the first frame updating period is varied in the order of negative, positive, negative, and positive polarity. FIG. 38(*c*) focuses on the variation of the electric potential Vpe of a pixel electrode 224 of a specific pixel selected when the display signal of positive polarity is supplied to the source line in the frame updating period. FIG. 38 is the same as FIG. 37 above described except for the point that the variation of the electric potential VLs of the display signal shown in FIG. 38(*a*) is different, so that the description which overlaps with the above-mentioned description is omitted in order to avoid the verbose description.

In a first frame updating period (1F), the polarity of the display signal supplied to the source line is varied in the order of positive, negative, positive, and negative polarity. Herein, when the scanning signal voltage for selecting the corresponding pixel becomes the ON voltage, a display signal voltage is supplied to the pixel electrode 224 of the pixel, so that the writing with positive polarity is performed. At this time, the display signal voltage supplied to the source line is set so as to make the electric potential of the pixel electrode 224 the target electric potential. However, at this time, the period in which the scanning line is selected and the display signal voltage is supplied to the pixel electrode 224 is relatively short, so that the scanning signal voltage is sometimes returned to the OFF voltage before the electric potential of the pixel electrode 224 reaches the target electric potential.

In a second frame updating period (2F), the polarity of the display signal supplied to the source line is varied in the order of positive, negative, positive, and negative polarity. As described above, the writing of right-eye image is performed successively in two frame updating periods. When the scanning signal voltage for selecting the corresponding pixel becomes the ON voltage, the display signal voltage is supplied to the pixel electrode 224 of the corresponding pixel, and the writing with positive polarity is performed. The polarity with which the writing is performed in the second frame updating period is the same as the polarity in the first frame updating period. Thus, the electric potential of the pixel electrode 224 reaches the target electric potential. Thereafter, the scanning signal voltage is returned to the OFF voltage. The illuminating region 252 of the backlight unit 250 is turned on over one vertical scanning period after the writing into the corresponding pixel is performed in the second frame updating period. The right-eye shutter 284 is kept opened over the second frame updating period. Accordingly, the right-eye image written in the second frame updating period is visually recognized by the observer.

Next, in a third frame updating period (3F), left-eye image data is written. In the third frame updating period, the polarity of the display signal supplied to the source line is varied in the order of positive, negative, positive, and negative polarity. When the scanning signal voltage for selecting the pixel becomes the ON voltage, a display signal voltage is supplied to the pixel electrode 224 of the corresponding pixel, and the writing is performed with positive polarity which is the same as that in the second frame updating period. Thus, the electric potential of the pixel electrode 224 reaches the target electric potential.

In a fourth frame updating period (4F), the polarity of the display signal supplied to the source line is varied in the order of positive, negative, positive, and negative polarity. As described above, the writing of left-eye image is performed successively in two frame updating periods. When the scanning signal voltage for selecting the corresponding pixel becomes the ON voltage, a display signal voltage is supplied to the pixel electrode 224 of the corresponding pixel, and the writing is performed with positive polarity which is the same as that in the third frame updating period. Accordingly, the electric potential of the pixel electrode 224 reaches the target electric potential. Thereafter, the scanning signal voltage is returned to the OFF voltage. The illuminating region 252 of the backlight unit 250 is turned on over one vertical scanning period after the writing into the corresponding pixel is performed in the fourth frame updating period. The left-eye shutter 282 is kept opened throughout the fourth frame updating period. Accordingly, the left-eye image written in the fourth frame updating period is visually recognized by the observer.

In a fifth frame updating period (5F), the polarity of the display signal supplied to the source line is varied in the order of negative, positive, negative, and positive polarity. Herein, when the scanning signal voltage for selecting the corresponding pixel becomes the ON voltage, a display signal voltage is supplied to the pixel electrode 224 of the corresponding pixel, and the writing is performed with negative polarity. Also, the display signal voltage supplied to the source line is set so as to make the electric potential of the pixel electrode 224 the target electric potential. However, the polarity of the target electric potential of the fifth frame updating period is set so as to be different from the polarity in the fourth frame updating period. Thus, before the electric potential of the pixel electrode 224 reaches the target electric potential, the scanning signal voltage is returned to the OFF voltage.

Periods from a sixth frame updating period (6F) to an eighth frame updating period (8F) are the same as those from the second frame updating period (2F) to the fourth frame updating period (4F), except for the points that the timing at which the polarity of the display signal voltage is inverted is different, and that the polarity of the pixel electrode 224 is different, so that the description which overlaps with the previous description is omitted in order to avoid verbose description. In this way, the inversion of polarity of the pixels may be performed every four vertical scanning periods in the liquid crystal panel 200.

In the description with reference to FIG. 36 to FIG. 38, all of the pixels in the liquid crystal panel 200 are divided into two blocks, but the present invention is not limited to this. The pixels may be divided into three or more blocks. In addition, the number of blocks may be set in accordance with the illuminating regions 252 of the backlight unit 250, for example. By the provision of three or more blocks in accordance with three or more illuminating regions, a time period from the end of writing into pixels in a block in a certain frame scanning period to the start of writing into pixels in the block in the next frame scanning period can be extended, so that a liquid crystal display device with high luminance in which the occurrence of cross-talk is suppressed can be easily realized.

In the above description with reference to FIG. 36 to FIG. 38, the writing in the odd-numbered rows and the writing in the even-numbered rows in successive blocks are performed alternately, but the present invention is not limited to this. The writing of one of the odd-numbered row and the even-numbered row over the successive blocks may be performed successively. For example, the writing with positive polarity is performed into pixels in the odd-numbered rows of the first block, and then the writing with negative polarity is performed into pixels in the even-numbered rows of the first block. Thereafter, the writing with negative polarity is performed into pixels in the even-numbered rows of the second block, and then the writing with positive polarity is performed into pixels in the odd-numbered rows of the second block. In addition, the writing with positive polarity may be performed into pixels in the odd-numbered rows of the third block, and then, the writing with negative polarity may be performed into pixels in the even-numbered rows of the third block.

In the above description, left-eye image data and right-eye image data are respectively written for two vertical scanning periods, and the polarity of each pixel is inverted every two or four vertical scanning periods, but the present invention is not limited to this. The polarity of each pixel may be inverted every two or more even-numbered vertical scanning periods. For example, the polarity of each pixel may be inverted every six, or eight or more vertical scanning periods.

Figure 39:
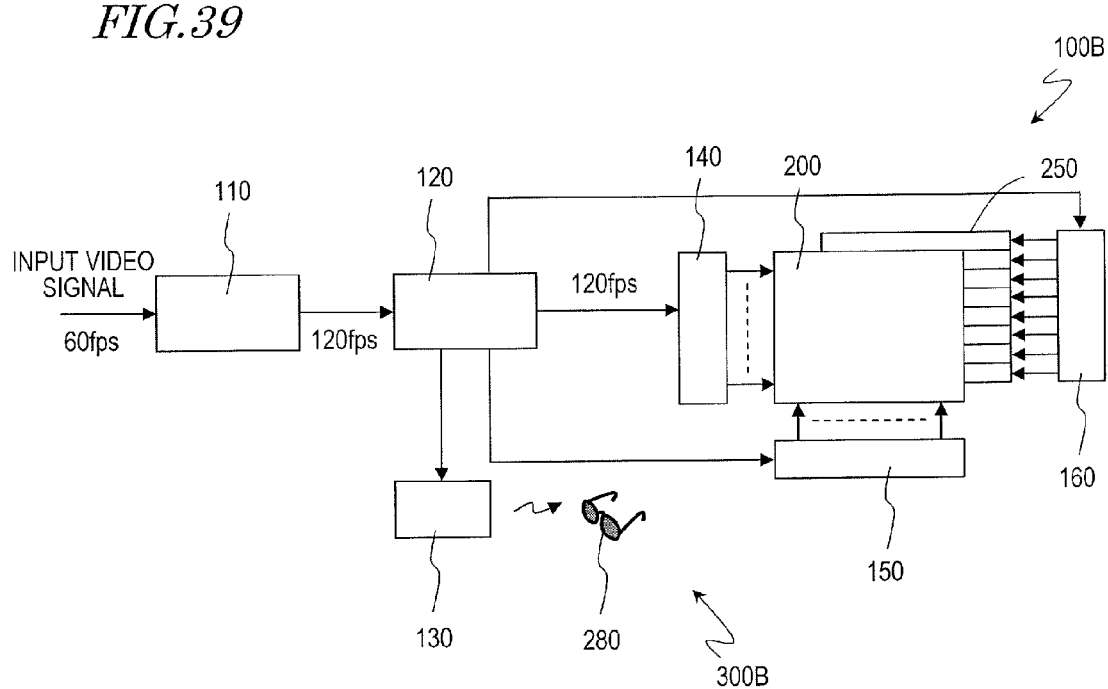
FIG. 39 is a schematic diagram showing an example of the stereoscopic display system shown in FIG. 29.

With reference to FIG. 39, a liquid crystal display device 100B and a stereoscopic display system 300B will be exemplarily described.

FIG. 39 shows a schematic diagram of the liquid crystal display device 100B and the stereoscopic display system 300B. The stereoscopic display system 300B includes the liquid crystal display device 100B and shutter glasses 280. The liquid crystal display device 100B includes a frame rate control circuit 110, a timing controller 120, a writing state signal transmitting circuit 130, a scanning signal driving circuit 140, a display signal driving circuit 150, a backlight driving circuit 160, a liquid crystal panel 200, and a backlight unit 250.

Herein, an input video signal having a frame rate of 60 fps is input into the frame rate control circuit 110. For example, the input video signal is the NTSC signal. The frame rate control circuit 110 generates a video signal having a frame rate of 120 fps which is higher than the frame rate of the input video signal based on the input video signal.

Based on the video signal output from the frame rate control circuit 110, the timing controller 120 controls the writing state signal transmitting circuit 130, the scanning signal driving circuit 140, the display signal driving circuit 150, and the backlight driving circuit 160. The timing controller 120 generates a display signal having a frame rate of 240 fps based on the video signal having the frame rate of 120 fps, and outputs the display signal to the display signal driving circuit 150. Based on the control of the timing controller 120, the scanning signal driving circuit 140 and the display signal driving circuit 150 drive the liquid crystal panel 200 at the vertical scanning frequency of 240 Hz. At this time, the left-eye image data corresponds to 120 fps, and the right-eye image data corresponds to 120 fps.

Based on the signal from the timing controller 120, the writing state signal transmitting circuit 130 transmits a writing state signal indicating the writing state of a plurality of pixels. The shutter glasses 280 opens and closes the left-eye shutter 282 and the right-eye shutter 284 based on the writing state signal.

Herein, the frame rate control circuit 110 generates the video signal having the frame rate of 120 fps which is higher than the frame rate of 60 fps of the input video signal, based on the input video signal, and the timing controller 120 generates the display signal having the frame rate of 240 fps based on the video signal, but the present invention is not limited to this. The frame rate control circuit 110 may generate a video signal having a frame rate of 240 fps which is higher than the frame rate of 60 fps of the input video signal, based on the input video signal, and the timing controller 120 may generate a display signal having a frame rate of 240 fps, based on the video signal.

The input video signal may be a PAL signal, and the frame rate of the input video signal may be 50 fps. In this case, the frame rate of the video signal is set to be 100 fps or 200 fps, and the frame rate of the display signal is set to be 200 fps.

In the above description, right-eye image data and left-eye image data in the second writing are the same as the right-eye image data and the left-eye image data in the first writing, respectively, and the same gradation level is written into the respective pixels twice, but the present invention is not limited to this. The overdrive driving may be performed for the right-eye image data and the left-eye image data in the second writing. The overdrive driving is performed in the same way as described above with respect to FIG. 20 and FIG. 28, for example.

Alternatively, in the liquid crystal panel 200 in the liquid crystal display device 300B in this embodiment, each pixel includes a plurality of sub-pixels. For example, each pixel of the liquid crystal panel 200 may have the same configuration as described above with reference to FIG. 21 to FIG. 23.

In the liquid crystal panel 200 of the liquid crystal display devices 100, 100A, and 100B, at least one of the front substrate 210 and the back substrate 220 may include an alignment film. Herein, the alignment film is processed so that the pre-tilt angle of liquid crystal molecules is less than 90 degrees with respect to the surface of a vertical alignment film. The pre-tilt angle is an angle formed by the alignment film, a principal surface of the alignment film, and the major axis of the liquid crystal molecules defined in the pre-tilt direction. By the alignment film and the alignment, the pre-tilt angles of the liquid crystal molecules are defined, respectively.

As a method for forming such an alignment film, a method for performing rubbing process, a method for performing photo alignment process, a method in which a minute structure is previously formed in a base of the alignment film, and the minute structure is reflected in the surface of the alignment film, a method in which inorganic substance such as SiO is obliquely deposited, so as to form the alignment film having a minute structure on its surface, and other methods are known. However, from the point of view of mass productivity, the rubbing process or the photo alignment process is preferred. Especially the photo alignment process can improve the yield because the photo alignment process performs the alignment process in a non-contact manner, and hence static electricity due to friction does not occur unlike the rubbing process. In addition, as described in International Publication No. WO2006/121220, by using the photo alignment film including photo-sensitive group, the dispersion of pre-tilt angle can be controlled to be 1° or less. The photo-sensitive group may preferably include at least one photo-sensitive selected from a group of 4-chalcone group, 4'-chalcone group, coumalin group, and cinnamoyl group.

The liquid crystal panel 200 may be a so-called MVA (Multi-domain Vertical Alignment) mode. The liquid crystal panel 200 of the MVA mode regulates the orientation of the director of the liquid crystal domain formed at the voltage application by disposing linear slits formed in the electrode or linear dielectric projections (ribs) formed on the liquid crystal layer side in such a manner that they are disposed in parallel and alternately on a pair of substrates opposed with the liquid crystal layer interposed therebetween, when viewed from the normal direction of the substrate. The orientation of the liquid crystal domain is the direction orthogonal to the direction in which the linear slits or the dielectric projections (referred to collectively as "linear structures") extend. In the MVA mode, the scanning lines Lga and Lgb may be disposed so as to overlap the boundary of another liquid crystal domain.

Alternatively, the liquid crystal panel 200 may be a PSA mode. The Polymer Sustained Alignment Technology (hereinafter, referred to as "PSA technology") is disclosed in Japanese Laid-Open Patent Publication No. 2002-357830, Japanese Laid-Open Patent Publication No. 2003-177418, Japanese Laid-Open Patent Publication No. 2006-78968, and K. Hanaoka et al. "A New MVA-LCD by Polymer Sustained Alignment Technology", SID 04 DIGEST 1200-1203 (2004). All of the disclosure contents of these four documents are incorporated in this specification by reference.

The PSA technology is a technology in which a small amount of polymerizable compound (e.g. photopolymerizable monomer or oligomer) is mixed in a liquid crystal material, and after the liquid crystal panel is assembled, the polymerizable compound is irradiated with activation energy rays (e.g. ultraviolet rays) in the condition where a predetermined voltage is applied across the liquid crystal layer, thereby producing a polymer, so as to control the pre-tilt direction of the liquid crystal molecules. The alignment condition of the liquid crystal molecules when the polymer is produced is maintained (stored) even after the voltage is removed (in the condition where no voltage is applied). Herein the layer formed by the polymer is referred to as an alignment maintaining layer. The alignment maintaining layer is formed on the surface of the alignment film (on the side of the liquid crystal layer), but is not necessarily formed so as to cover the surface of the alignment film. Alternatively, the alignment maintaining layer may be polymer particles which discretely exist.

The liquid crystal panel 200 of the PSA mode is obtained, for example, by applying the above-described PSA technology. Although not shown in the figure, each of the pixel electrodes 224 includes a cross-shaped stem portion disposed so as to overlap the polarizing axis of a pair of polarizing plates, and a plurality of branch portions extending in a direction of substantially 45° from the cross-shaped stem portion. Specifically, the branch portions extend in directions of 45°, 135°, 225°, and 315° from the stem portion, and liquid crystal molecules in the liquid crystal layer of vertical alignment type (dielectric anisotropy is negative) are inclined in directions in which the respective branch portions extend due to the oblique electric field from the stem portion and the branch portions. This is because the oblique electric field from the branch portions extending in parallel to each other affects the liquid crystal molecules so as to be inclined in the direction perpendicular to the direction in which the branch portions extend, and the oblique electric field from the stem portion affects the liquid crystal molecules so as to be inclined in the direction in which the respective branch portions extend. If the PSA technology is utilized, the above-mentioned alignment of the liquid crystal molecules formed when the voltage is applied across the liquid crystal layer can be stabilized. Also in the PSA mode, the scanning line may be disposed so as to overlap the boundary of another liquid crystal domain.

Alternatively, the liquid crystal panel 200 may be a CPA mode. For example, the pixel electrode 224 has a shape with high symmetry, and by the application of voltage to the liquid crystal layer 230, the liquid crystal molecules in the respective liquid crystal domain may be aligned obliquely in an axially symmetric manner.

In the above-described liquid crystal panel 200, the voltage is applied across the liquid crystal layer by the electrodes disposed on the front substrate and the back substrate, respectively, but the present invention is not limited to this. In the liquid crystal panel, a voltage may be applied in a transverse direction parallel to the in-plane of the liquid crystal layer. For example, the liquid crystal panel may be an IPS (In Plane Switching) mode.

[Embodiment for Suppressing the Occurrence of Cross-Talk between Frames]

Hereinafter an embodiment for suppressing the occurrence of cross-talk between frames will be described. The embodiment described below can be combined with the above-described embodiments of the liquid crystal display device capable of performing stereoscopic display and the stereoscopic display system, and additionally can be applied to a liquid crystal display device which performs planar display only.

First, the problem of cross-talk between frames which is particularly remarkable in stereoscopic display will be described with reference to FIG. 40 to FIG. 42.

Figure 11:
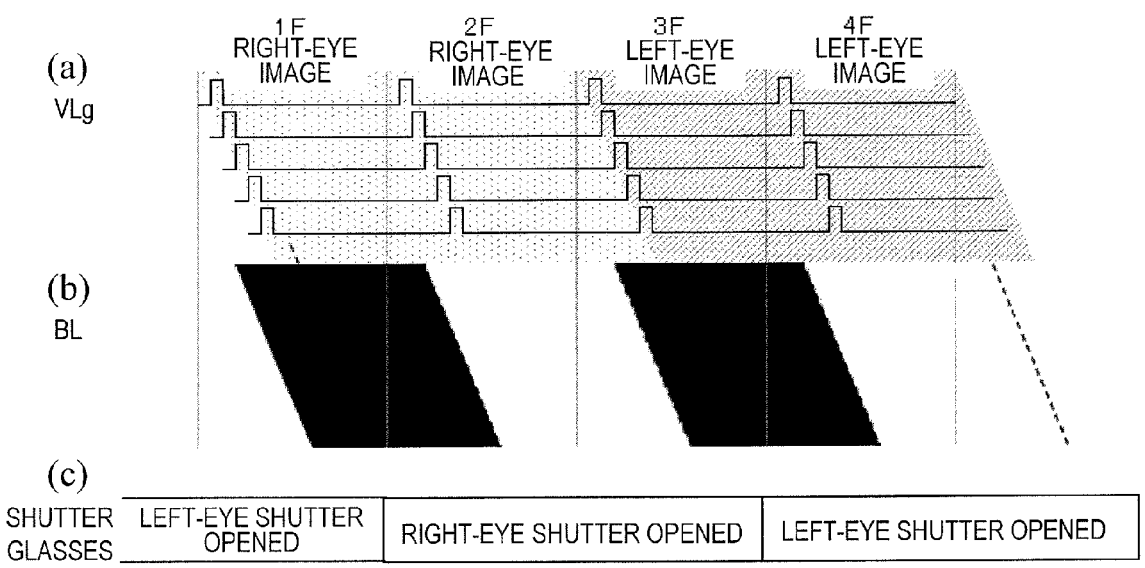
FIG. 11 is a diagram for illustrating the driving of the stereoscopic display system shown in FIG. 2, in which (a) is a waveform diagram of scanning signal voltages supplied to a plurality of scanning lines, (b) is a schematic diagram showing the turning on/off of the backlight unit, and (c) is a schematic diagram showing the open/close of the shutter glasses.

The stereoscopic display is preferably performed as follows by using a backlight which can be turned on/off and shutter glasses, as described with reference to FIG. 11, for example. In the liquid crystal display device, right-eye image and left-eye image are successively written over two frames, respectively. In the first frame, the backlight is turned off, and in the second frame, the backlight is turned on. The shutter glasses are controlled in such a manner that the right-eye image can be seen with the right eye, and the left-eye image can be seen with the left eye. Herein a single stereoscopic image can be visually recognized by a single left-eye image and a single right-eye image. Thus, by driving the liquid crystal display device at the vertical scanning frequency of 240 Hz, the stereoscopic image can be visually recognized at 60 Hz. In the case of the driving at 240 Hz, a vertical scanning period is 4.2 ms which is short. For this reason, if the response of liquid crystal is slow, the influence of left-eye image remains in the display of right-eye image, for example, which causes a problem that the quality of stereoscopic display is degraded.

For example, the case in which right-eye image is switched to left-eye image, and accordingly, the luminance of pixel is varied from high to low level is considered. Herein, a liquid crystal display device of normally black mode (e.g. a VA mode) is exemplarily described. Therefore, the variation of the luminance of pixel from high to low level corresponds to the variation of a pixel voltage (a voltage applied across the liquid crystal layer, an absolute value of electric potential Vpe of a pixel electrode) from high to low level.

Figure 40:
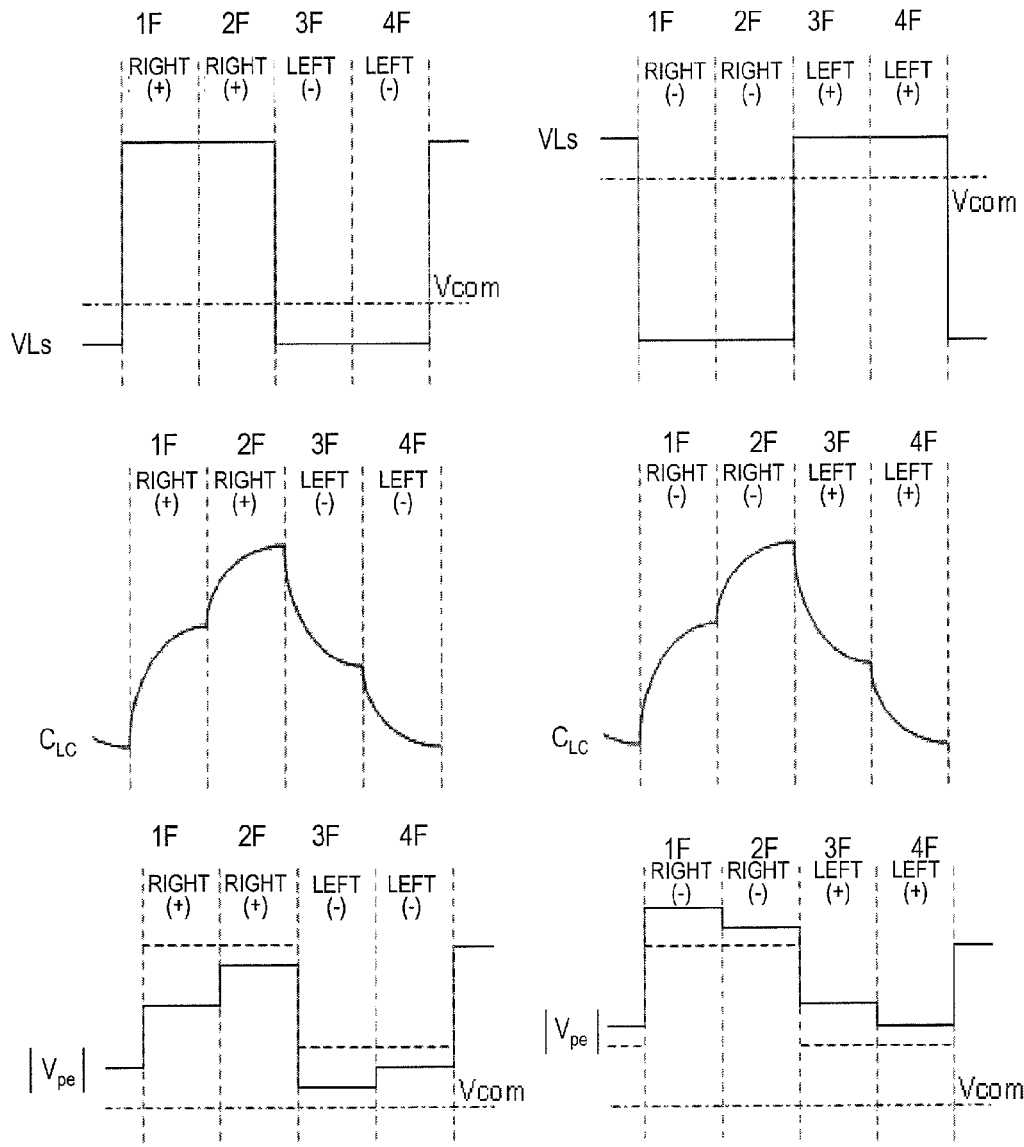
FIG. 40 is a diagram for illustrating the problem of crosstalk between frames in the case where the image is switched from right-eye image to left-eye image, and accordingly the luminance of the pixel is changed from high (bright) to low (dark) level, and is a diagram showing the variations of electric potential of a display signal VLs, liquid crystal capacitance $C_{LC}$, and a pixel voltage |Vpe|.

FIG. 40 shows the variations of electric potential VLs of a display signal, a liquid crystal capacitance $C_{LC}$, and a pixel voltage |Vpe| in the case where right-eye image is switched to left-eye image, and accordingly the luminance of the pixel is varied from high (bright) to low (dark) level. In the figure, the case where the writing of right-eye image is performed with positive (+) polarity, and then performed with negative (−) polarity (on the left side of FIG. 40) and the case where the writing of right-eye image is performed with negative (−) polarity, and then performed with positive (+) polarity (on the right side of FIG. 40) are shown together.

The left side of FIG. 40 is focused on, and the case where the electric potential VLs is written in 1F (the first frame updating period) is considered. At this time, the electric potential VLs is changed from low (−) to high (+).

Figure 41:
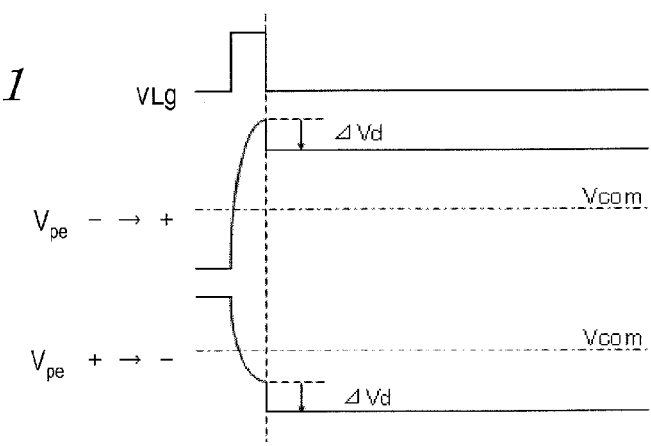
FIG. 41 is a diagram for illustrating a feed through voltage ΔVd in a TFT liquid crystal display device, and is a diagram showing a scanning signal voltage (a gate voltage) VLg and a pixel electrode electric potential Vpe.

In a TFT liquid crystal display device which is now widely used, as shown in FIG. 41, when a display signal is written into a pixel (i.e. when a liquid crystal capacitor $C_{LC}$ is charged), a feedthrough voltage (Δ Vd) is caused in response to the fall of a scanning signal voltage (a gate voltage) VLg. The direction of the variation of the pixel-electrode electric potential Vpe due to the feedthrough voltage Δ Vd does not depend on the polarity of the pixel-electrode electric potential Vpe, and hence it is asymmetry with respect to the electric potential Vcom of the counter electrode. Accordingly, the driving circuit is designed in view of the feedthrough voltage so as not to apply a DC voltage across the liquid crystal layer. However, the feedthrough voltage considered in the design is based on the value of the feedthrough voltage measured in the condition where the liquid crystal capacitance $C_{LC}$ is constant. On the contrary, in the actual driving, the liquid crystal capacitance $C_{LC}$ is not constant.

For example, the liquid crystal capacitance $C_{LC}$ increases when the electric potential VLs is changed from low (−) to high (+) level in 1F shown on the left side of FIG. 40. As a result, the feedthrough voltage caused when the electric potential VLs is changed from low (−) to high (+) level in the period 1F is larger than the value considered in the design, and the pixel-electrode electric potential Vpe becomes lower than the original electric potential. That is, the pixel voltage |Vpe| applied across the liquid crystal layer becomes lower than the original voltage.

Next, the case shown on the left side of FIG. 40 where the electric potential VLs is written in 3F (the third frame updating period) is considered. The electric potential VLs is changed from high (+) to low (−) level. At this time, the liquid crystal capacitance $C_{LC}$ decreases, so that the feedthrough voltage is smaller than the value considered in the design, and the pixel-electrode electric potential Vpe becomes higher than the original electric potential. Herein, since the writing with negative polarity is performed in 3F, the pixel voltage |Vpe| applied across the liquid crystal layer becomes lower than the original voltage.

Similarly, the right side of FIG. 40 is focused on, and the case where the electric potential VLs is written in 1F is considered. The electric potential VLs is changed from low (+) to high (−) level. At this time, the liquid crystal capacitance $C_{LC}$ increases, so that the feedthrough voltage becomes larger than the value considered in the design, and the pixel-electrode electric potential Vpe becomes lower than the original electric potential. Herein, since the writing with negative polarity is performed in 1F, the pixel voltage |Vpe| applied across the liquid crystal layer becomes higher than the original voltage.

Next, the case on the right side of FIG. 40 where the electric potential VLs is written in 3F is considered. At this time, the liquid crystal capacitance $C_{LC}$ decreases, so that the feedthrough voltage is smaller than the value considered in the design, and the pixel-electrode electric potential Vpe becomes higher than the original electric potential. That is, the pixel voltage |Vpe| applied across the liquid crystal layer becomes higher than the original voltage.

As described above, the influence of the feedthrough voltage on the pixel-electrode electric potential Vpe is different between the case where the polarity of the writing into the pixel is changed from positive (+) to negative (−) polarity and the case where the polarity is changed from negative (−) to positive (+) polarity, so that the pixel voltage |Vpe| actually applied across the liquid crystal layer is different. Accordingly, as shown in FIG. 42, the left-eye image is seen as afterimage when the right-eye image is displayed. That is, cross-talk between frames occurs, thereby degrading the display quality.

As described above with reference to FIG. 20 and FIG. 28, the response speed of liquid crystal can be increased (i.e., the response time can be shortened) by performing overdrive driving. However, in the conventional overdrive driving, based on the gradation level displayed in a preceding frame (herein, e.g. a frame in which right-eye image is displayed) and the gradation level displayed in the current frame (e.g. a frame in which left-eye image is displayed), or based on the difference between the gradation levels, the overdrive amount (a difference between a target gradation level and a gradation level given as the result of overdrive) is set, but the writing polarity is not considered at all. That is, in the driving method in which the overdrive amount is determined by referring to a lookup table, only one lookup table is prepared.

As is understood from the above description with reference to FIG. 40, even if the overdrive amount is set higher, and the response speed of liquid crystal is increased, the problem of cross-talk between frames cannot occur as long as one overdrive amount is used irrespective of the writing polarity.

In the liquid crystal display device in the embodiment of the present invention, the overdrive amount is adjusted in accordance with the variation of writing polarity. That is, although only one lookup table is conventionally prepared, a plurality of kinds of lookup tables are prepared in accordance with the variation of writing polarity. At this time, at least two kinds of lookup tables are preferably prepared correspondingly to the case of the variation from positive to negative polarity and the case of the variation from negative to positive on which the influence of polarity variation is the largest. In general, in a liquid crystal display device, as described above, the voltage applied across the liquid crystal layer is set to be an AC voltage from the view point of reliability. Accordingly, in a general liquid crystal display device, when successive two frames are focused on, there inevitably exist a pattern in which the polarity of voltage applied across the liquid crystal layer is varied from positive to negative polarity and a pattern in which the polarity thereof is varied from negative to positive polarity.

Moreover, as in the liquid crystal display device in the above-described embodiment which can perform stereoscopic display, into each pixel, left-eye image data and right-eye image data are alternately written every successive two vertical scanning periods. In the case where the same polarity is exhibited over the two vertical scanning periods in which the left-eye image data is written, and the same polarity is exhibited over the two vertical scanning periods in which the right-eye image data is written, there further exist a pattern in which the polarity of voltage applied across the liquid crystal layer is successively positive, i.e. positive→positive, and a pattern in which the polarity thereof is successively negative, i.e. negative→negative. Therefore, as for the case of positive→positive and the case of negative→negative, it is preferred that appropriate overdrive amounts be prepared, respectively, but they may be omitted in view of the display quality and the cost.

In the liquid crystal display device in which the planer display mode and the stereoscopic display mode can be switched, the lookup tables in accordance with the polarity variation may be prepared as described above only for the stereoscopic display mode. In the stereoscopic display mode, as is understood from FIG. 42, the luminance of pixel is sometimes extremely varied when right-eye image and left-eye image are switched. On the contrary, in the general planar display mode, the correlation of luminance between adjacent pixels is high, and the time change of the luminance of a pixel is often continuous. Accordingly, the problem of cross-talk between frames is remarkable in the stereoscopic display mode. Even in the planar display mode, depending on the contents to be displayed, the problem of cross-talk between frames sometimes becomes obvious, so that the embodiments of the present invention may be applied as needed.

According to the embodiments of the present invention, in the stereoscopic display mode, the problem of cross-talk between frames can be solved, and the luminance can be increased. This is because, by setting appropriate amount of overdrive, after the switching from the right-eye image to the left-eye image, the condition where the left-eye image is written without any cross-talk between frames can be reached early, so that the timing at which the backlight is turned on can be advanced, thereby elongating the period of lighting time. In the planar display mode, the occurrence of cross-talk between frames is suppressed, thereby improving the display quality.

The liquid crystal display device in the embodiment of the present invention includes a circuit capable of supplying a display voltage corresponding to a gradation level expressed by $GL2_{OD}$ to a pixel. When a pair of successive two vertical scanning periods is constituted by a first vertical scanning period and a second vertical scanning period, and a first target gradation level GL1 to be displayed in the first vertical scanning period is different from a second target gradation level GL2 to be displayed in the second vertical scanning period immediately after the first vertical scanning period, the gradation level $GL2_{OD}$ satisfies a condition where $|GL2_{OD}-GL1|$ is larger than $|GL2-GL1|$, and a condition where the sign of $(GL2_{OD}-GL1)$ is the same as that of $(GL2-GL1)$. In other words, a circuit which can perform overshoot driving or undershoot driving (e.g. the overdrive driving circuit portion 124 shown in FIG. 20) is provided. The circuit can be constituted by using a known circuit for overdrive driving. The overdrive driving may be performed by referring to a lookup table or may be performed by arithmetic processing. Alternatively, the overdrive driving may be performed by combining them. Alternatively, only a difference with respect to the target voltage may be obtained. Alternatively, it is unnecessary to perform the overdrive driving for all gradation changes, but it is sufficient to appropriately select a gradation change to which the overdrive driving is to be performed.

In the liquid crystal display device in the embodiment of the present invention, the value of $GL2_{OD}$ when the polarity in the first vertical scanning period is positive and the polarity in the second vertical scanning period is negative is different from the value of GL2$_{OD}$ when the polarity in the first vertical scanning period is negative and the polarity in the second vertical scanning period is positive. For example, the settings are as follows shown in Table 1. In general, the liquid crystal display device is set so that the voltage applied across the liquid crystal layer is an AC voltage from the view point of reliability as described above. Accordingly, a pair of successive two vertical scanning periods in which the polarity of the voltage applied across the liquid crystal layer is changed from positive to negative polarity, and a pair of successive two vertical scanning periods in which the polarity is changed from negative to positive polarity also exist in a general planar display mode.

TABLE 1

| First vertical scanning period Gradation GL1 | Second vertical scanning period Gradation GL2 | Overdrive Gradation GL2$_{OD}$ |
|---|---|---|
| Writing polarity + | Writing polarity − | Writing polarity − |
| 0 | 4 | 8 |
| 0 | 16 | 110 |
| Writing polarity − | Writing polarity + | Writing polarity + |
| 0 | 4 | 10 |
| 0 | 16 | 136 |

As shown in Table 1, in the settings, a voltage corresponding to 8-step gradation (GL2$_{OD}$) is supplied when the gradation is changed from 0-step gradation (GL1) to 4-step gradation (GL2) and when the writing polarity is changed from positive to negative polarity, and a voltage corresponding to 10-step gradation (GL2$_{OD}$) is supplied when the writing polarity is changed from negative to positive polarity. In addition, in the settings, in the case where the gradation is changed from 0-step gradation (GL1) to 16-step gradation (GL2) and when the writing polarity is changed from positive to negative polarity, a voltage corresponding to 110-step gradation (GL2$_{OD}$) is supplied, and when the writing polarity is changed from negative to positive polarity, a voltage corresponding to 136-step gradation (GL2$_{OD}$) is supplied.

Figure 44:
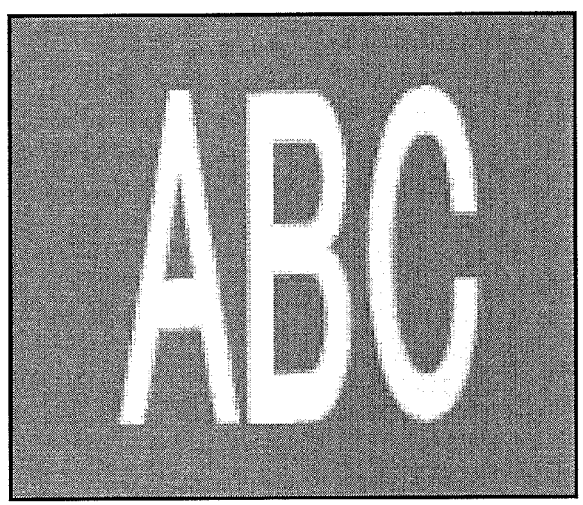
FIG. 44 is a diagram showing an image without cross-talk between frames displayed by the liquid crystal display device in the embodiment of the present invention.

As described above, depending on the change of polarity, the optimum overdrive amount is determined, so that the optimum response property can be obtained for all changes of polarity, as shown in FIG. 43, and a display without any cross-talk between frames can be obtained, as shown in FIG. 44.

Herein the cases of the change from positive to negative polarity and the change from negative to positive polarity are exemplarily shown. Alternatively, as for the cases of the change from positive to positive polarity and the change from negative to negative polarity, the optimum overdrive amount may be determined independently.

As in the liquid crystal display device in the above-described embodiment which can perform stereoscopic display, to each pixel, left-eye image data and right-eye image data are alternately written for respective two successive vertical scanning periods, the same polarity is exhibited over two vertical scanning periods in which the left-eye image data is written, and the same polarity is exhibited over two vertical scanning periods in which the right-eye image data is written, so that the liquid crystal display device further includes a pair of successive two vertical scanning periods in which the polarity in the first vertical scanning period is positive and the polarity in the second vertical scanning period is positive, and a pair of successive two vertical scanning periods in which the polarity in the first vertical scanning period is negative and the polarity in the second vertical scanning period is negative.

Accordingly, in the case where the polarity is changed from positive to positive, and in the case where the polarity is changed from negative to negative, it is preferred that respective optimum overdrive amounts may be prepared. At this time, the polarity of the display signal supplied to a pixel may be inverted every two vertical scanning periods, as shown in FIG. 15, or may be inverted every four vertical scanning periods, as shown in FIG. 16.

Another liquid crystal display device in this embodiment can perform display by switching its mode between a stereoscopic display mode and a planar display mode. Herein, Table 1 above described is utilized only in the stereoscopic display mode, and Table 2 shown below may be used in the planar display mode, irrespective of the polarity change, for example.

TABLE 2

| First vertical scanning period Gradation GL1 | Second vertical scanning period Gradation GL2 | Overdrive Gradation GL2OD |
|---|---|---|
| Writing polarity + | Writing polarity − | Writing polarity − |
| 0 | 4 | 5 |
| 0 | 16 | 48 |

As shown in Table 2, in the settings, when the gradation is changed from 0-step gradation (GL1) to 4-step gradation (GL2), a voltage corresponding to 5-step gradation (GL2$_{OD}$) is supplied, and when the gradation is changed from 0-step gradation (GL1) to 16-step gradation (GL2), a voltage corresponding to 48-step gradation (GL2$_{OD}$) is supplied.

As is apparent from the comparison between Table 1 and Table 2, the overdrive amount in the stereoscopic display mode is larger than that in the planar display mode. From this fact, it is understood that the optimum display cannot be performed in the stereoscopic display mode by the conventional overdrive amount. This is not only because the change of the polarity, but also because the switching between the right-eye image and the left-eye image. Accordingly, in the liquid crystal display device which can switch its mode between the stereoscopic display mode and the planar display mode, it is preferred that respectively corresponding overdrive amounts may be prepared. Herein, in the stereoscopic display mode, from the view point of display quality, a plurality of overdrive amounts (a plurality of kinds of lookup tables) may be preferably used in accordance with the polarity change. Alternatively, a single overdrive amount may be prepared irrespective of the change of polarity. For example, in the stereoscopic display mode, it is preferred that Table 1 may be utilized. Alternatively, an average of two values of GL2$_{OD}$ in Table 1 ((8+10)/2, (110+136)/2) may be used. These values are largely different from the values of GL2$_{OD}$ in the planar display mode shown in Table 2, so that if a single overdrive amount is used in the stereoscopic display mode irrespective of the change of polarity, but if optimized overdrive amount for the stereoscopic display mode may be prepared, it is understood that the display quality of the stereoscopic display can be improved as compared with the case where the overdrive amounts for the planar display mode (Table 2) are used in the prior art. In general, the overdrive amount in the stereoscopic display mode is considerably larger than the overdrive amount in the planar display mode.

In the above description, the vertical scanning frequency in the stereoscopic display mode is 240 Hz, and the vertical scanning frequency in the planar display mode is 120 Hz. If the vertical scanning frequencies may be higher than the above-mentioned values, the effects of the present invention are more remarkable.

INDUSTRIAL APPLICABILITY

According to the present invention, the display unevenness of the liquid crystal display device which can perform stereoscopic display and the stereoscopic display system can be suppressed. In addition, according to the present invention, it is possible to provide a liquid crystal display device and a stereoscopic display system with low power consumption which can switch its mode between the stereoscopic display mode and the planar display mode. In addition, according to the present invention, it is possible to provide a liquid crystal display device in which the cross-talk between frames particularly remarkable in stereoscopic display can be suppressed.

REFERENCE SIGNS LIST

100 Liquid crystal display device
200 Liquid crystal panel
250 Backlight unit
280 Shutter glasses

The invention claimed is:

1. A liquid crystal display device, which can perform display by switching its mode between a stereoscopic display mode and a planar display mode, having a vertical scanning period in which the polarity of a display signal supplied to a pixel is positive and a vertical scanning period in which the polarity or a display signal supplied to a pixel is negative, wherein
when a pair of successive two vertical scanning periods is constituted by a first vertical scanning period and a second vertical scanning period, and
when a target gradation level to be displayed in the first vertical scanning period is a first target gradation level GL1, and a target gradation level to be displayed in the second vertical scanning period immediately after the first vertical scanning period is a second target gradation level GL2, GL1 and GL2 being integers of 0 or more representing gradation levels,
the liquid crystal display device includes a circuit capable of supplying a display voltage corresponding to a gradation level to a pixel in the second vertical scanning period, the gradation level being expressed by $GL2_{OD}$ which satisfies a condition where $|GL2_{OD}-GL1|$ is larger than $|GL2-GL1|$ and a condition where the sign of $(GL2_{OD}-GL1)$ is the same as that of $(GL2-GL1)$, when the second target gradation level GL2 is different from the first target gradation level GL1,
in the stereoscopic display mode, the liquid crystal display device has a pair of successive two vertical scanning periods in which the polarity in the first vertical scanning period is positive and the polarity in the second vertical scanning period is negative, and a pair of successive two vertical scanning periods in which the polarity in the first vertical scanning period is negative and the polarity in the second vertical scanning period is positive, and
the value of $GL2_{OD}$ when the polarity in the first vertical scanning period is positive and the polarity in the second vertical scanning period is negative is different from the value of $GL2_{OD}$ when the polarity in the first vertical scanning period is negative and the polarity in the second vertical scanning period is positive,
when the liquid crystal display device further has a pair of successive two vertical scanning periods in which the polarity in the first vertical scanning period is positive and the polarity in the second vertical scanning period is positive,
the value of $GL2_{OD}$ when the polarity in the first vertical scanning period is positive and the polarity in the second vertical scanning period is negative is different from the value of $GL2_{OD}$ when the polarity in the first vertical scanning period is positive and the polarity in the second vertical scanning period is positive,
in the planar display mode, the value of $GL2_{OD}$ does not depend on the polarity in the first vertical scanning period and the polarity in the second vertical scanning period.

2. The liquid crystal display device of claim 1, further including a pair of successive two vertical scanning periods in which the polarity in the first vertical scanning period is negative and the polarity in the second vertical scanning period is negative, wherein
the value of $GL2_{OD}$ when the polarity in the first vertical scanning period is positive and the polarity in the second vertical scanning period is negative is different from the value of $GL2_{OD}$ when the polarity in the first vertical scanning period is negative and the polarity in the second vertical scanning period is negative.

3. The liquid crystal display device of claim 1, further including a pair of successive two vertical scanning periods in which the polarity in the first vertical scanning period is negative and the polarity in the second vertical scanning period is negative, wherein
the value of $GL2_{OD}$ when the polarity in the first vertical scanning period is positive and the polarity in the second vertical scanning period is positive is different from the value of $GL2_{OD}$ when the polarity in the first vertical scanning period is negative and the polarity in the second vertical scanning period is negative.

4. The liquid crystal display device of claim 1, wherein the polarity of the display signal supplied to a pixel is inverted every two vertical scanning periods.

5. The liquid crystal display device of claim 1, wherein the polarity of the display device supplied to a pixel is inverted every four vertical scanning periods.

6. The liquid crystal display device of claim 1, a plurality of kinds of lookup tables in which values of $GL2_{OD}$ are mutually different arc prepared for a certain combination of the gradation level GL1 and the gradation level GL2.

* * * * *